US012682918B2

(12) United States Patent
Byun et al.

(10) Patent No.: US 12,682,918 B2
(45) Date of Patent: Jul. 14, 2026

(54) SOURCE SPEECH MODIFICATION BASED ON AN INPUT SPEECH CHARACTERISTIC MAPPED TO MULTIPLE REFERENCE EMBEDDINGS WITHIN A THRESHOLD SIMILARITY

(71) Applicant: QUALCOMM Incorporated, San Diego, CA (US)

(72) Inventors: Kyungguen Byun, Seoul (KR); Sunkuk Moon, San Diego, CA (US); Erik Visser, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 416 days.

(21) Appl. No.: 17/931,755

(22) Filed: Sep. 13, 2022

(65) Prior Publication Data

US 2024/0087597 A1 Mar. 14, 2024

(51) Int. Cl.

| | |
|---|---|
| ***G10L 25/63*** | (2013.01) |
| ***G06F 16/635*** | (2019.01) |
| ***G06N 3/045*** | (2023.01) |
| ***G06N 3/0475*** | (2023.01) |
| ***G10L 13/02*** | (2013.01) |
| ***G10L 13/033*** | (2013.01) |
| ***G10L 15/02*** | (2006.01) |
| ***G10L 21/003*** | (2013.01) |
| ***G10L 25/21*** | (2013.01) |

(Continued)

(52) U.S. Cl.
CPC .............. *G10L 25/63* (2013.01); *G10L 25/21* (2013.01)

(58) Field of Classification Search
CPC ....... H04N 21/439; G10L 25/63; G10L 25/21; G10L 21/003; G06N 3/045; G06N 3/0475
See application file for complete search history.

(56) References Cited

U.S. PATENT DOCUMENTS 9,563,265 B2 2/2017 You et al.
12,087,268 B1 * 9/2024 Ouyang .................. G10L 13/02
(Continued)

FOREIGN PATENT DOCUMENTS

CN 108429929 * 8/2018 ........... H04N 21/439
CN 113656635 * 11/2021 ........... G06F 16/635
(Continued)

OTHER PUBLICATIONS

Li et al., "StarGANv2-VC: A Diverse, Unsupervised, Non-parallel Framework for Natural-Sounding Voice Conversion", Department of Electrical Engineering, Columbia University, USA, Jul. 23, 2021, pp. 1-5.

(Continued)

*Primary Examiner* — Farzad Kazeminezhad
(74) *Attorney, Agent, or Firm* — QUALCOMM Incorporated; Espartaco Diaz Hidalgo

(57) ABSTRACT

A device includes one or more processors configured to process an input audio spectrum of input speech to detect a first characteristic associated with the input speech. The one or more processors are also configured to select, based at least in part on the first characteristic, one or more reference embeddings from among multiple reference embeddings. The one or more processors are further configured to process a representation of source speech, using the one or more reference embeddings, to generate an output audio spectrum of output speech.

30 Claims, 25 Drawing Sheets

(51) Int. Cl.

| | |
|---|---|
| ***H04N 21/439*** | (2011.01) |
| ***H04R 3/00*** | (2006.01) |

(56) References Cited

U.S. PATENT DOCUMENTS

| | | | | |
|---|---|---|---|---|
| 2021/0304735 | A1* | 9/2021 | Gao | H04R 3/005 |
| 2022/0230623 | A1 | 7/2022 | Byun et al. | |
| 2023/0245201 | A1* | 8/2023 | Xu | G06F 40/40 |

FOREIGN PATENT DOCUMENTS

| | | | | |
|---|---|---|---|---|
| EP | 0 770 987 B1 | * 11/1996 | | G10L 13/02 |
| WO | WO2010/105396 | * 9/2010 | | G10L 15/02 |

OTHER PUBLICATIONS

Choi H., et al., "Sequence-to-Sequence Emotional Voice Conversion With Strength Control", IEEE Access, IEEE, USA, vol. 9, Mar. 10, 2021, pp. 42674-42687, XP011844718, Figure 3.

International Search Report and Written Opinion—PCT/US2023/072990—ISA/EPO—Nov. 15, 2023.

Shankar R., et al., "Multi-speaker Emotion Conversion via Latent Variable Regularization and a Chained Encoder-Decoder-Predictor Network", Arxiv.Org, Cornell University Library, 201 Olin Library Cornell University Ithaca, NY 14853, Aug. 10, 2020, 5 Pages, XP081736865, Figure 1.

* cited by examiner

SOURCE SPEECH MODIFICATION BASED ON AN INPUT SPEECH CHARACTERISTIC MAPPED TO MULTIPLE REFERENCE EMBEDDINGS WITHIN A THRESHOLD SIMILARITY

I. FIELD

The present disclosure is generally related to modifying source speech based on a characteristic of input speech to generate output speech.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices often incorporate functionality to receive an audio signal from one or more microphones. For example, the audio signal may represent user speech captured by the microphones, external sounds captured by the microphones, or a combination thereof. Such devices may include personal assistant applications, language translation applications, or other applications that generate audio signals representing speech for playback by one or more speakers. In some examples, devices incorporate functionality to perform audio modification to have a fixed predetermined characteristic. For example, a configuration setting can be updated to adjust bass in a source audio file. Speech modification based on a characteristic that is detected in an input speech representation is not available, which can result in limited enhancement possibilities.

III. SUMMARY

According to one implementation of the present disclosure, a device includes one or more processors configured to process an input audio spectrum of input speech to detect a first characteristic associated with the input speech. The one or more processors are also configured to select, based at least in part on the first characteristic, one or more reference embeddings from among multiple reference embeddings. The one or more processors are further configured to process a representation of source speech, using the one or more reference embeddings, to generate an output audio spectrum of output speech.

According to another implementation of the present disclosure, a method includes processing, at a device, an input audio spectrum of input speech to detect a first characteristic associated with the input speech. The method also includes selecting, based at least in part on the first characteristic, one or more reference embeddings from among multiple reference embeddings. The method further includes processing a representation of source speech, using the one or more reference embeddings, to generate an output audio spectrum of output speech.

According to another implementation of the present disclosure, a non-transitory computer-readable medium includes instructions that, when executed by one or more processors, cause the one or more processors to process an input audio spectrum of input speech to detect a first characteristic associated with the input speech. The instructions, when executed by the one or more processors, also cause the one or more processors to select, based at least in part on the first characteristic, one or more reference embeddings from among multiple reference embeddings. The instructions, when executed by the one or more processors, further cause the one or more processors to process a representation of source speech, using the one or more reference embeddings, to generate an output audio spectrum of output speech.

According to another implementation of the present disclosure, an apparatus includes means for processing an input audio spectrum of input speech to detect a first characteristic associated with the input speech. The apparatus also includes means for selecting, based at least in part on the first characteristic, one or more reference embeddings from among multiple reference embeddings. The apparatus also includes means for processing a representation of source speech, using the one or more reference embeddings, to generate an output audio spectrum of output speech.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
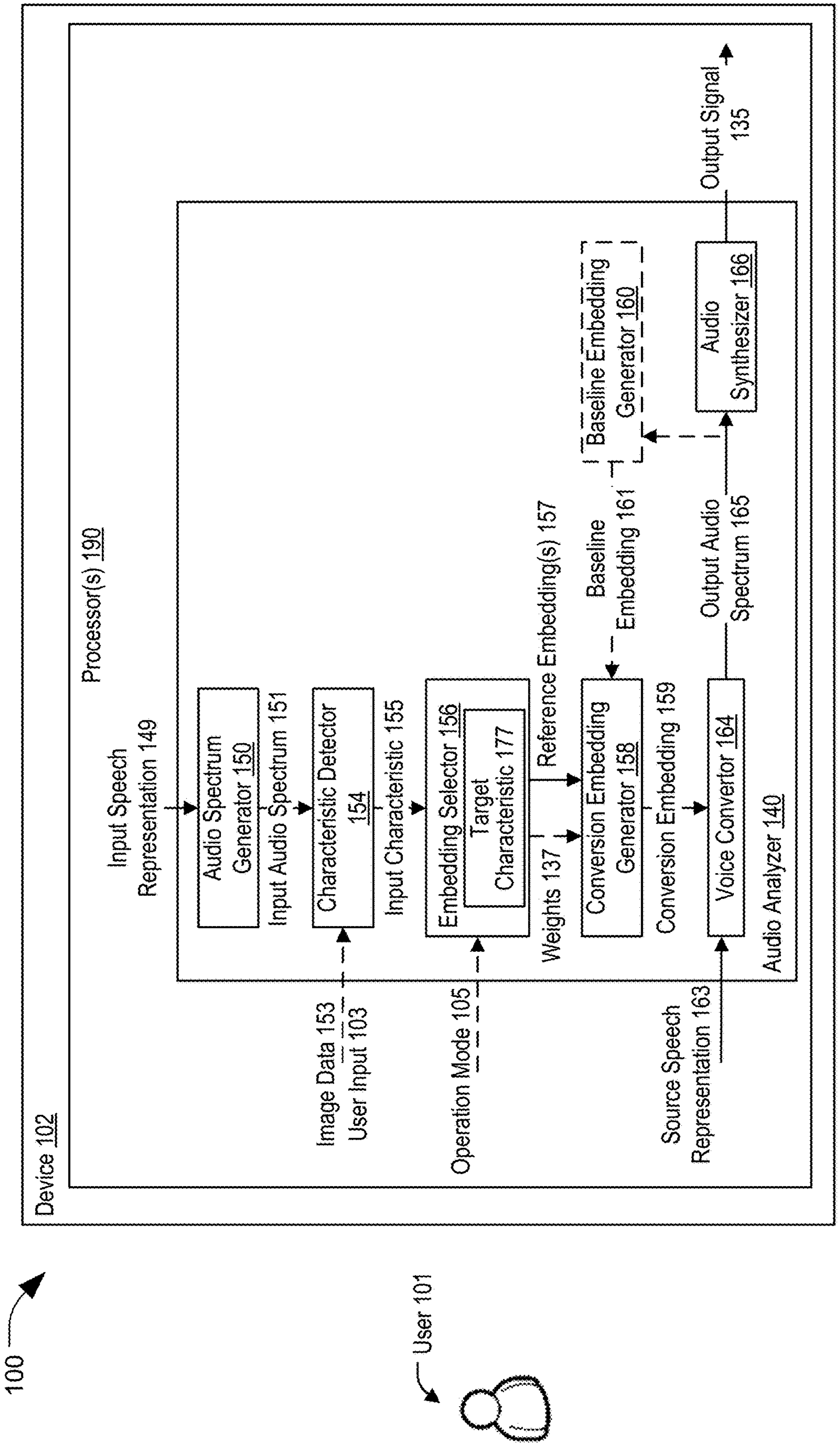
FIG. 1 is a block diagram of a particular illustrative aspect of a system operable to perform source speech modification based on an input speech characteristic, in accordance with some examples of the present disclosure.

In some examples, devices incorporate functionality to perform audio modification to have a fixed pre-determined characteristic. For example, a configuration setting can be updated to adjust bass in a source audio file. Speech modification based on a characteristic that is detected in input audio can result in various enhancement possibilities. In an example, source speech, e.g., generated by a personal assistant application, can be updated to match a speech characteristic detected in user speech received from a microphone. To illustrate, the user speech can have a higher intensity during the day and a lower intensity in the evening, and the source speech of the personal assistant can be adjusted to have a corresponding intensity. In some examples, the source speech can be adjusted to have a lower absolute intensity relative to the user speech. To illustrate, the source speech can be adjusted to sound calm when user speech sounds tired and adjusted to sound happy when user speech sounds excited.

Systems and methods of performing source speech modification based on an input speech characteristic are disclosed. For example, an audio analyzer determines an input characteristic of input speech audio. In some examples, the input speech audio can correspond to an input signal received from a microphone. The input characteristic can include emotion, speaker identity, speech style (e.g., volume, pitch, speed, etc.), or a combination thereof. The audio analyzer determines a target characteristic based on the input characteristic and updates source speech audio to have the target characteristic to generate output speech audio. In some examples, the source speech audio is generated by an application.

In some aspects, the target characteristic is the same as the input characteristic so that the output speech audio sounds similar to (e.g., has the same characteristic as) the input speech audio. For example, the output speech audio has the same intensity as the input speech audio. In some aspects, the target characteristic, although based on the input characteristic, is different from the input characteristic so that the output speech audio changes based on the input speech audio but does not sound the same as the input speech audio. For example, the output speech audio has positive intensity relative to the input speech audio. To illustrate, a mental health application is designed to generate a response (e.g., output speech audio) that has a positive intensity relative to received user speech (e.g., input speech audio).

Optionally, in some aspects, the source speech audio is the same as the input speech audio. To illustrate, the audio analyzer updates input speech audio received from a microphone based on a characteristic of the input speech audio to generate the output speech audio. For example, the output speech audio has positive intensity relative to the input speech audio. To illustrate, a user with a live-streaming gaming channel wants their speech to have higher energy to retain audience attention.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 190 of FIG. 1), which indicates that in some implementations the device 102 includes a single processor 190 and in other implementations the device 102 includes multiple processors 190.

In some drawings, multiple instances of a particular type of feature are used. Although these features are physically and/or logically distinct, the same reference number is used for each, and the different instances are distinguished by addition of a letter to the reference number. When the features as a group or a type are referred to herein e.g., when no particular one of the features is being referenced, the reference number is used without a distinguishing letter. However, when one particular feature of multiple features of the same type is referred to herein, the reference number is used with the distinguishing letter. For example, referring to FIG. 4, multiple operation modes are illustrated and associated with reference numbers 105A and 105B. When referring to a particular one of these operation modes, such as an operation mode 105A, the distinguishing letter "A" is used. However, when referring to any arbitrary one of these operation modes or to these operation modes as a group, the reference number 105 is used without a distinguishing letter.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system configured to perform source speech modification based on an input speech characteristic is disclosed and generally designated 100. The system 100 includes a device 102 that includes the one or more processors 190. The one or more processors 190 include an audio analyzer 140 that is configured to perform source speech modification based on an input speech characteristic. In a particular aspect, the audio analyzer 140 is trained by a trainer, as further described with reference to FIG. 14.

The audio analyzer 140 includes an audio spectrum generator 150 coupled via a characteristic detector 154 and an embedding selector 156 to a conversion embedding generator 158. The conversion embedding generator 158 is coupled via a voice convertor 164 to an audio synthesizer 166. In some aspects, the voice convertor 164 corresponds to a generator and the audio synthesizer 166 corresponds to a decoder. Optionally, in some implementations, the voice convertor 164 is also coupled via a baseline embedding generator 160 to the conversion embedding generator 158.

The audio spectrum generator 150 is configured to generate an input audio spectrum 151 of an input speech representation 149 (e.g., a representation of input speech). In an example, the input speech representation 149 corresponds to audio that includes the input speech, and the audio spectrum generator 150 is configured to apply a transform (e.g., a fast fourier transform (FFT)) to the audio in the time domain to generate the input audio spectrum 151 in the frequency domain.

The characteristic detector 154 is configured to process the input audio spectrum 151 to detect an input characteristic 155 associated with the input speech, as further described with reference to FIG. 2. The input characteristic 155 can include an emotion, a style (e.g., a volume, a pitch, a speed, or a combination thereof), or both, of the input speech. In some aspects, the characteristic detector 154 is configured to perform speaker recognition to determine that the input audio spectrum 151 likely corresponds to input speech of a particular user. In these aspects, the input characteristic 155 can include a speaker identifier (e.g., a user identifier) of the particular user.

The embedding selector 156 is configured to select, based at least in part on the input characteristic 155, one or more reference embeddings 157 from among multiple reference embeddings, as further described with reference to FIGS. 4-7B. For example, the embedding selector 156 is configured to determine a target characteristic 177 based on the input characteristic 155 and to select the one or more reference embeddings 157 corresponding to the target characteristic 177. To illustrate, a reference embedding 157 can correspond to a particular emotion, a particular style, a particular speaker identifier, or a combination thereof.

In a particular implementation, a reference embedding 157 corresponding to a particular emotion (e.g., Excited) indicates a set (e.g., a vector) of speech feature values (e.g., high pitch) that are indicative of the particular emotion. In a particular implementation, a reference embedding 157 corresponding to a particular speaker identifier indicates a set (e.g., a vector) of speech feature values that are indicative of speech of a particular speaker (e.g., a user) associated with the particular speaker identifier. In a particular implementation, a reference embedding 157 corresponding to a particular pitch indicates a set (e.g., a vector) of speech feature values that are indicative of the particular pitch. In a particular implementation, a reference embedding 157 corresponding to a particular speed indicates a set (e.g., a vector) of speech feature values that are indicative of the particular speed. In a particular implementation, a reference embedding 157 corresponding to a particular volume indicates a set (e.g., a vector) of speech feature values that are indicative of the particular volume.

A non-limiting example of speech features includes mel-frequency cepstral coefficients (MFCCs), shifted delta cepstral coefficients (SDCC), spectral centroid, spectral roll off, spectral flatness, spectral contrast, spectral bandwidth, chroma-based features, zero crossing rate, root mean square energy, linear prediction cepstral coefficients (LPCC), spectral subband centroid, line spectral frequencies, single frequency cepstral coefficients, formant frequencies, power normalized cepstral coefficients (PNCC), or a combination thereof.

The audio analyzer 140 is configured to process a source speech representation 163 (e.g., a representation of source speech), using the one or more reference embeddings 157, to generate an output audio spectrum 165 of output speech. Using the one or more reference embeddings 157 corresponding to a single input speech representation 149 to process the source speech representation 163 is provided as an illustrative example. In other examples, sets of one or more reference embeddings 157 corresponding to multiple input speech representations 149 can be used to process the source speech representation 163, as further described with reference to FIG. 8C.

In an example, the conversion embedding generator 158 is configured to generate a conversion embedding 159 based on the one or more reference embeddings 157, as further described with reference to FIGS. 8A-8C. In a particular aspect, the one or more reference embeddings 157 include a single reference embedding and the conversion embedding 159 is the same as the single reference embedding. In some aspects, the one or more reference embeddings 157 include multiple reference embeddings and the conversion embedding 159 is a combination of the multiple reference embeddings. The voice convertor 164 is configured to apply the conversion embedding 159 to the source speech representation 163 to generate the output audio spectrum 165 of output speech. For example, the conversion embedding 159 corresponds to a set (e.g., a vector) of first speech feature values and applying the conversion embedding 159 to the source speech representation 163 corresponds to adjusting second speech feature values of the source speech representation 163 based on the first speech feature values to generate the output audio spectrum 165. In a particular implementation, a particular second speech feature value of the source speech representation 163 is replaced or modified based on a corresponding first speech feature value of the conversion embedding 159.

In a particular implementation, the source speech representation 163 includes encoded source speech. The voice convertor 164 applies the conversion embedding 159 to the encoded source speech to generate converted encoded source speech and decodes the converted encoded source speech to generate the output audio spectrum 165.

The audio synthesizer 166 is configured to process the output audio spectrum 165 to generate an output signal 135. For example, the audio synthesizer 166 is configured to apply a transform (e.g., inverse FFT (iFFT)) to the output audio spectrum 165 to generate the output signal 135. The output signal 135 has an output characteristic that matches the target characteristic 177. In some examples, the target characteristic 177 is the same as the input characteristic 155. In these examples, the output characteristic matches the input characteristic 155. To illustrate, a first speech characteristic of the output signal 135 (representing the output speech) matches a second speech characteristic of the input speech representation 149 (representing the input speech). In a particular aspect, a "speech characteristic" corresponds to a speech feature.

In implementations that include the baseline embedding generator 160, the voice convertor 164 is also configured to provide the output audio spectrum 165 to the baseline embedding generator 160. The baseline embedding generator 160 is configured to determine a baseline embedding 161 based at least in part on the output audio spectrum 165 and to provide the baseline embedding 161 to the conversion embedding generator 158. The conversion embedding generator 158 is configured to generate a subsequent conversion embedding based at least in part on the baseline embedding 161. Using the baseline embedding generator 160 can enable gradual changes in characteristics of the output speech in the output signal 135.

In some implementations, the device 102 corresponds to or is included in one of various types of devices. In an illustrative example, the one or more processors 190 are integrated in a headset device, such as described with reference to FIG. 17 or earbuds, as described with reference to FIG. 18. In other examples, the one or more processors 190 are integrated in at least one of a mobile phone or a tablet computer device, as described with reference to FIG. 16, a wearable electronic device, as described with reference to FIG. 19, a voice-controlled speaker system, as described with reference to FIG. 20, a camera device, as described with reference to FIG. 21, an extended reality headset, as described with reference to FIG. 23, or extended reality glasses, as described with reference to FIG. 24. In another illustrative example, the one or more processors 190 are integrated into a vehicle, such as described further with reference to FIG. 22 and FIG. 25.

During operation, the audio spectrum generator 150 is configured to obtain an input speech representation 149 of input speech. In some examples, the input speech representation 149 is based on input speech audio. To illustrate, the input speech representation 149 can be based on one or more input audio signals received from one or more microphones that captured the input speech, as further described with reference to FIG. 9. In another example, the input speech representation 149 can be based on one or more input audio signals generated by an application of the device 102 or another device.

In an example, the input speech representation 149 can be based on input speech text (e.g., a script, a chat session, etc.). To illustrate, the audio spectrum generator 150 performs text-to-speech conversion on the input speech text to generate the input speech audio. In some implementations, the input speech text is associated with one or more characteristic indicators, such as an emotion indicator, a style indicator, a speaker indicator, or a combination thereof. An emotion indicator can include punctuation (e.g., an exclamation mark to indicate surprise), words (e.g., "I'm so happy"), emoticons (e.g., a smiley face), etc. A style indicator can include words (e.g., "y'all") typically associated with a particular style, metadata indicating a style, or both. A speaker indicator can include one or more speaker identifiers. In some aspects, the text-to-speech conversion generates the input speech audio to include characteristics, such as an emotion indicated by the emotion indicators, a style indicated by the style indicators, speech characteristics corresponding to the speaker indicator, or a combination thereof.

In some aspects, the input speech representation 149 includes at least one of an input speech spectrum, linear predictive coding (LPC) coefficients, or MFCCs of the input speech audio. In some examples, the input speech representation 149 is based on decoded data. For example, a decoder of the device 102 receives encoded data from another device and decodes the encoded data to generate the input speech representation 149, as further described with reference to FIG. 13B.

The audio spectrum generator 150 generates an input audio spectrum 151 of the input speech representation 149. For example, the audio spectrum generator 150 applies a transform (e.g., a fast fourier transform (FFT)) to the input speech audio in the time domain to generate the input audio spectrum 151 in the frequency domain. FFT is provided as an illustrative example of a transform applied to the input speech audio to generate the input audio spectrum 151. In other examples, the audio spectrum generator 150 can process the input speech representation 149 using various transforms and techniques to generate the input audio spectrum 151. The audio spectrum generator 150 provides the input audio spectrum 151 to the characteristic detector 154.

The characteristic detector 154 processes the input audio spectrum 151 of the input speech to detect an input characteristic 155 associated with the input speech, as further described with reference to FIG. 2. For example, the input characteristic 155 indicates an emotion, a style, a speaker identifier, or a combination thereof, associated with the input speech.

Optionally, in some examples, the characteristic detector 154 determines the input characteristic 155 (e.g., an emotion, a style, a speaker identifier, or a combination thereof) based at least in part on image data 153, a user input 103 from a user 101, or both, as further described with reference to FIG. 2. In some aspects, the image data 153 corresponds to an image (e.g., a still image, an image frame from a video, a generated image, or a combination thereof) associated with the input speech. For example, a camera captures the image concurrently with a microphone capturing the input speech, as further described with reference to FIG. 9. In some examples, encoded data received from another device includes the image data 153, the input speech representation 149, or both, as further described with reference to FIG. 13B. In some examples, the user input 103 indicates the speaker identifier. The characteristic detector 154 provides the input characteristic 155 to the embedding selector 156.

In some examples, the target characteristic 177 is the same as the input characteristic 155. Optionally, in some examples, the embedding selector 156 maps the input characteristic 155 to the target characteristic 177 according to an operation mode 105, as further described with reference to FIGS. 4-5C. In some aspects, the operation mode 105 is based on a configuration setting, default data, a user input, or a combination thereof.

The embedding selector 156 selects one or more reference embeddings 157, from among multiple reference embeddings, as corresponding to the target characteristic 177, as further described with reference to FIGS. 6-7B. For example, the one or more reference embeddings 157 include one or more emotion reference embeddings corresponding to an emotion indicated by the target characteristic 177, one or more style reference embeddings corresponding to a style indicated by the target characteristic 177, one or more speaker reference embeddings corresponding to a speaker identifier indicated by the target characteristic 177, or a combination thereof.

Optionally, in some aspects, the one or more reference embeddings 157 includes multiple reference embeddings and the embedding selector 156 determines weights 137 associated with a plurality of the one or more reference embeddings 157. For example, the one or more reference embeddings 157 include a first emotion reference embedding and a second emotion reference embedding. In this example, the weights 137 include a first weight and a second weight associated with the first emotion reference embedding and the second emotion reference embedding, respectively.

The conversion embedding generator 158 generates a conversion embedding 159 based at least in part on the one or more reference embeddings 157. In some examples, the one or more reference embeddings 157 include a single reference embedding, and the conversion embedding 159 is the same as the single reference embedding. In some examples, the one or more reference embeddings 157 include a plurality of reference embeddings, and the conversion embedding generator 158 combines the plurality of reference embeddings to generate the conversion embedding 159, as further described with reference to FIGS. 8A-8C. Optionally, in some implementations, the conversion embedding generator 158 combines the one or more reference embeddings 157 and a baseline embedding 161 to generate the conversion embedding 159, as further described with reference to FIG. 8B. In a particular aspect, the baseline embedding generator 160 generates and updates the baseline embedding 161 during an audio analysis session of the audio analyzer 140 so that changes in characteristics of the output signal 135 are gradual. The conversion embedding generator 158 provides the conversion embedding 159 to the voice convertor 164.

The voice convertor 164 obtains a source speech representation 163 of source speech. In some aspects, the input speech is used as the source speech. In other aspects, the input speech is distinct from the source speech. In a particular aspect, the device 102 includes a representation generator configured to generate the source speech representation 163, as further described with reference to FIG. 12. In some examples, the source speech representation 163 is based on source speech audio. To illustrate, the source speech representation 163 can be based on one or more source audio signals received from one or more microphones that captured the source speech, as further described with reference to FIG. 10. In another example, the source speech representation 163 can be based on one or more source audio signals generated by an application of the device 102 or another device.

In an example, the source speech representation 163 can be based on source speech text (e.g., a script, a chat session, etc.). To illustrate, the voice convertor 164 performs text-to-speech conversion on the source speech text to generate the source speech audio. In some implementations, the source speech text is associated with one or more characteristic indicators, such as an emotion indicator, a style indicator, a speaker identifier, or a combination thereof. An emotion indicator can include punctuation (e.g., an exclamation mark to indicate surprise), words (e.g., "I'm so happy"), emoticons (e.g., a smiley face), etc. A style indicator can include words (e.g., "y'all") typically associated with a particular style, metadata indicating a style, or both. In some aspects, the text-to-speech conversion generates the source speech audio to include characteristics, such as an emotion indicated by the emotion indicators, a style indicated by the style indicators, speech characteristics corresponding to the speaker identifier, or a combination thereof.

In some aspects, the source speech representation 163 is based on at least one of the source speech audio, a source speech spectrum of the source speech audio, LPC coefficients of the source speech audio, or MFCCs of the source speech audio. In some examples, the source speech representation 163 is based on decoded data. For example, a decoder of the device 102 receives encoded data from another device and decodes the encoded data to generate the source speech representation 163, as further described with reference to FIG. 13B.

The voice convertor 164 is configured to apply the conversion embedding 159 to the source speech representation 163 to generate an output audio spectrum 165 of output speech. For example, the source speech representation 163 indicates a source speech amplitude associated with a particular frequency. The voice convertor 164, based on determining that the conversion embedding 159 indicates an adjustment amplitude for the particular frequency, determines an output speech amplitude based on the source speech amplitude, the adjustment amplitude, or both. In a particular example, the voice convertor 164 determines the output speech amplitude by adjusting the source speech amplitude based on the adjustment amplitude. In another example, the output speech amplitude is the same as the adjustment amplitude. The voice convertor 164 generates the output audio spectrum 165 indicating the output speech amplitude for the particular frequency. The voice convertor 164 provides the output audio spectrum 165 to the audio synthesizer 166.

The audio synthesizer 166 generates an output speech representation (e.g., a representation of the output speech) based on the output audio spectrum 165. For example, the audio synthesizer 166 applies a transform (e.g., iFFT) on the output audio spectrum 165 to generate an output signal 135 (e.g., an audio signal) that represents the output speech. In some examples, the audio synthesizer 166 performs speech-to-text conversion on the output signal 135 to generate output speech text. In a particular aspect, the output speech representation includes the output signal 135, the output speech text, or both. In a particular aspect, the input speech representation 149 includes the input speech text, and the output speech representation includes the output speech text.

In a particular aspect, the output speech representation has the target characteristic 177. For example, the output signal 135 includes output speech audio having the target characteristic 177. As another example, the output speech text includes characteristic indicators (e.g., words, emoticons, speaker identifier, metadata, etc.) corresponding to the target characteristic 177.

The audio analyzer 140 provides the output speech representation (e.g., the output signal 135, the output speech text, or both) to one or more devices, such as a speaker, a storage device, a network device, another device, or a combination thereof. In some examples, the audio analyzer 140 outputs the output signal 135 via one or more speakers, as further described with reference to FIG. 11. In some examples, the audio analyzer 140 encodes the output signal 135 to generate encoded data and provides the encoded data to another device, as further described with reference to FIG. 13A.

In a particular example, the audio analyzer 140 receives input speech of the user 101 via one or more microphones, updates the input speech (e.g., uses the input speech as the source speech and updates the source speech representation 163) based on the input characteristic 155 of the input speech to generate output speech (e.g., the output signal 135). To illustrate, the user 101 streams for a gaming channel, and the output speech has the target characteristic 177 that is amplified relative to the input characteristic 155.

In a particular example, the audio analyzer 140 receives input speech from another device and updates source speech (e.g., the source speech representation 163) based on the input characteristic 155 of the input speech to generate output speech (e.g., the output signal 135). To illustrate, the audio analyzer 140 receives the input speech from another device during a call with that device, receives source speech of the user 101 via one or more microphones, and updates the source speech (e.g., the source speech representation 163) based on the input characteristic 155 of the input speech to generate output speech (e.g., the output signal 135) that is sent to the other device. In a particular aspect, the output speech has a positive intensity relative to the input speech.

The system 100 thus enables dynamically updating source speech based on characteristics of input speech to generate output speech. In some aspects, the source speech is updated in real-time. For example, the device 102 receives data corresponding to the input speech, data corresponding to the source speech, or both, concurrently with the audio analyzer 140 providing the output signal 135 to a playback device (e.g., a speaker, another device, or both).

Figure 2:
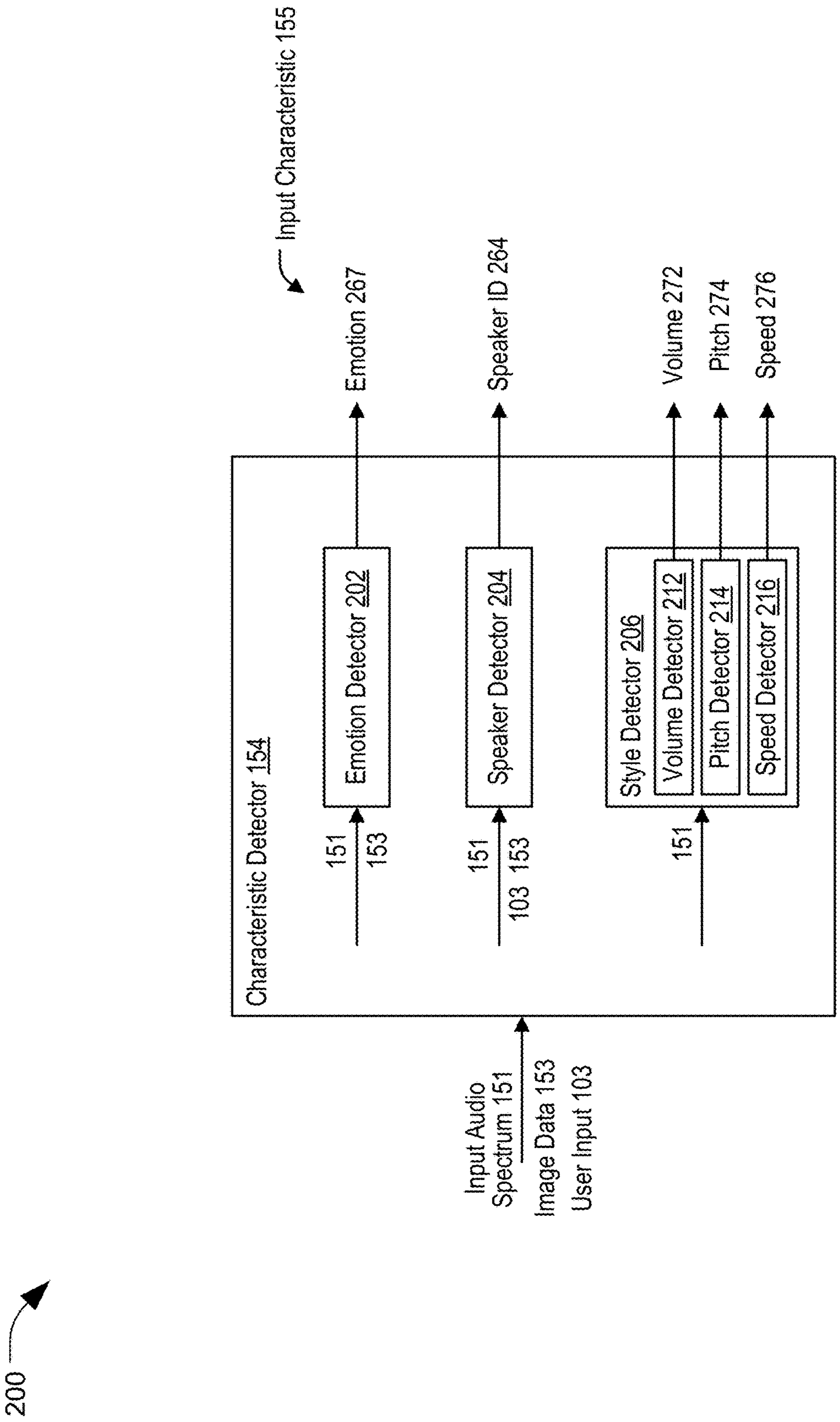
FIG. 2 is a diagram of an illustrative aspect of operations of a characteristic detector of the system of FIG. 1, in accordance with some examples of the present disclosure.

Referring to FIG. 2, a diagram 200 is shown of an illustrative aspect of operations of the characteristic detector 154. The characteristic detector 154 includes an emotion detector 202, a speaker detector 204, a style detector 206, or a combination thereof. The style detector 206 includes a volume detector 212, a pitch detector 214, a speed detector 216, or a combination thereof.

The characteristic detector 154 is configured to process (e.g., using a neural network or other characteristic detection techniques) the image data 153, the input audio spectrum 151, a user input 103, or a combination thereof, to determine the input characteristic 155. The input characteristic 155 includes an emotion 267, a volume 272, a pitch 274, a speed 276, or a combination thereof, detected as corresponding to input speech associated with the input audio spectrum 151. In some examples, the input characteristic 155 includes a speaker identifier 264 of a predicted speaker (e.g., a person, a character, etc.) of input speech associated with the input audio spectrum 151.

In a particular aspect, the emotion detector 202 is configured to determine the emotion 267 based on the image data 153, the input audio spectrum 151, or both, as further described with reference to FIGS. 3A-3B. In some implementations, the emotion detector 202 includes one or more neural networks trained to process the image data 153, the input audio spectrum 151, or both, to determine the emotion 267, as further described with reference to FIGS. 3A-3B.

In some examples, the emotion detector 202 processes the input audio spectrum 151 using audio emotion detection techniques to detect a first emotion of the input speech representation 149. In some examples, the emotion detector 202 processes the image data 153 using image emotion analysis techniques to detect a second emotion. To illustrate, the emotion detector 202 performs face detection on the image data 153 to determine that a face is detected in a face portion of the image data 153 and facial emotion detection on the face portion to detect the second emotion. In a particular aspect, the emotion detector 202 performs context detection on the image data 153 to determine a context and a corresponding context emotion. For example, a particular context (e.g., a concert) maps to a particular context emotion (e.g., excitement). The second emotion is based on the context emotion, the facial emotion detected in the face portion, or both.

The emotion detector 202 determines the emotion 267 based on the first emotion, the second emotion, or both. For example, the emotion 267 corresponds to an average of the first emotion and the second emotion. To illustrate, the first emotion is represented by first coordinates in an emotion map and the second emotion is represented by second coordinates in the emotion map, as further described with reference to FIG. 3A. The emotion 267 corresponds to a midpoint between (e.g., an average of) the first coordinates and the second coordinates in the emotion map.

In a particular aspect, the speaker detector 204 is configured to determine the speaker identifier 264 based on the image data 153, the input audio spectrum 151, the user input 103, or a combination thereof. In a particular implementation, the speaker detector 204 performs face recognition (e.g., using a neural network or other face recognition techniques) on the image data 153 to detect a face and to predict that the face likely corresponds to a user (e.g., a person, a character, etc.) associated with a user identifier. The speaker detector 204 selects the user identifier as an image predicted speaker identifier.

In a particular implementation, the speaker detector 204 performs speaker recognition (e.g., using a neural network or other speaker recognition techniques) on the input audio spectrum 151 to predict that speech characteristics indicated by the input audio spectrum 151 likely correspond to a user (e.g., a person, a character, etc.) associated with a user identifier, and selects the user identifier as an audio predicted speaker identifier.

In a particular implementation, the user input 103 indicates a user predicted speaker identifier. As an example, the user input 103 indicates a logged in user. As another example, the user input 103 indicates that a call is placed with a particular user and the input speech is received during the call, and the user predicted speaker identifier corresponds to a user identifier of the particular user.

The speaker detector 204 determines a speaker identifier 264 based on the image predicted speaker identifier, the audio predicted speaker identifier, the user predicted speaker identifier, or a combination thereof. For example, in implementations in which the speaker detector 204 generates a single predicted speaker identifier of the image predicted speaker identifier, the audio predicted speaker identifier, or the user predicted speaker identifier, the speaker detector 204 selects the single predicted speaker identifier as the speaker identifier 264.

In implementations in which the speaker detector 204 generates multiple predicted speaker identifiers of the image predicted speaker identifier, the audio predicted speaker identifier, or the user predicted speaker identifier, the speaker detector 204 selects one of the multiple predicted speaker identifiers as the speaker identifier 264. For example, the speaker detector 204 selects the speaker identifier 264 based on confidence scores associated with the multiple predicted speaker identifiers, priorities associated with the multiple predicted speaker identifiers, or a combination thereof. In a particular aspect, the priorities associated with predicted speaker identifiers are based on default data, a configuration setting, a user input, or a combination thereof.

In a particular aspect, the style detector 206 is configured to determine the volume 272, the pitch 274, the speed 276, or a combination thereof, based on the input audio spectrum 151. In some implementations, the volume detector 212 processes (e.g., using a neural network or other volume detection techniques) the input audio spectrum 151 to determine the volume 272. In some implementations, the pitch detector 214 processes (e.g., using a neural network or other pitch detection techniques) the input audio spectrum 151 to determine the pitch 274. In some implementations, the speed detector 216 processes (e.g., using a neural network or other speed detection techniques) the input audio spectrum 151 to determine the speed 276.

Figure 3A:
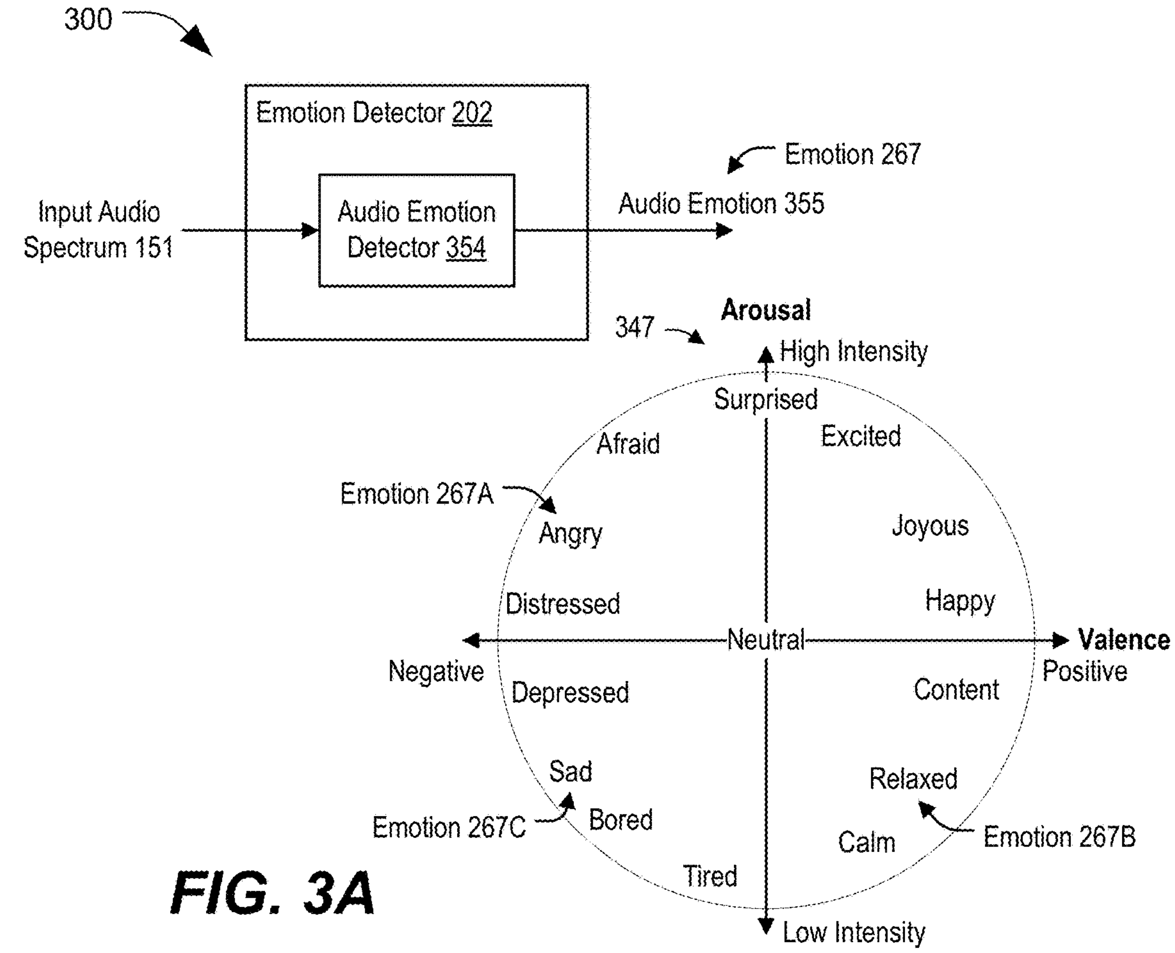
FIG. 3A is a diagram of an illustrative aspect of operations of an emotion detector of the characteristic detector of FIG. 2, in accordance with some examples of the present disclosure.

Referring to FIG. 3A, a diagram 300 of an illustrative aspect of operations of the emotion detector 202 is shown. The emotion detector 202 includes an audio emotion detector 354.

The audio emotion detector 354 performs audio emotion detection (e.g., using a neural network or other audio emotion detection techniques) on the input audio spectrum 151 to determine an audio emotion 355. In some implementations, the audio emotion detection includes determining an audio emotion confidence score associated with the audio emotion 355. The emotion 267 includes the audio emotion 355.

The diagram 300 includes an emotion map 347. In a particular aspect, the emotion 267 corresponds to a particular value on the emotion map 347. In some examples, a horizontal value (e.g., an x-coordinate) of the particular value indicates valence of the emotion 267, and a vertical value (e.g., a y-coordinate) of the particular value indicates intensity of the emotion 267.

A distance (e.g., a Cartesian distance) between a pair of emotions 267 indicates a similarity between the emotions 267. For example, the emotion map 347 indicates a first distance (e.g., a first Cartesian distance) between first coordinates corresponding to an emotion 267A (e.g., Angry) and second coordinates corresponding to an emotion 267B (e.g., Relaxed) and a second distance (e.g., a second Cartesian distance) between the first coordinates corresponding to the emotion 267A and third coordinates corresponding to an emotion 267C (e.g., Sad). The second distance is less than the first distance indicating that the emotion 267A (e.g., Angry) is more similar to the emotion 267C (e.g., Sad) than to the emotion 267B (e.g., Relaxed).

The emotion map 347 is illustrated as a two-dimensional space as a non-limiting example. In other examples, the emotion map 347 can be a multi-dimensional space.

Figure 3B:
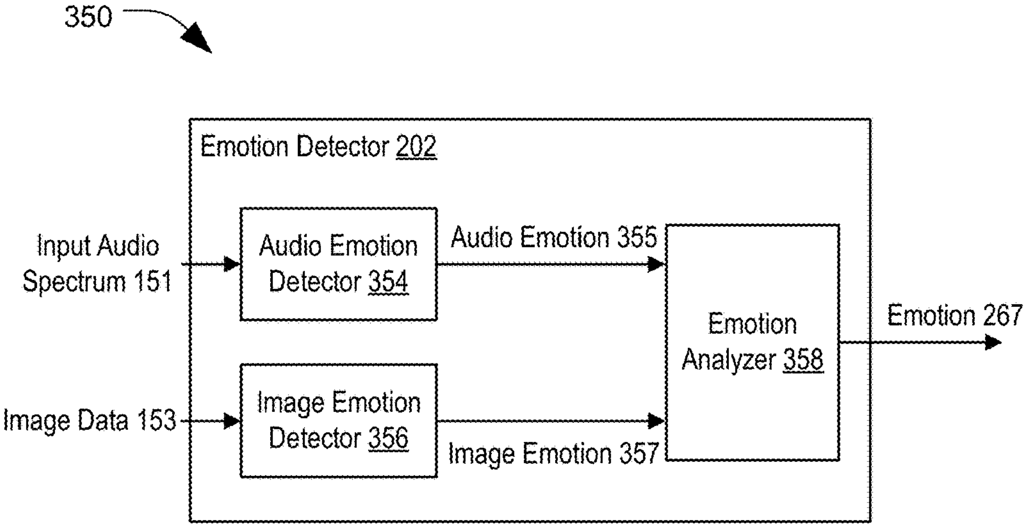
FIG. 3B is a diagram of an illustrative aspect of operations of an emotion detector of the characteristic detector of FIG. 2, in accordance with some examples of the present disclosure.

Referring to FIG. 3B, a diagram 350 of an illustrative aspect of operations of the emotion detector 202 is shown. The emotion detector 202 includes the audio emotion detector 354, an image emotion detector 356, or both. In some implementations, the emotion detector 202 includes an emotion analyzer 358 coupled to the audio emotion detector 354 and the image emotion detector 356.

In some implementations, the emotion detector 202 performs face detection on the image data 153 and determines the emotion 267 at least partially based on an output of the face detection. For example, the face detection indicates that a face image portion of the image data 153 corresponds to a face. In a particular implementation, the emotion detector 202 processes the face image portion (e.g., using a neural network or other facial emotion detection techniques) to determine a predicted facial emotion.

In some examples, the emotion detector 202 performs context detection (e.g., using a neural network or other context detection techniques) on the image data 153 and determines the emotion 267 at least partially based on an output of the context detection. For example, the context detection indicates that the image data 153 corresponds to a particular context (e.g., a party, a concert, a meeting, etc.), and the emotion detector 202 determines a predicted context emotion (e.g., excited) corresponding to the particular context (e.g., concert). In a particular aspect, the emotion detector 202 determines an image emotion 357 based on the predicted facial emotion, the predicted context emotion, or both. In some implementations, the emotion detector 202 determines an image emotion confidence score associated with the image emotion 357.

The emotion detector 202 determines the emotion 267 based on the audio emotion 355, the image emotion 357, or both. For example, the emotion analyzer 358 determines the emotion 267 based on the audio emotion 355 and the image emotion 357. In a particular implementation, the emotion analyzer 358 selects one of the audio emotion 355 or the image emotion 357 having a higher confidence score as the emotion 267. In a particular implementation, the emotion analyzer 358, in response to determining that a single one of the audio emotion 355 or the image emotion 357 is associated with a greater than a threshold confidence score, selects the single one of the audio emotion 355 or the image emotion 357 as the emotion 267.

In a particular implementation, the emotion analyzer 358 determines an average value (e.g., an average x-coordinate and an average y-coordinate) of the audio emotion 355 and the image emotion 357 as the emotion 267. For example, the emotion analyzer 358, in response to determining that each of the audio emotion 355 and the image emotion 357 is associated with a respective confidence score that is greater than a threshold confidence score, determines an average value of the audio emotion 355 and the image emotion 357 as the emotion 267.

Figure 4:
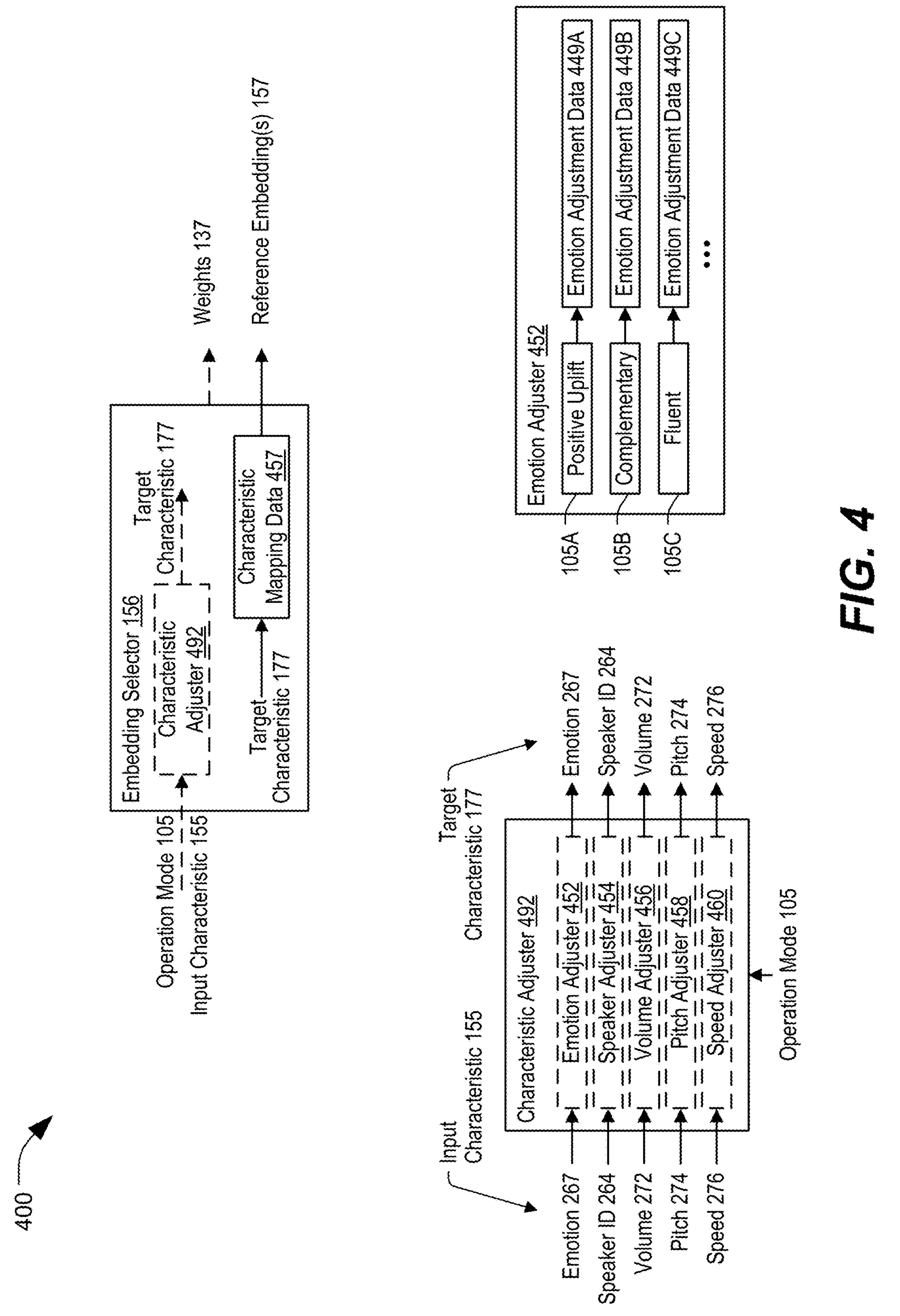
FIG. 4 is a diagram of an illustrative aspect of operations of an embedding selector of the system of FIG. 1, in accordance with some examples of the present disclosure.

Referring to FIG. 4, a diagram 400 of an illustrative aspect of operations of the embedding selector 156 is shown. In a particular aspect, the embedding selector 156 initializes the target characteristic 177 to be the same as input characteristic 155. Optionally, in some implementations, the embedding selector 156 includes a characteristic adjuster 492 that is configured to update the target characteristic 177 based on the input characteristic 155 and the operation mode 105.

In a particular aspect, the operation mode 105 is based on default data, a configuration setting, a user input, or a combination thereof. The characteristic adjuster 492 includes an emotion adjuster 452, a speaker adjuster 454, a volume adjuster 456, a pitch adjuster 458, a speed adjuster 460, or a combination thereof.

The emotion adjuster 452 is configured to update, based on the operation mode 105, the emotion 267 of the target characteristic 177. In a particular implementation, the emotion adjuster 452 uses emotion adjustment data 449 to map an original emotion (e.g., the emotion 267 indicated by the input characteristic 155) to a target emotion (e.g., the emotion 267 to include in the target characteristic 177). For example, the emotion adjuster 452, in response to determining that the operation mode 105 corresponds to an operation mode 105A (e.g., "Positive Uplift"), updates the emotion 267 based on emotion adjustment data 449A, as further described with reference to FIG. 5A.

In another example, the emotion adjuster 452, in response to determining that the operation mode 105 corresponds to an operation mode 105B (e.g., "Complementary"), updates the emotion 267 based on emotion adjustment data 449B, as further described with reference to FIG. 5B. In yet another example, the emotion adjuster 452, in response to determining that the operation mode 105 corresponds to an operation mode 105C (e.g., "Fluent"), updates the emotion 267 based on emotion adjustment data 449C, as further described with reference to FIG. 5C. In a particular aspect, the operation mode 105 is based on a user selection of one of multiple operation modes, such as the operation mode 105A, the operation mode 105B, the operation mode 105C, or a combination thereof.

In a particular aspect, the emotion adjustment data 449A indicates first mappings between emotions indicated in the emotion map 347. The emotion adjustment data 449B indicates second mappings between emotions indicated in the emotion map 347. The emotion adjustment data 449C indicates third mappings between emotions indicated in the emotion map 347. In some aspects, the second mappings include at least one mapping that is not included in the first mappings, the first mappings include at least one mapping that is not included in the second mappings, or both. In some aspects, the third mappings include at least one mapping that is not included in the first mappings, the first mappings include at least one mapping that is not included in the third mappings, or both. In some aspects, the third mappings include at least one mapping that is not included in the second mappings, the second mappings include at least one mapping that is not included in the third mappings, or both.

In some aspects, the operation mode 105 indicates a particular emotion, and the emotion adjuster 452 sets the emotion 267 of the target characteristic 177 to the particular emotion, as further described with reference to FIG. 5D. For example, the operation mode 105 is based on a user selection of the particular emotion. In some aspects, the emotion adjustment data 449 does not include a mapping for a particular original emotion, and the emotion adjuster 452 estimates a mapping from the particular original emotion to a particular target emotion based on one or more other mappings, as further described with reference to FIG. 7B.

The speaker adjuster 454 is configured to update, based on the operation mode 105, the speaker identifier 264 of the target characteristic 177. In a particular implementation, the operation mode 105 includes speaker mapping data that indicates that an original speaker identifier (e.g., the speaker identifier 264 indicated in the input characteristic 155) is to be mapped to a particular target speaker identifier, and the speaker adjuster 454 updates the target characteristic 177 to indicate the particular target speaker identifier as the speaker identifier 264. For example, the operation mode 105 is based on a user selection indicating that speech of a first user (e.g., Susan) associated with the original speaker identifier is to be modified to sound like speech of a second user (e.g., Tom) associated with the particular target speaker identifier.

In a particular implementation, the operation mode 105 indicates a selection of a particular target speaker identifier, and the speaker adjuster 454 updates the target characteristic 177 to indicate the particular target speaker identifier as the speaker identifier 264. For example, the operation mode 105 is based on a user selection indicating that speech is to be modified to sound like speech of a user (e.g., a person, a character, etc.) associated with the particular target speaker identifier.

The volume adjuster 456 is configured to update, based on the operation mode 105, the volume 272 of the target characteristic 177. In a particular implementation, the operation mode 105 includes volume mapping data that indicates that an original volume (e.g., the volume 272 indicated in the input characteristic 155) is to be mapped to a particular target volume, and the volume adjuster 456 updates the target characteristic 177 to indicate the particular target volume as the volume 272. For example, the operation mode 105 is based on a user selection indicating that volume is to be reduced by a particular amount. The volume adjuster 456 determines a particular target volume based on a difference between the volume 272 and the particular amount, and updates the target characteristic 177 to indicate the particular target volume as the volume 272. In a particular implementation, the operation mode 105 indicates a selection of a particular target volume, and the speaker adjuster 454 updates the target characteristic 177 to indicate the particular target volume as the volume 272.

The pitch adjuster 458 is configured to update, based on the operation mode 105, the pitch 274 of the target characteristic 177. In a particular implementation, the operation mode 105 includes pitch mapping data that indicates that an original pitch (e.g., the pitch 274 indicated in the input characteristic 155) is to be mapped to a particular target pitch, and the pitch adjuster 458 updates the target characteristic 177 to indicate the particular target pitch as the pitch 274. For example, the operation mode 105 is based on a user selection indicating that pitch is to be reduced by a particular amount. The pitch adjuster 458 determines a particular target pitch based on a difference between the pitch 274 and the particular amount, and updates the target characteristic 177 to indicate the particular target pitch as the pitch 274. In a particular implementation, the operation mode 105 indicates a selection of a particular target pitch, and the speaker adjuster 454 updates the target characteristic 177 to indicate the particular target pitch as the pitch 274.

The speed adjuster 460 is configured to update, based on the operation mode 105, the speed 276 of the target characteristic 177. In a particular implementation, the operation mode 105 includes speed mapping data that indicates that an original speed (e.g., the speed 276 indicated in the input characteristic 155) is to be mapped to a particular target speed, and the speed adjuster 460 updates the target characteristic 177 to indicate the particular target speed as the speed 276. For example, the operation mode 105 is based on a user selection indicating that speed is to be reduced by a particular amount. The speed adjuster 460 determines a particular target speed based on a difference between the speed 276 and the particular amount, and updates the target characteristic 177 to indicate the particular target speed as the speed 276. In a particular implementation, the operation mode 105 indicates a selection of a particular target speed, and the speaker adjuster 454 updates the target characteristic 177 to indicate the particular target speed as the speed 276.

The embedding selector 156 determines, based on characteristic mapping data 457, the one or more reference embeddings 157 associated with the target characteristic 177, as further described with reference to FIG. 6. The characteristic adjuster 492 enables dynamically selecting the one or more reference embeddings 157 corresponding to the target characteristic 177 that is based on the input characteristic 155.

Figure 5B:
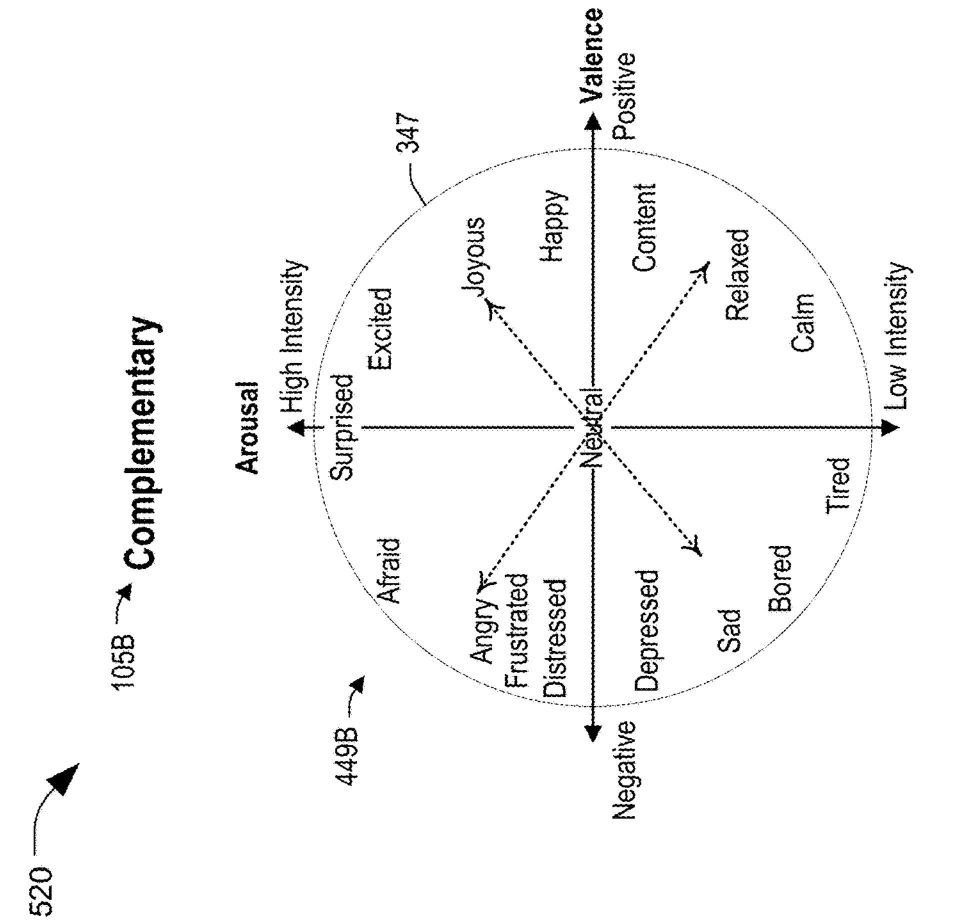
FIG. 5B is a diagram of an illustrative aspect of operations of an emotion adjuster of an embedding selector of FIG. 4, in accordance with some examples of the present disclosure.
Figure 5A:
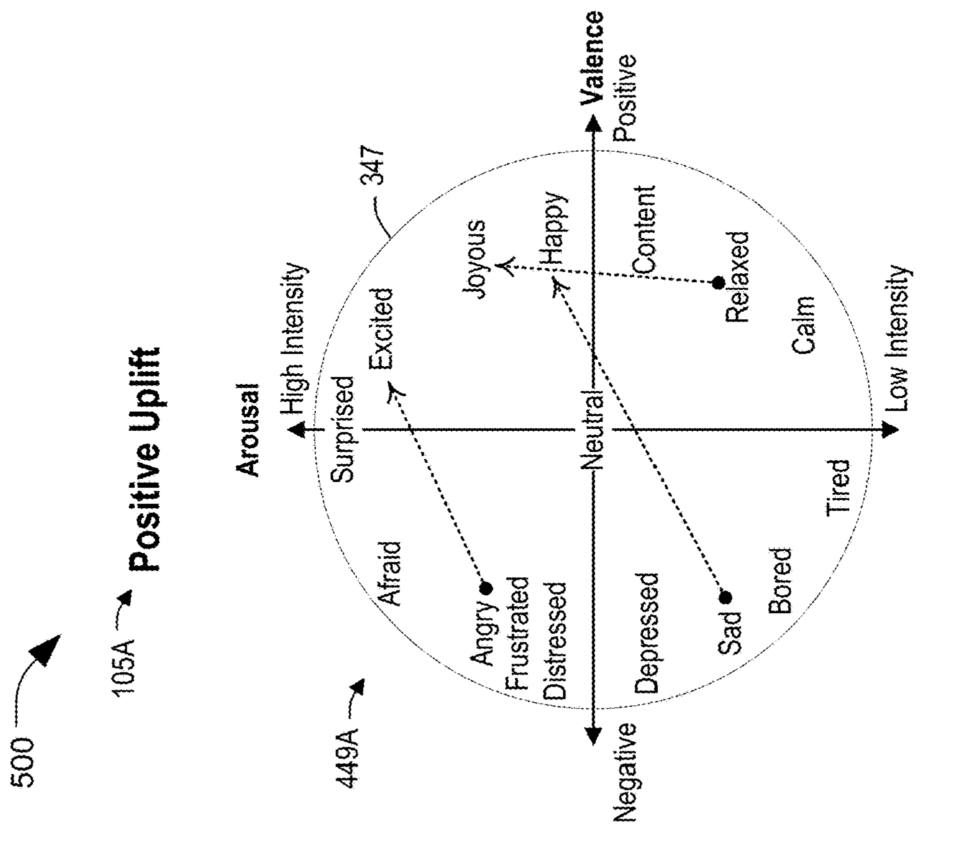
FIG. 5A is a diagram of an illustrative aspect of operations of an emotion adjuster of the embedding selector of FIG. 4, in accordance with some examples of the present disclosure.

Referring to FIG. 5A, a diagram 500 of an illustrative aspect of operations of the emotion adjuster 452 of FIG. 4 is shown. The diagram 500 includes an example of the emotion adjustment data 449A corresponding to the operation mode 105A (e.g., Positive Uplift).

The emotion adjustment data 449A indicates that each original emotion in the emotion map 347 is mapped to a respective target emotion in the emotion map 347 that has a higher (e.g., positive) intensity, a higher (e.g., positive) valence, or both, relative to the original emotion. For example, a first original emotion (e.g., Angry) maps to a first target emotion (e.g., Excited), a second original emotion (e.g., Sad) maps to a second target emotion (e.g., Happy), and a third original emotion (e.g., Relaxed) maps to a third target emotion (e.g., Joyous). The first target emotion, the second target emotion, and the third target emotion has a higher intensity and a higher valence than the first original emotion, the second original emotion, and the third original emotion, respectively.

The emotion adjustment data 449A indicating mapping of three original emotions to three target emotions is provided as an illustrative example. In other examples, the emotion adjustment data 449A can include fewer than three mappings or more than three mappings.

When the operation mode 105A (e.g., Positive Uplift) is selected, the emotion adjustment data 449A causes the embedding selector 156 to select a target emotion (e.g., the emotion 267 of the target characteristic 177) that enables the audio analyzer 140 to generate the output signal 135 of FIG. 1 corresponding to a positive emotion relative to the original emotion (e.g., the emotion 267 of the input characteristic 155) of the input speech representation 149. In an example, the user 101 selects the operation mode 105A (e.g., Positive Uplift) to increase positivity and energy of speech in a live-streamed video where the input speech is used as the source speech. In another example, the user 101 selects the operation mode 105A (e.g., Positive Uplift) to increase positivity and energy of speech in a marketing call where the input speech corresponds to speech of a recipient of the call and the source speech corresponds to a recorded message.

Referring to FIG. 5B, a diagram 520 of an illustrative aspect of operations of the emotion adjuster 452 of FIG. 4 is shown. The diagram 500 includes an example of the emotion adjustment data 449B corresponding to the operation mode 105B (e.g., Complementary).

The emotion adjustment data 449B indicates that each original emotion in the emotion map 347 is mapped to a respective target emotion in the emotion map 347 that has a complementary (e.g., opposite) intensity, a complementary (e.g., opposite) valence, or both, relative to the original emotion. In a particular aspect, a first particular emotion is represented by a first horizontal coordinate (e.g., 10 as the x-coordinate) and a first vertical coordinate (e.g., 5 as the y-coordinate). A second particular emotion that is complementary to the first particular emotion has a second horizontal coordinate (e.g., −10 as the x-coordinate) and a second vertical coordinate (e.g., −5 as the y-coordinate). The second horizontal coordinate is negative of the first horizontal coordinate, and the second vertical coordinate is negative of the first vertical coordinate.

The emotion adjustment data 449B indicates that a first emotion (e.g., Angry) maps to a second emotion (e.g., Relaxed) and vice versa. As another example, a third emotion (e.g., Sad) maps to a fourth emotion (e.g., Joyous) and vice versa. The first emotion (e.g., Angry) has a complementary intensity and a complementary valance relative to the second emotion (e.g., Relaxed). The third emotion (e.g., Sad) has a complementary intensity and a complementary valance relative to the fourth emotion (e.g., Joyous).

The emotion adjustment data 449B indicating two mappings is provided as an illustrative example. In other examples, the emotion adjustment data 449B can include fewer than two mappings or more than two mappings.

When the operation mode 105B (e.g., Complementary) is selected, the emotion adjustment data 449B causes the embedding selector 156 to select a target emotion (e.g., the emotion 267 of the target characteristic 177) that enables the audio analyzer 140 to generate the output signal 135 of FIG. 1 corresponding to a complementary emotion relative to the original emotion (e.g., the emotion 267 of the input characteristic 155) of the input speech representation 149.

Figure 5C:
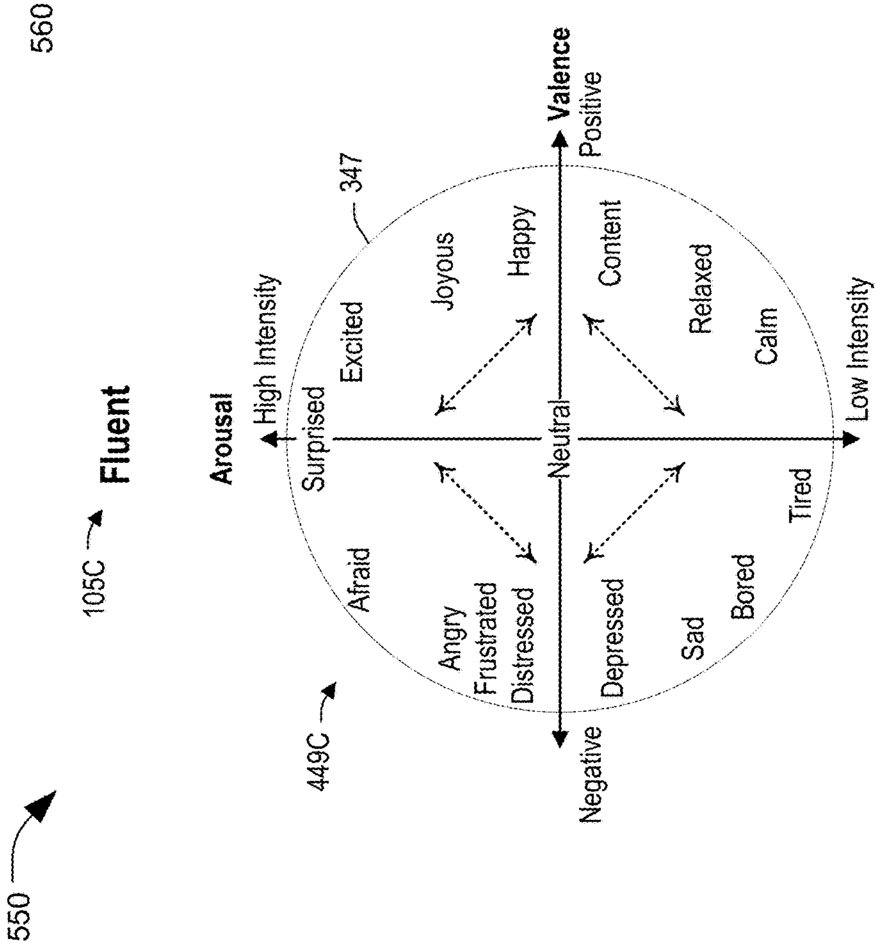
FIG. 5C is a diagram of an illustrative aspect of operations of an emotion adjuster of an embedding selector of FIG. 4, in accordance with some examples of the present disclosure.

Referring to FIG. 5C, a diagram 550 of an illustrative aspect of operations of the emotion adjuster 452 of FIG. 4 is shown. The diagram 550 includes an example of the emotion adjustment data 449C corresponding to the operation mode 105C (e.g., Fluent).

The emotion adjustment data 449C indicates that each original emotion in the emotion map 347 is mapped to a respective target emotion in the emotion map 347 that has a complementary intensity, a complementary (e.g., opposite) valence, or both, relative to the original emotion within the same emotion quadrant of the emotion map 347. In a particular aspect, a first emotion quadrant corresponds to positive valence values (e.g., greater than 0 x-coordinates) and positive intensity values (e.g., greater than 0 y-coordinates), a second emotion quadrant corresponds to negative valence values (e.g., less than 0 x-coordinates) and positive intensity values (e.g., greater than 0 y-coordinates), a third emotion quadrant corresponds to negative valence values (e.g., less than 0 x-coordinates) and negative intensity values (e.g., less than 0 y-coordinates), and a fourth emotion quadrant corresponds to positive valence values (e.g., greater than 0 x-coordinates) and negative intensity values (e.g., less than 0 y-coordinates).

In each of the first emotion quadrant and the third emotion quadrant, complementary emotions can be determined by changing the x-coordinate and the y-coordinate and keeping the same signs. In an example for the first emotion quadrant, a first particular emotion is represented by a first horizontal coordinate (e.g., 10 as the x-coordinate) and a first vertical coordinate (e.g., 5 as the y-coordinate). A second particular emotion that is complementary to the first particular emotion in the first emotion quadrant has a second horizontal coordinate (e.g., 5 as the x-coordinate) and a second vertical coordinate (e.g., 10 as the y-coordinate). The second horizontal coordinate is the same as the first vertical coordinate, and the second vertical coordinate is the same as the first horizontal coordinate. The emotion adjustment data 449C indicates that the first particular emotion maps to the second particular emotion, and vice versa.

In an example for the third emotion quadrant, a first particular emotion is represented by a first horizontal coordinate (e.g., −10 as the x-coordinate) and a first vertical coordinate (e.g., −5 as the y-coordinate). A second particular emotion that is complementary to the first particular emotion in the third emotion quadrant has a second horizontal coordinate (e.g., −5 as the x-coordinate) and a second vertical coordinate (e.g., −10 as the y-coordinate). The second horizontal coordinate (e.g., −5) is the same as the first vertical coordinate (e.g., −5), and the second vertical coordinate (e.g., −10) is the same as the first horizontal coordinate (e.g., −10). The emotion adjustment data 449C indicates that the first particular emotion maps to the second particular emotion, and vice versa.

In each of the second emotion quadrant and the fourth emotion quadrant, complementary emotions can be determined by changing the x-coordinate and the y-coordinate and changing the signs. In an example for the second emotion quadrant, a first particular emotion is represented by a first horizontal coordinate (e.g., −10 as the x-coordinate) and a first vertical coordinate (e.g., 5 as the y-coordinate) in the second emotion quadrant. A second particular emotion that is complementary to the first particular emotion in the second emotion quadrant has a second horizontal coordinate (e.g., −5 as the x-coordinate) and a second vertical coordinate (e.g., 10 as the y-coordinate). The second horizontal coordinate (e.g., −5) is negative of the first vertical coordinate (e.g., 5), and the second vertical coordinate (e.g., 10) is negative of the first horizontal coordinate (e.g., −10). The emotion adjustment data 449C indicates that the first particular emotion maps to the second particular emotion, and vice versa.

In an example for the fourth emotion quadrant, a first particular emotion is represented by a first horizontal coordinate (e.g., 10 as the x-coordinate) and a first vertical coordinate (e.g., −5 as the y-coordinate) in the fourth emotion quadrant. A second particular emotion that is complementary to the first particular emotion in the fourth emotion quadrant has a second horizontal coordinate (e.g., 5 as the x-coordinate) and a second vertical coordinate (e.g., −10 as the y-coordinate). The second horizontal coordinate (e.g., 5) is negative of the first vertical coordinate (e.g., −5), and the second vertical coordinate (e.g., −10) is negative of the first horizontal coordinate (e.g., 10). The emotion adjustment data 449C indicates that the first particular emotion maps to the second particular emotion, and vice versa.

The emotion adjustment data 449C indicating four mappings is provided as an illustrative example. In other examples, the emotion adjustment data 449C can include fewer than four mappings or more than four mappings.

When the operation mode 105C (e.g., Fluent) is selected, the emotion adjustment data 449C causes the embedding selector 156 to select a target emotion (e.g., the emotion 267 of the target characteristic 177) that enables the audio analyzer 140 to generate the output signal 135 of FIG. 1 corresponding to a complementary emotion in the same emotion quadrant relative to the original emotion (e.g., the emotion 267 of the input characteristic 155) of the input speech representation 149.

Figure 5D:
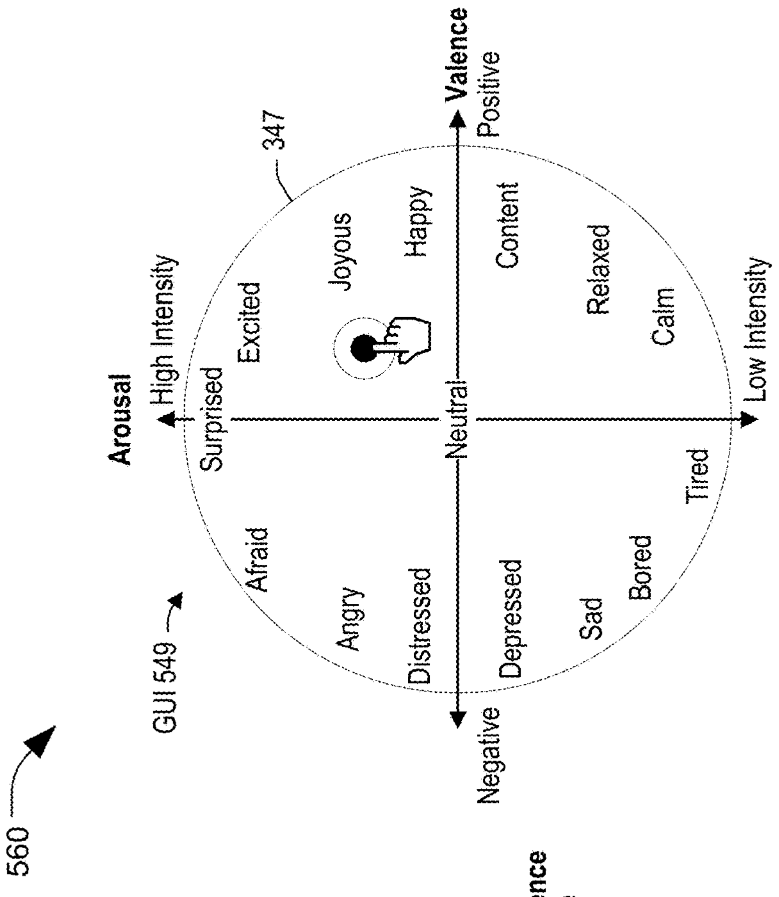
FIG. 5D is a diagram of an illustrative aspect of operations of an emotion adjuster of an embedding selector of FIG. 4, in accordance with some examples of the present disclosure.

Referring to FIG. 5D, a diagram 560 of an illustrative aspect of operations of the emotion adjuster 452 of FIG. 4 is shown. The diagram 560 includes an example of the operation mode 105 corresponding to a user input indicating a target emotion.

In a particular example, the user input corresponds to a selection of the target emotion of the emotion map 347 via a graphical user interface (GUI) 549. In this example, the emotion adjuster 452 selects the target emotion as the emotion 267 of the target characteristic 177.

Figure 6:
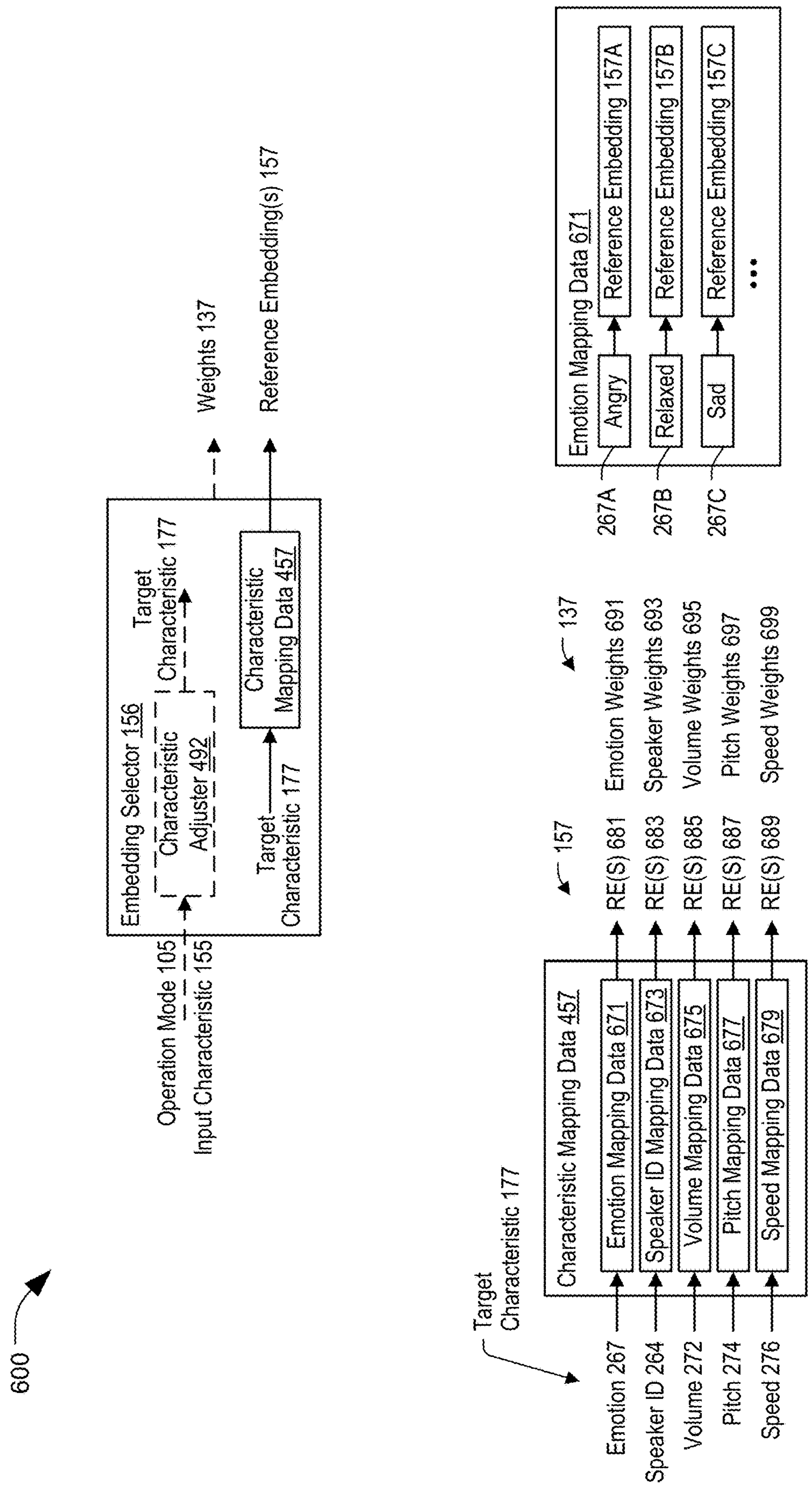
FIG. 6 is a diagram of an illustrative aspect of operations of an embedding selector of the system of FIG. 1, in accordance with some examples of the present disclosure.

Referring to FIG. 6, a diagram 600 of an illustrative aspect of operations of the embedding selector 156 is shown. The embedding selector 156 is configured to select one or more reference embeddings 157 based on the target characteristic 177.

The embedding selector 156 includes characteristic mapping data 457 that maps characteristics to reference embeddings. In a particular aspect, the characteristic mapping data 457 includes emotion mapping data 671 that maps emotions 267 to reference embeddings. For example, the emotion mapping data 671 indicates that an emotion 267A (e.g., Angry) is associated with a reference embedding 157A. As another example, the emotion mapping data 671 indicates that an emotion 267B (e.g., Relaxed) is associated with a reference embedding 157B. In yet another example, the emotion mapping data 671 indicates that an emotion 267C (e.g., Sad) is associated with a reference embedding 157C. The emotion mapping data 671 including mappings for three emotions is provided as an illustrative example. In other examples, the emotion mapping data 671 can include mappings for fewer than three emotions or more than three emotions.

In some aspects, the emotion 267 of the target characteristic 177 is included in the emotion mapping data 671 and the embedding selector 156 selects a corresponding reference embedding 157 as one or more reference embeddings 681 associated with the emotion 267. In an example, the emotion 267 corresponds to the emotion 267A (e.g., angry). In this example, the embedding selector 156, in response to determining that the emotion mapping data 671 indicates that the emotion 267A (e.g., angry) corresponds to the reference embedding 157A, selects the reference embedding 157A as the one or more reference embeddings 681 associated with the emotion 267.

In some aspects, the emotion 267 of the target characteristic 177 is not included in the emotion mapping data 671 and the embedding selector 156 selects reference embeddings 157 associated with multiple emotions as reference embeddings 681, as further described with reference to FIG. 7A. In some implementations, the embedding selector 156 also generates emotion weights 691 associated with the reference embeddings 681. The weights 137 include the emotion weights 691, if any, and the one or more reference embeddings 157 include the one or more reference embeddings 681.

In a particular aspect, the characteristic mapping data 457 includes speaker identifier mapping data 673 that maps speaker identifiers to reference embeddings. For example, the speaker identifier mapping data 673 indicates that a first speaker identifier (e.g., a first user identifier) is associated with a reference embedding 157A. As another example, the speaker identifier mapping data 673 indicates that a second speaker identifier (e.g., a second speaker identifier) is associated with a reference embedding 157B. The speaker identifier mapping data 673 including two mappings for two speaker identifiers is provided as an illustrative example. In other examples, the speaker identifier mapping data 673 can include mappings for fewer than two speaker identifiers or more than two speaker identifiers.

In some aspects, the speaker identifier 264 of the target characteristic 177 is included in the speaker identifier mapping data 673. For example, the embedding selector 156, in response to determining that the speaker identifier mapping data 673 indicates that the speaker identifier 264 (e.g., the first speaker identifier) corresponds to the reference embedding 157A, selects the reference embedding 157A as one or more reference embeddings 683 associated with the speaker identifier 264.

In some aspects, the speaker identifier 264 of the target characteristic 177 includes multiple speaker identifiers. For example, the source speech is to be updated to sound like a combination of multiple speakers in the output speech. The embedding selector 156 selects reference embeddings 157 associated with the multiple speaker identifiers as reference embeddings 683 and generates speaker weights 693 associated with the reference embeddings 683. For example, the embedding selector 156, in response to determining that the speaker identifier 264 includes the first speaker identifier and the second speaker identifier that are indicated by the speaker identifier mapping data 673 as mapping to the reference embedding 157A and the reference embedding 157B, respectively, selects the reference embedding 157A and the reference embedding 157B as the reference embeddings 683. In a particular aspect, the speaker weights 693 correspond to equal weight for each of the reference embeddings 683. In another aspect, the operation mode 105 includes user input indicating a first speaker weight associated with the first speaker identifier and a second speaker weight associated with the second speaker identifier, and the speaker weights 693 include the first speaker weight for the reference embedding 157A and the second speaker weight for the reference embedding 157B of the one or more reference embeddings 683. The weights 137 include the speaker weights 693, if any, and the one or more reference embeddings 157 include the one or more reference embeddings 683.

In a particular aspect, the characteristic mapping data 457 includes volume mapping data 675 that maps particular volumes to reference embeddings. For example, the volume mapping data 675 indicates that a first volume (e.g., high) is associated with a reference embedding 157A. As another example, the volume mapping data 675 indicates that a second volume (e.g., low) is associated with a reference embedding 157B. The volume mapping data 675 including two mappings for two volumes is provided as an illustrative example. In other examples, the volume mapping data 675 can include mappings for fewer than two volumes or more than two volumes.

In some aspects, the embedding selector 156, in response to determining that the volume mapping data 675 indicates that the volume 272 (e.g., the first volume) of the target characteristic 177 corresponds to the reference embedding 157A, selects the reference embedding 157A as one or more reference embeddings 685 associated with the volume 272. The one or more reference embeddings 157 include the one or more reference embeddings 685.

In some aspects, the volume 272 (e.g., medium) of the target characteristic 177 is not included in the volume mapping data 675 and the embedding selector 156 selects reference embeddings 157 associated with multiple volumes as reference embeddings 685. For example, the embedding selector 156 selects the reference embedding 157A and the reference embedding 157B corresponding to the first volume (e.g., high) and the second volume (e.g., low), respectively, as the reference embeddings 685. To illustrate, the embedding selector 156 selects a next volume greater than the volume 272 and a next volume less than the volume 272 that are included in the volume mapping data 675.

In some implementations, the embedding selector 156 also generates volume weights 695 associated with the reference embeddings 685. For example, the volume weights 695 include a first weight for the reference embedding 157A and a second weight for the reference embedding 157B. The first weight is based on a difference between the volume 272 (e.g., medium) and the first volume (e.g., high). The second weight is based on a difference between the volume 272 (e.g., medium) and the second volume (e.g., low). The weights 137 include the volume weights 695, if any, and the one or more reference embeddings 157 include the one or more reference embeddings 685.

In a particular aspect, the characteristic mapping data 457 includes pitch mapping data 677 that maps particular pitches to reference embeddings. For example, the pitch mapping data 677 indicates that a first pitch (e.g., high) is associated with a reference embedding 157A. As another example, the pitch mapping data 677 indicates that a second pitch (e.g., low) is associated with a reference embedding 157B. The pitch mapping data 677 including two mappings for two pitches is provided as an illustrative example. In other examples, the pitch mapping data 677 can include mappings for fewer than two pitches or more than two pitches.

In some aspects, the embedding selector 156, in response to determining that the pitch mapping data 677 indicates that the pitch 274 (e.g., the first pitch) of the target characteristic 177 corresponds to the reference embedding 157A, selects the reference embedding 157A as one or more reference embeddings 687 associated with the pitch 274. The one or more reference embeddings 157 include the one or more reference embeddings 687.

In some aspects, the pitch 274 (e.g., medium) of the target characteristic 177 is not included in the pitch mapping data 677 and the embedding selector 156 selects reference embeddings 157 associated with multiple pitches as reference embeddings 687. For example, the embedding selector 156 selects the reference embedding 157A and the reference embedding 157B corresponding to the first pitch (e.g., high) and the second pitch (e.g., low), respectively, as the reference embeddings 687. To illustrate, the embedding selector 156 selects a next pitch greater than the pitch 274 and a next pitch less than the pitch 274 that are included in the pitch mapping data 677.

In some implementations, the embedding selector 156 also generates pitch weights 697 associated with the reference embeddings 687. For example, the pitch weights 697 include a first weight for the reference embedding 157A and a second weight for the reference embedding 157B. The first weight is based on a difference between the pitch 274 (e.g., medium) and the first pitch (e.g., high). The second weight is based on a difference between the pitch 274 (e.g., medium) and the second pitch (e.g., low). The weights 137 include the pitch weights 697, if any, and the one or more reference embeddings 157 include the one or more reference embeddings 687.

In a particular aspect, the characteristic mapping data 457 includes speed mapping data 679 that maps particular speeds to reference embeddings. For example, the speed mapping data 679 indicates that a first speed (e.g., high) is associated with a reference embedding 157A. As another example, the speed mapping data 679 indicates that a second speed (e.g., low) is associated with a reference embedding 157B. The speed mapping data 679 including two mappings for two speeds is provided as an illustrative example. In other examples, the speed mapping data 679 can include mappings for fewer than two speeds or more than two speeds.

In some aspects, the embedding selector 156, in response to determining that the speed mapping data 679 indicates that the speed 276 (e.g., the first speed) of the target characteristic 177 corresponds to the reference embedding 157A, selects the reference embedding 157A as one or more reference embeddings 689 associated with the speed 276. The one or more reference embeddings 157 include the one or more reference embeddings 689.

In some aspects, the speed 276 (e.g., medium) of the target characteristic 177 is not included in the speed mapping data 679 and the embedding selector 156 selects reference embeddings 157 associated with multiple speeds as reference embeddings 689. For example, the embedding selector 156 selects the reference embedding 157A and the reference embedding 157B corresponding to the first speed (e.g., high) and the second speed (e.g., low), respectively, as the reference embeddings 689. To illustrate, the embedding selector 156 selects a next speed greater than the speed 276 and a next speed less than the speed 276 that are included in the speed mapping data 679.

In some implementations, the embedding selector 156 also generates speed weights 699 associated with the reference embeddings 689. For example, the speed weights 699 include a first weight for the reference embedding 157A and a second weight for the reference embedding 157B. The first weight is based on a difference between the speed 276 (e.g., medium) and the first speed (e.g., high). The second weight is based on a difference between the speed 276 (e.g., medium) and the second speed (e.g., low). The weights 137 include the speed weights 699, if any, and the one or more reference embeddings 157 include the one or more reference embeddings 689.

Figure 7A:
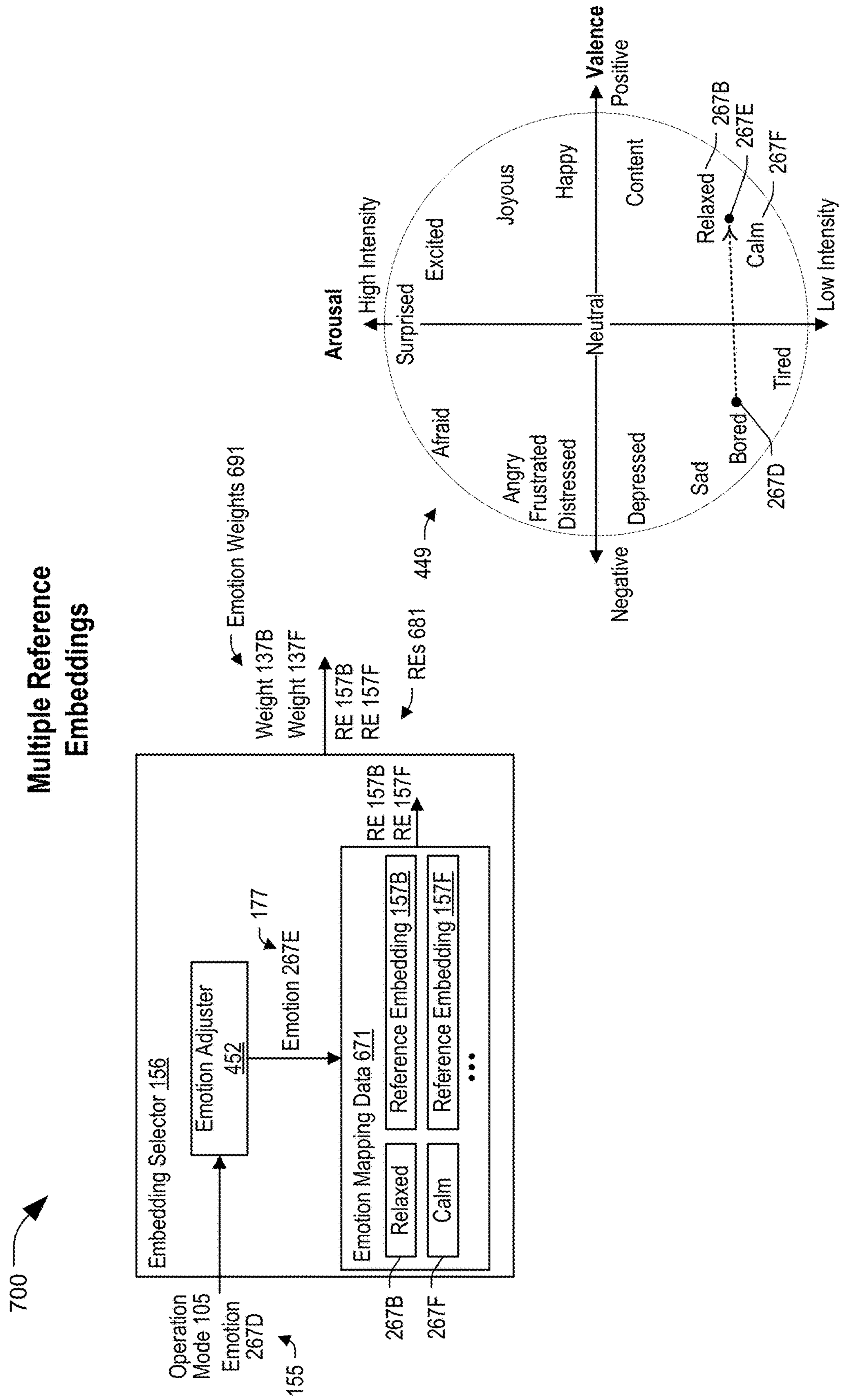
FIG. 7A is a diagram of an illustrative aspect of operations of an embedding selector of the system of FIG. 1, in accordance with some examples of the present disclosure.

Referring to FIG. 7A, a diagram 700 of an illustrative aspect of operations of the embedding selector 156 is shown. The input characteristic 155 includes an emotion 267D (e.g., Bored). The emotion adjuster 452 selects emotion adjustment data 449 based on the operation mode 105. For example, if the operation mode 105 includes the operation mode 105A (e.g., Positive Uplift), the emotion adjuster 452 selects the emotion adjustment data 449A associated with the operation mode 105A, as described with reference to FIG. 4. As another example, if the operation mode 105 includes the operation mode 105B (e.g., Complementary), the emotion adjuster 452 selects the emotion adjustment data 449B associated with the operation mode 105B, as described with reference to FIG. 4.

The emotion adjuster 452 determines that the emotion adjustment data 449 indicates that the emotion 267D (e.g., Bored) maps to an emotion 267E. The emotion adjuster 452 updates the target characteristic 177 to include the emotion 267E. The emotion adjuster 452, in response to determining that the emotion mapping data 671 does not include any reference embedding corresponding to the emotion 267E, selects multiple mappings from the emotion mapping data 671 corresponding to emotions that are within a threshold distance of the emotion 267E in the emotion map 347. For example, the emotion adjuster 452 selects a first mapping for an emotion 267B (e.g., Relaxed) based on determining that the emotion 267B is within a threshold distance of the emotion 267E. As another example, the emotion adjuster 452 selects a second mapping for an emotion 267F (e.g., Calm) based on determining that the emotion 267F is within a threshold distance of the emotion 267E.

The emotion adjuster 452 adds the reference embeddings corresponding to the selected mappings to one or more reference embeddings 681 associated with the emotion 267E. For example, the emotion adjuster 452, in response to determining that the first mapping indicates that the emotion 267B (e.g., Relaxed) corresponds to a reference embedding 157B, includes the reference embedding 157B in the one or more reference embeddings 681 associated with the emotion 267E. In a particular aspect, the emotion adjuster 452 determines a weight 137B based on a distance between the emotion 267E and the emotion 267B (e.g., Relaxed) and includes the weight 137B in the emotion weights 691.

In another example, the emotion adjuster 452, in response to determining that the second mapping indicates that the emotion 267F (e.g., Calm) corresponds to a reference embedding 157F, includes the reference embedding 157F in the one or more reference embeddings 681 associated with the emotion 267E. In a particular aspect, the emotion adjuster 452 determines a weight 137F based on a distance between the emotion 267E and the emotion 267F (e.g., Calm) and includes the weight 137F in the emotion weights 691.

The emotion adjuster 452 thus selects multiple reference embeddings 157 (e.g., the reference embedding 157B and the reference embedding 157F) as the one or more reference embeddings 681 that can be combined to generate an estimated emotion embedding corresponding to the emotion 267E, as further described with reference to FIG. 8A. The one or more reference embeddings 681 are combined based on the emotion weights 691.

Figure 7B:
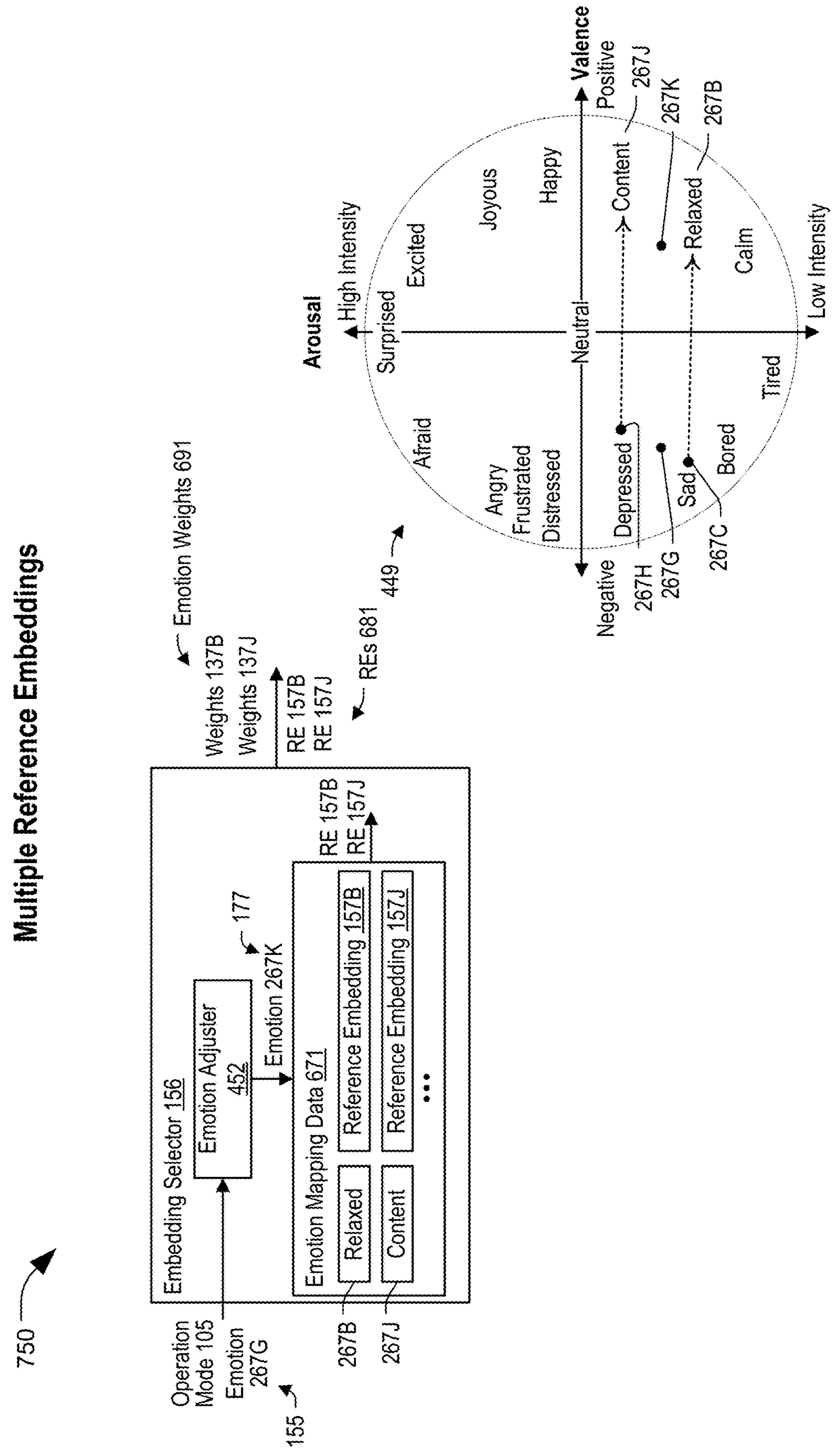
FIG. 7B is a diagram of an illustrative aspect of operations of an embedding selector of the system of FIG. 1, in accordance with some examples of the present disclosure.

Referring to FIG. 7B, a diagram 750 of an illustrative aspect of operations of the embedding selector 156 is shown. The emotion adjuster 452 selects emotion adjustment data 449 based on the operation mode 105.

In an example, the emotion adjustment data 449 includes a first mapping indicating that an emotion 267C (e.g., Sad) maps to the emotion 267B (e.g., Relaxed) and a second mapping indicating that an emotion 267H (e.g., Depressed) maps to the emotion 267J (e.g., Content). In an example, the emotion mapping data 671 indicates that an emotion 267B (e.g., Relaxed) maps to a reference embedding 157B and that an emotion 267J (e.g., Content) maps to a reference embedding 157J. In a particular aspect, the emotion adjustment data 449 includes mapping to emotions for which the emotion mapping data 671 includes reference embeddings.

The input characteristic 155 includes an emotion 267G. The emotion adjuster 452, in response to determining that the emotion adjustment data 449 does not include any mapping corresponding to the emotion 267G, selects multiple mappings from the emotion adjustment data 449 corresponding to emotions that are within a threshold distance of the emotion 267G in the emotion map 347. For example, the emotion adjuster 452 selects the first mapping (e.g., from the emotion 267H to the emotion 267J) based on determining that the emotion 267H is within a threshold distance of the emotion 267G. As another example, the emotion adjuster 452 selects the second mapping (e.g., from the emotion 267C to the emotion 267B) based on determining that the emotion 267C is within a threshold distance of the emotion 267G.

In a particular implementation, the emotion adjuster 452 estimates that the emotion 267G maps to an emotion 267K based on determining that the emotion 267K is the same relative distance from the emotion 267J (e.g., Content) and the emotion 267B (e.g., Relaxed) as the emotion 267G is from the emotion 267H (e.g., Depressed) and the emotion 267C (e.g., Sad). The target characteristic 177 includes the emotion 267K.

The emotion adjuster 452, in response to determining that the emotion mapping data 671 does not indicate any reference embeddings corresponding to the emotion 267K, selects multiple mappings from the emotion mapping data 671 to determine the reference embeddings corresponding to the emotion 267K, as described with reference to the emotion 267E in FIG. 7A. For example, the emotion adjuster 452 selects a first mapping for the emotion 267B (e.g., Relaxed) and a second mapping for the emotion 267J (e.g., Content) from the emotion mapping data 671.

The emotion adjuster 452 adds the reference embeddings corresponding to the selected mappings to one or more reference embeddings 681 associated with the emotion 267K. For example, the emotion adjuster 452 adds the reference embedding 157B and the reference embedding 157J corresponding to the emotion 267B and the emotion 267J, respectively, to the one or more reference embeddings 681.

In a particular aspect, the emotion adjuster 452 determines a weight 137J based on a distance between the emotion 267J and the emotion 267K, a distance between the emotion 267H and the emotion 267G, or both. In a particular aspect, the emotion adjuster 452 determines a weight 137B based on a distance between the emotion 267B and the emotion 267K, a distance between the emotion 267C and the emotion 267G, or both. The emotion weights 691 include the weight 137B and the weight 137J.

The emotion adjuster 452 thus selects multiple reference embeddings 157 (e.g., the reference embedding 157B and the reference embedding 157J) as the one or more reference embeddings 681 that can be combined to generate an estimated emotion embedding, as further described with reference to FIG. 8A, corresponding to the emotion 267K that is an estimated target emotion for the emotion 267G. The one or more reference embeddings 681 are combined based on the emotion weights 691.

Figure 8A:
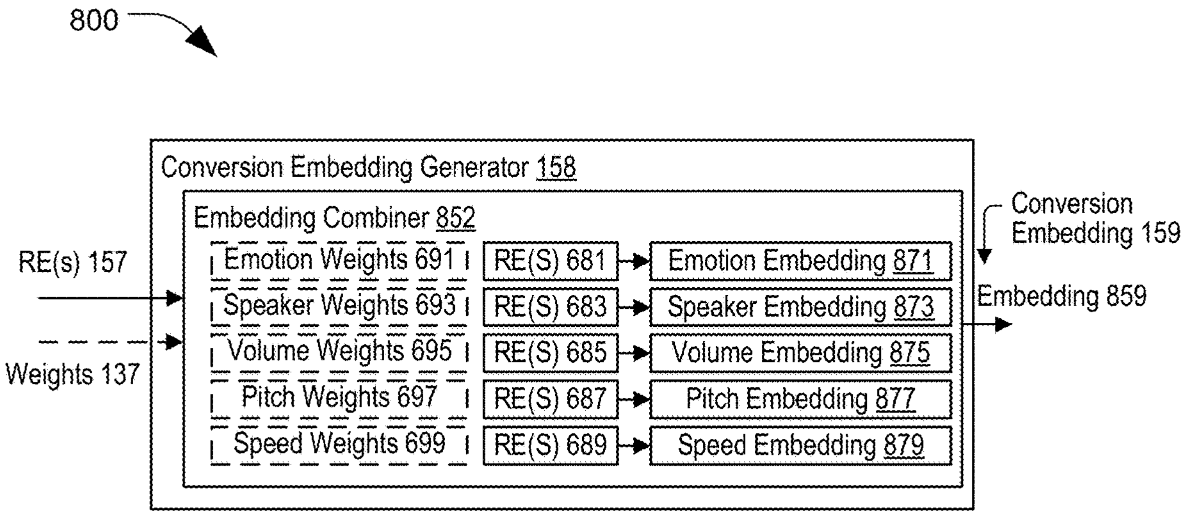
FIG. 8A is a diagram of an illustrative aspect of operations of a conversion embedding generator of the system of FIG. 1, in accordance with some examples of the present disclosure.

Referring to FIG. 8A, a diagram 800 of an illustrative aspect of operations of an illustrative implementation of the conversion embedding generator 158 is shown. The conversion embedding generator 158 includes an embedding combiner 852 that is configured to generate an embedding 859 based at least in part on the one or more reference embeddings 157.

The embedding combiner 852, in response to determining that the one or more reference embeddings 157 include a single reference embedding, designates the single reference embedding as the embedding 859. Alternatively, the embedding combiner 852, in response to determining that the one or more reference embeddings 157 include multiple reference embeddings, combines the multiple reference embeddings to generate the embedding 859.

In a particular aspect, the embedding combiner 852, in response to determining that the one or more reference embeddings 157 include multiple reference embeddings, generates a particular reference embedding for a corresponding type of characteristic. In an example, the embedding combiner 852 combines the one or more reference embeddings 681 to generate an emotion embedding 871, combines the one or more reference embeddings 683 to generate a speaker embedding 873, combines the one or more reference embeddings 685 to generate a volume embedding 875, combines the one or more reference embeddings 687 to generate a pitch embedding 877, combines the one or more reference embeddings 689 to generate a speed embedding 879, or a combination thereof.

In some aspects, the embedding combiner 852 combines multiple reference embeddings for a particular type of characteristic based on corresponding weights. For example, the embedding combiner 852 combines the one or more reference embeddings 681 based on the emotion weights 691. To illustrate, the emotion weights 691 include a first weight for a reference embedding 157A of the one or more reference embeddings 681 and a second weight for a reference embedding 157B of the one or more reference embeddings 681. The embedding combiner 852 applies the first weight to the reference embedding 157A to generate a first weighted reference embedding and applies the second weight to the reference embedding 157B to generate a second weighted reference embedding. In some examples, the reference embedding 157 corresponds to a set (e.g., a vector) of speech feature values and applying a particular weight to the reference embedding 157 corresponds to multiplying each of the speech feature values and the particular weight to generate a weighted reference embedding. The embedding combiner 852 generates an emotion embedding 871 based on a combination (e.g., a sum) of the first weighted reference embedding and the second weighted reference embedding.

In some aspects, the embedding combiner 852 combines multiple reference embeddings for a particular type of characteristic independently of (e.g., without) corresponding weights. In an example, the embedding combiner 852, in response to determining that the speaker weights 693 are unavailable, combines the one or more reference embeddings 683 with equal weight for each of the one or more reference embeddings 683. To illustrate, the embedding combiner 852 generates the speaker embedding 873 as a combination (e.g., an average) of a reference embedding 157A of the one or more reference embeddings 683 and a reference embedding 157B of the one or more reference embeddings 683.

The embedding combiner 852 generates the embedding 859 as a combination of the particular reference embeddings for corresponding types of characteristic. For example, the embedding combiner 852 generates the embedding 859 as a combination (e.g., a concatenation) of the emotion embedding 871, the speaker embedding 873, the volume embedding 875, the pitch embedding 877, the speed embedding 879, or a combination thereof. In a particular aspect, the embedding 859 represents the target characteristic 177. In a particular aspect, the embedding 859 is used as the conversion embedding 159.

Figure 8B:
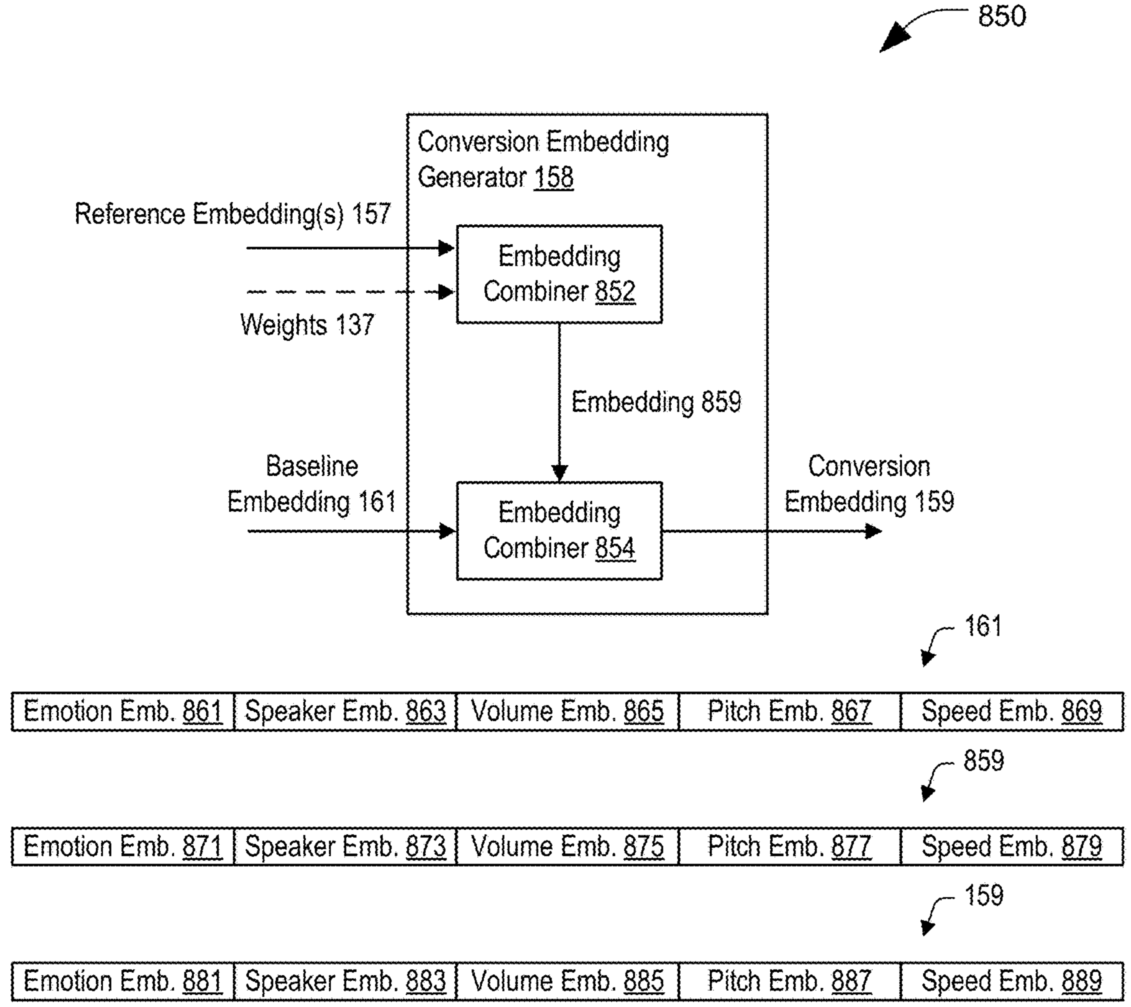
FIG. 8B is a diagram of an illustrative aspect of operations of a conversion embedding generator of the system of FIG. 1, in accordance with some examples of the present disclosure.

Referring to FIG. 8B, a diagram 850 of an illustrative aspect of operations of another illustrative implementation of the conversion embedding generator 158 is shown. The conversion embedding generator 158 includes an embedding combiner 854 coupled to the embedding combiner 852.

The embedding combiner 854 is configured to combine the embedding 859 with a baseline embedding 161 to generate a conversion embedding 159. In a particular aspect, the embedding combiner 854, in response to determining that no baseline embedding associated with an audio analysis session is available, designates the embedding 859 as the conversion embedding 159 and stores the conversion embedding 159 as the baseline embedding 161.

The embedding combiner 854, in response to determining that a baseline embedding 161 associated with an on-going audio analysis session is available, generates the conversion embedding 159 based on a combination of the embedding 859 and the baseline embedding 161. In an example, the conversion embedding 159 corresponds to a combination (e.g., concatenation) of an emotion embedding 861, a speaker embedding 863, a volume embedding 865, a pitch embedding 867, a speed embedding 869, or a combination thereof.

The embedding combiner 854 generates the conversion embedding 159 corresponding to a combination (e.g., concatenation) of an emotion embedding 881, a speaker embedding 883, a volume embedding 885, a pitch embedding 887, a speed embedding 889, or a combination thereof.

The embedding combiner 854 generates a characteristic embedding of the conversion embedding 159 based on a first corresponding characteristic embedding of the baseline embedding 161, a second corresponding characteristic embedding of the embedding 859, or both. For example, the embedding combiner 854 generates the emotion embedding 881 as a combination (e.g., average) of the emotion embedding 861 and the emotion embedding 871. To illustrate, the emotion embedding 861 includes a first set of speech feature values (e.g., x1, x2, x3, . . . ) and the emotion embedding 871 includes a second set of speech feature values (e.g., y1, y2, y3, etc.). The embedding combiner 854 generates the emotion embedding 881 including a third set of speech feature values (e.g., z1, z2, z3, etc.), where each Nth speech feature value (zN) of the third set of speech feature values is an average of a corresponding Nth speech feature value (xN) of the first set of speech feature values and a corresponding Nth feature value (yN) of the second set of speech feature values.

In some examples, one of the emotion embedding 861 or the emotion embedding 871 is available but not both, because either the baseline embedding 161 does not include the emotion embedding 861 or the embedding 859 does not include the emotion embedding 871. In these examples, the emotion embedding 881 includes the one of the emotion embedding 861 or the emotion embedding 871 that is available. In some examples, neither the emotion embedding 861 nor the emotion embedding 871 is available. In these examples, the conversion embedding 159 does not include the emotion embedding 881.

Similarly, the embedding combiner 854 generates the speaker embedding 883 based on the speaker embedding 863, the speaker embedding 873, or both. As another example, the embedding combiner 854 generates the volume embedding 885 based on the volume embedding 865, the volume embedding 875, or both. As yet another example, the embedding combiner 854 generates the pitch embedding 887 based on the pitch embedding 867, the pitch embedding 877, or both. Similarly, the embedding combiner 854 generates the speed embedding 889 based on the speed embedding 869, the speed embedding 879, or both. In a particular aspect, the embedding combiner 854 stores the conversion embedding 159 as the baseline embedding 161 for generating a conversion embedding 159 based on one or more reference embeddings 157 corresponding to an input speech representation 149 of a subsequent portion of input speech. Using the baseline embedding 161 to generate the conversion embedding 159 can enable gradual changes in the conversion embedding 159 and the output signal 135.

Figure 8C:
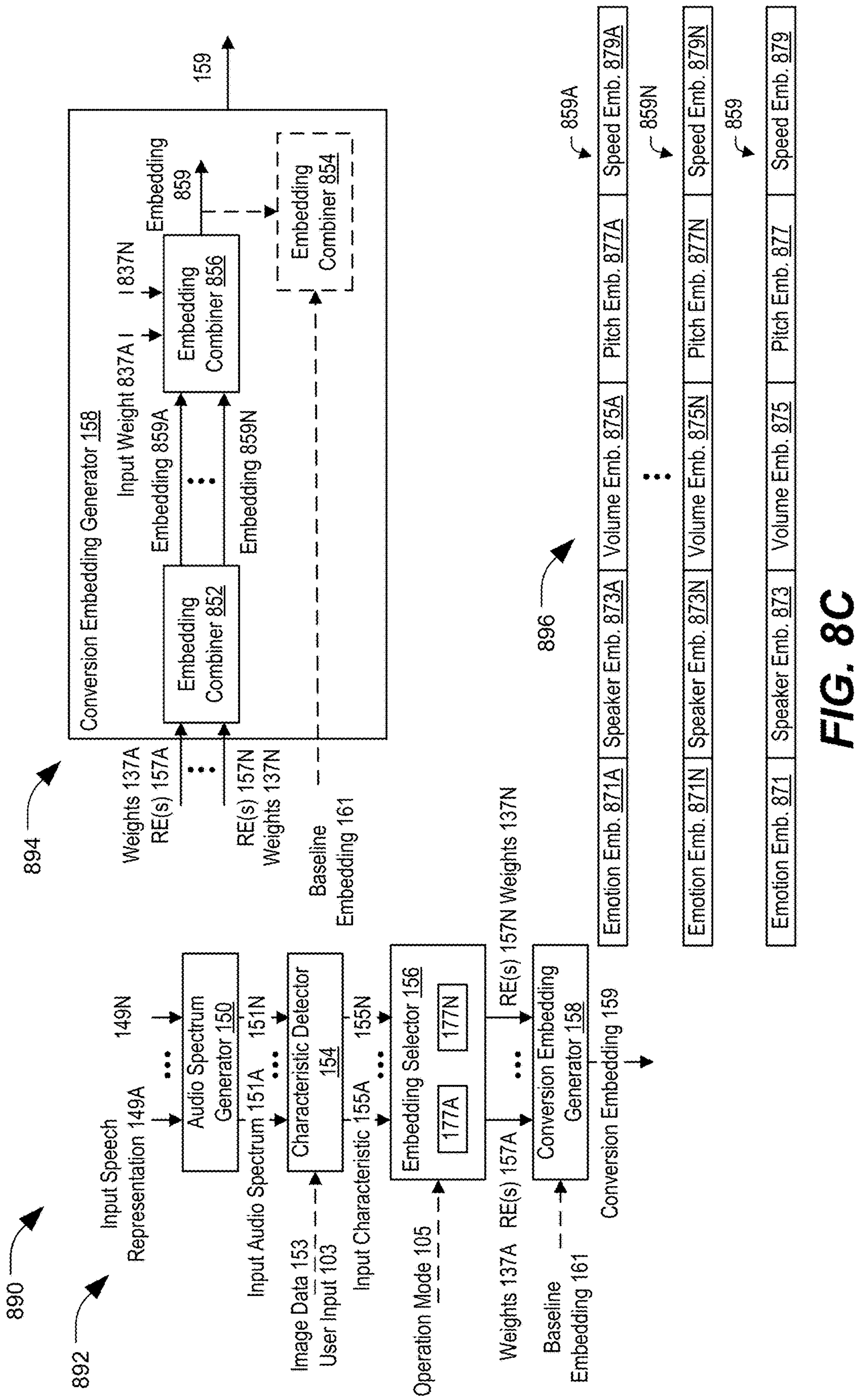
FIG. 8C is a diagram of an illustrative aspect of operations of a conversion embedding generator of the system of FIG. 1, in accordance with some examples of the present disclosure.

Referring to FIG. 8C, a diagram 890 of an illustrative aspect of operations of the conversion embedding generator 158 is shown. The diagram 890 includes an example 892 of components of the audio analyzer 140, an example 894 of an illustrative implementation of the conversion embedding generator 158 of the example 892, and an example 896 of generating an embedding 859 by an embedding combiner 856 of the conversion embedding generator 158 of the example 894.

In the example 892, the audio spectrum generator 150 generates an input audio spectrum 151 corresponding to each of multiple input speech representations 149, such as an input speech representation 149A to an input speech representation 149N, where the input speech representation 149N corresponds to an Nth input representation with N corresponding to a positive integer greater than 1. For example, the audio spectrum generator 150 processes the input speech representation 149A to generate an input audio spectrum 151A, as described with reference to FIG. 1. Similarly, the audio spectrum generator 150 generates one or more additional input audio spectrums 151. For example, the audio spectrum generator 150 processes the input speech representation 149N to generate an input audio spectrum 151N, as described with reference to FIG. 1.

The characteristic detector 154 determines input characteristics 155 corresponding to each of the input audio spectrums 151. For example, the characteristic detector 154 processes the input audio spectrum 151A to determine the input characteristic 155A, as described with reference to FIG. 1. Similarly, the characteristic detector 154 determines one or more additional input characteristics 155. For example, the characteristic detector 154 processes the input audio spectrum 151N to determine the input characteristic 155N, as described with reference to FIG. 1.

The embedding selector 156 determines target characteristics 177 and one or more reference embeddings 157 corresponding to each of the input characteristics 155. For example, the embedding selector 156 determines a target characteristic 177A corresponding to the input characteristic 155A and determines reference embedding 157A, weights 137A, or a combination thereof, corresponding to the target characteristic 177A, as described with reference to FIG. 1. Similarly, the embedding selector 156 determines one or more additional target characteristics 177 and one or more additional reference embeddings 157 corresponding to each of the input characteristics 155. For example, the embedding selector 156 determines a target characteristic 177N corresponding to the input characteristic 155N and determines reference embedding 157N, weights 137N, or a combination thereof, corresponding to the target characteristic 177N, as described with reference to FIG. 1.

The conversion embedding generator 158 generates a conversion embedding 159 based on the multiple sets of reference embeddings 157, weights 137, or both. In the example 894, the embedding combiner 852 is coupled to an embedding combiner 856. Optionally, in some implementations, the embedding combiner 856 is coupled to the embedding combiner 854.

The embedding combiner 852 generates an embedding 859 corresponding to each set of one or more reference embeddings 157, weights 137, or both. For example, the embedding combiner 852 generates an embedding 859A corresponding to the one or more reference embeddings 157A, the weights 137A, or combination thereof, as described with reference to FIG. 8A. Similarly, the embedding combiner 852 generates one or more additional embeddings 859 corresponding to each set of the one or more reference embeddings 157, the weights 137, or a combination thereof. For example, the embedding combiner 852 generates an embedding 859N corresponding to the one or more reference embeddings 157N, the weights 137N, or combination thereof, as described with reference to FIG. 8A.

The embedding combiner 856 generates the embedding 859 based on a combination (e.g., an average) of the embedding 859A to the embedding 859N. In a particular aspect, the embedding 859 corresponds to a weighted average of the embedding 859A to the embedding 859N.

As shown in the example 896, the embedding 859A corresponds to a combination (e.g., a concatenation) of at least two of an emotion embedding 871A, a speaker embedding 873A, a volume embedding 875A, a pitch embedding 877A, or a speed embedding 879A. The embedding 859N corresponds to a combination (e.g., a concatenation) of at least two of an emotion embedding 871N, a speaker embedding 873N, a volume embedding 875N, a pitch embedding 877N, or a speed embedding 879N. The embedding combiner 856 generates the embedding 859 corresponding to a combination (e.g., a concatenation) of at least two of an emotion embedding 871, a speaker embedding 873, a volume embedding 875, a pitch embedding 877, or a speed embedding 879. Each of the embedding 859A, the embedding 859N, and the embedding 859 including at least two of an emotion embedding, a speaker embedding, a volume embedding, a pitch embedding, or a speed embedding is provided as an illustrative example. In some examples, one or more of the embedding 859A, the embedding 859N, or the embedding 859 can include a single one of an emotion embedding, a speaker embedding, a volume embedding, a pitch embedding, or a speed embedding.

The embedding combiner 856 generates a characteristic embedding of the embedding 859 based on a first corresponding characteristic embedding of the embedding 859A and additional corresponding characteristic embeddings of one or more additional embeddings 859. For example, the embedding combiner 856 generates the emotion embedding 871 as a combination (e.g., average) of the emotion embedding 871A to the emotion embedding 871N. In some examples, fewer than N emotion embeddings are available and the embedding combiner 856 generates the emotion embedding 871 based on the available emotion embeddings in the embedding 859A to the embedding 859N. In examples in which there are no emotion embeddings included in the embedding 859A to the embedding 859N, the embedding 159 does not include the emotion embedding 871.

Similarly, the embedding combiner 856 generates the speaker embedding 873 based on the speaker embedding 873A to the speaker embedding 873N. As another example, the embedding combiner 856 generates the volume embedding 875 based on the volume embedding 875A to the volume embedding 875N. As yet another example, the embedding combiner 856 generates the pitch embedding 877 based on the pitch embedding 877A to the pitch embedding 877N. Similarly, the embedding combiner 856 generates the speed embedding 879 based on the speed embedding 879A to the speed embedding 879N. In a particular aspect, the embedding 859 corresponds to the conversion embedding 159. In another aspect, the embedding combiner 854 processes the embedding 859 and the baseline embedding 161 to generate the conversion embedding 159, as described with reference to FIG. 8B.

Figure 9:
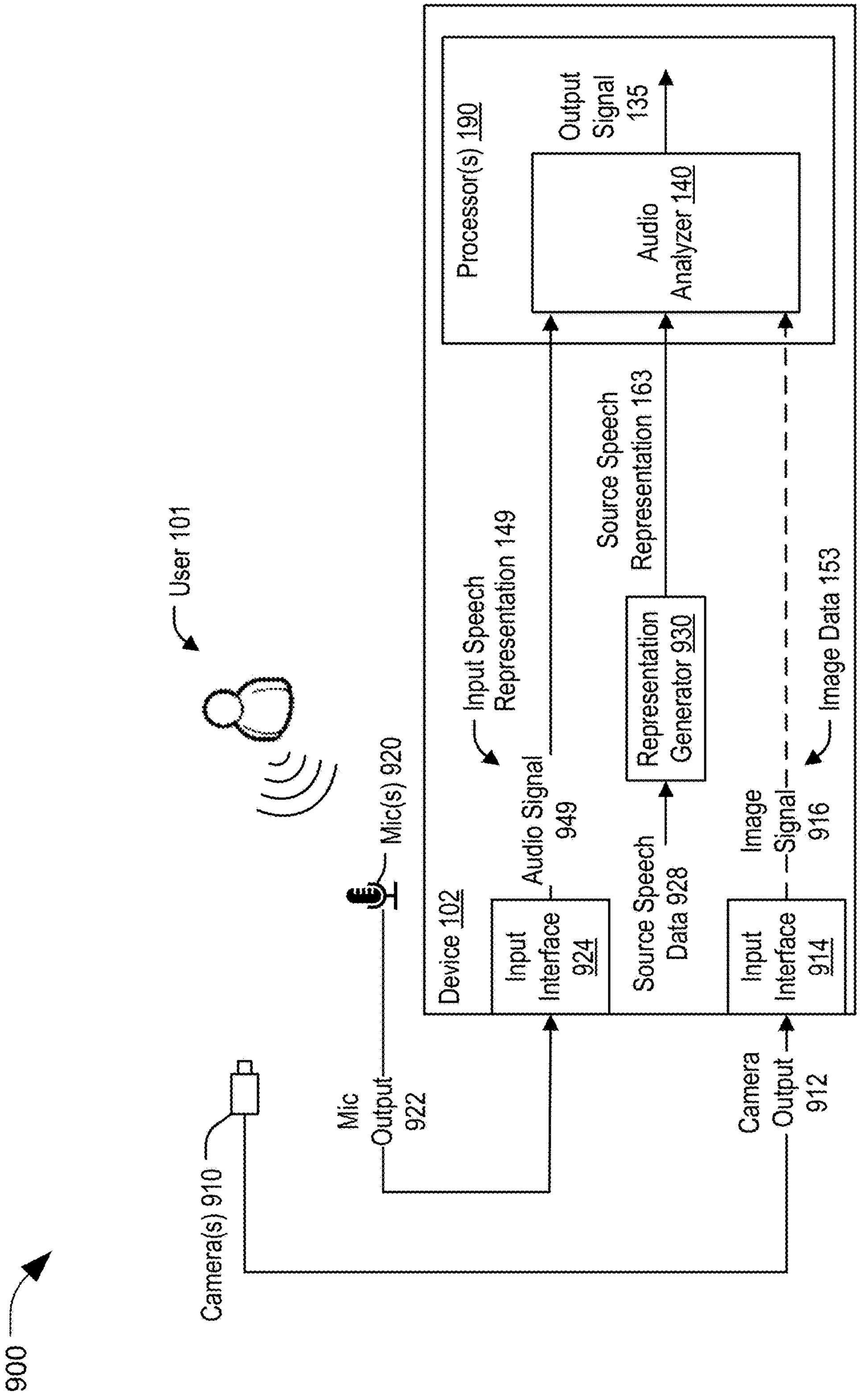
FIG. 9 is a block diagram of an illustrative aspect of a system operable to perform source speech modification based on an input speech characteristic, in accordance with some examples of the present disclosure.

Referring to FIG. 9, a system 900 is shown. The system 900 is operable to perform source speech modification based on an input speech characteristic. In a particular aspect, the system 100 of FIG. 1 includes one or more components of the system 900.

The audio analyzer 140 is coupled to an input interface 914, an input interface 924, or both. The input interface 914 is configured to be coupled to one or more cameras 910. The input interface 924 is configured to be coupled to one or more microphones 920. The one or more cameras 910 and the one or more microphones 920 are illustrated as external to the device 102 as a non-limiting example. In other examples, at least one of the one or more cameras 910, at least one of the one or more microphones 920, or a combination thereof, can be integrated in the device 102.

The one or more cameras 910 are provided as an illustrative non-limiting example of image sensors, in other examples other types of image sensors may be used. The one or more microphones 920 are provided as an illustrative non-limiting example of audio sensors, in other examples other types of audio sensors may be used.

In some aspects, the device 102 includes a representation generator 930 coupled to the audio analyzer 140. The representation generator 930 is configured to process source speech data 928 to generate a source speech representation 163, as further described with reference to FIG. 12.

The audio analyzer 140 receives an audio signal 949 from the input interface 924. The audio signal 949 corresponds to microphone output 922 (e.g., audio data) received from the one or more microphones 920. The input speech representation 149 is based on the audio signal 949. In some examples, the audio signal 949 is used as the source speech data 928. In some examples, the source speech data 928 is generated by an application or other component of the device 102. In some examples, the source speech data 928 corresponds to decoded data, as further described with reference to FIG. 13B.

In some aspects, the audio analyzer 140 receives an image signal 916 from the input interface 914. The image signal 916 corresponds to camera output 912 from the one or more cameras 910. Optionally, in some examples, the image data 153 is based on the image signal 916.

The audio analyzer 140 generates the output signal 135 based on the input speech representation 149 and the source speech representation 163, as described with reference to FIG. 1. Optionally, in some examples, the audio analyzer 140 generates the output signal 135 also based on the image data 153, as described with reference to FIG. 1. In an example, the input speech representation 149 corresponds to input speech of the user 101 captured by the one or more microphones 920 concurrently with the one or more cameras 910 capturing images (e.g., still images or video) corresponding to the image data 153. The source speech corresponding to the source speech data 928 can thus be updated in real-time based on the camera output 912 and the microphone output 922 to generate the output signal 135 corresponding to output speech. In some examples, the audio analyzer 140 outputs the output signal 135 concurrently with the device 102 receiving the microphone output 922, receiving the camera output 912, or both.

Figure 10:
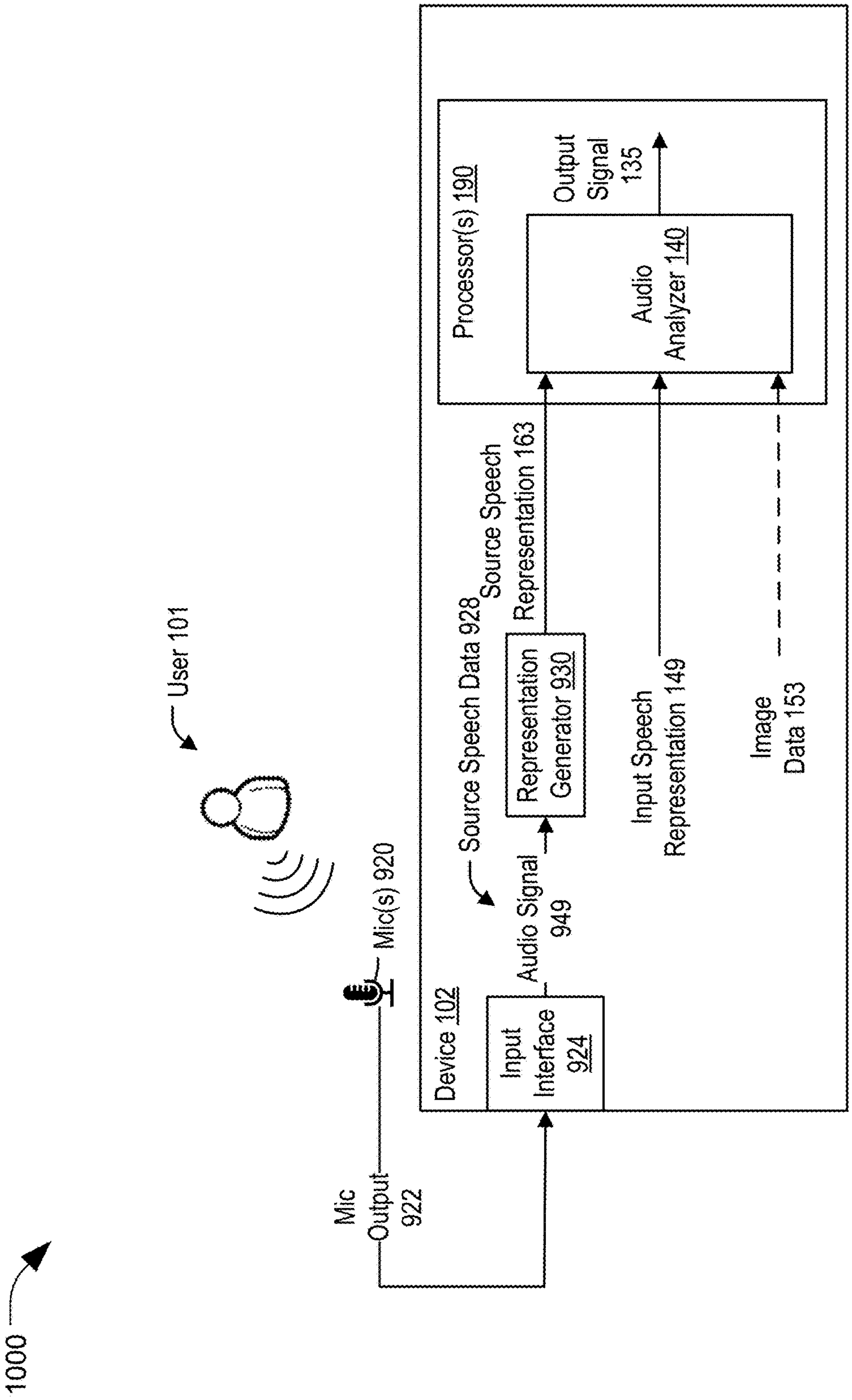
FIG. 10 is a block diagram of an illustrative aspect of a system operable to perform source speech modification based on an input speech characteristic, in accordance with some examples of the present disclosure.

Referring to FIG. 10, a system 1000 is shown. The system 1000 is operable to perform source speech modification based on an input speech characteristic. In a particular aspect, the system 100 of FIG. 1 includes one or more components of the system 1000.

The source speech data 928 is based on the audio signal 949. In some examples, the audio signal 949 is also used as the input speech representation 149. In some examples, the input speech representation 149 is generated by an application or other component of the device 102. In some examples, the input speech representation 149 corresponds to decoded data, as further described with reference to FIG. 13B. The representation generator 930 processes the audio signal 949 as the source speech data 928 to generate the source speech representation 163, as further described with reference to FIG. 12.

In some examples, the image data 153 is based on the image signal 916 of FIG. 9. In some examples, the image data 153 is generated by an application or other component of the device 102. In some examples, the image data 153 corresponds to decoded data, as further described with reference to FIG. 13B.

The audio analyzer 140 generates the output signal 135 based on the input speech representation 149 and the source speech representation 163, as described with reference to FIG. 1. Optionally, in some examples, the audio analyzer 140 generates the output signal 135 also based on the image data 153, as described with reference to FIG. 1. In an example, the source speech data 928 corresponds to source speech of the user 101 captured by the one or more microphones 920. The source speech corresponding to the source speech data 928 can thus be updated in real-time based on the input speech representation 149 and the image data 153 to generate the output signal 135 corresponding to output speech. In some examples, the audio analyzer 140 outputs the output signal 135 concurrently with the device 102 receiving the microphone output 922.

Figure 11:
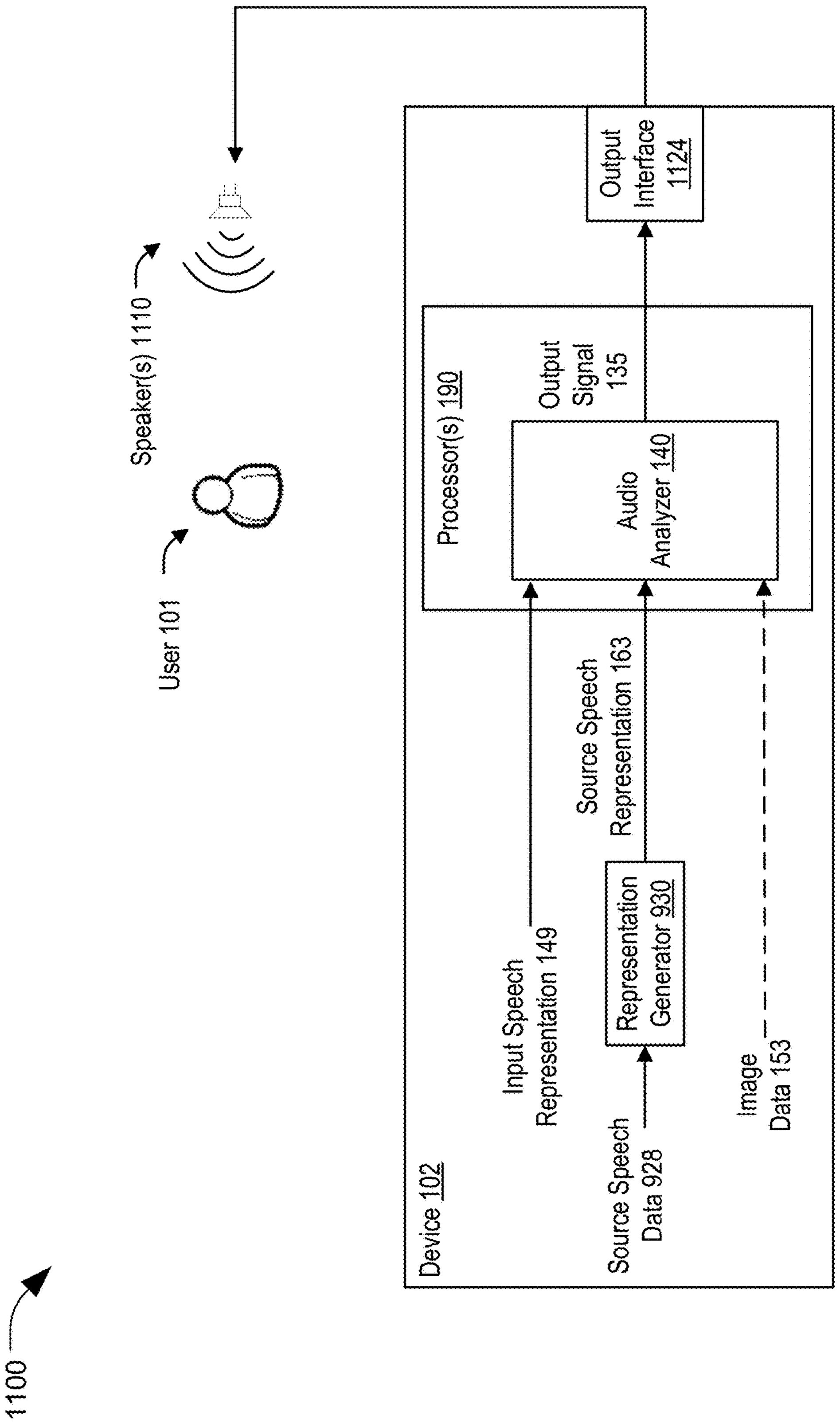
FIG. 11 is a block diagram of an illustrative aspect of a system operable to perform source speech modification based on an input speech characteristic, in accordance with some examples of the present disclosure.

Referring to FIG. 11, a system 1100 is shown. The system 1100 is operable to perform source speech modification based on an input speech characteristic. In a particular aspect, the system 100 of FIG. 1 includes one or more components of the system 1100.

The audio analyzer 140 is coupled to an output interface 1124 that is configured to be coupled to one or more speakers 1110. The one or more speakers 1110 are illustrated as external to the device 102 as a non-limiting example. In other examples, at least one of the one or more speakers 1110 can be integrated in the device 102.

The audio analyzer 140 generates the output signal 135 based on the input speech representation 149 and the source speech representation 163, as described with reference to FIG. 1. Optionally, in some examples, the audio analyzer 140 generates the output signal 135 also based on the image data 153, as described with reference to FIG. 1. The audio analyzer 140 provides the output signal 135 via the output interface 1124 to the one or more speakers 1110. In some examples, the audio analyzer 140 provides the output signal 135 to the one or more speakers 1110 concurrently with the device 102 receiving the microphone output 922 from the one or more microphones 920 of FIG. 9. In some examples, the audio analyzer 140 provides the output signal 135 to the one or more speakers 1110 concurrently with the device 102 receiving the camera output 912 from the one or more cameras 910 of FIG. 9.

Figure 12:
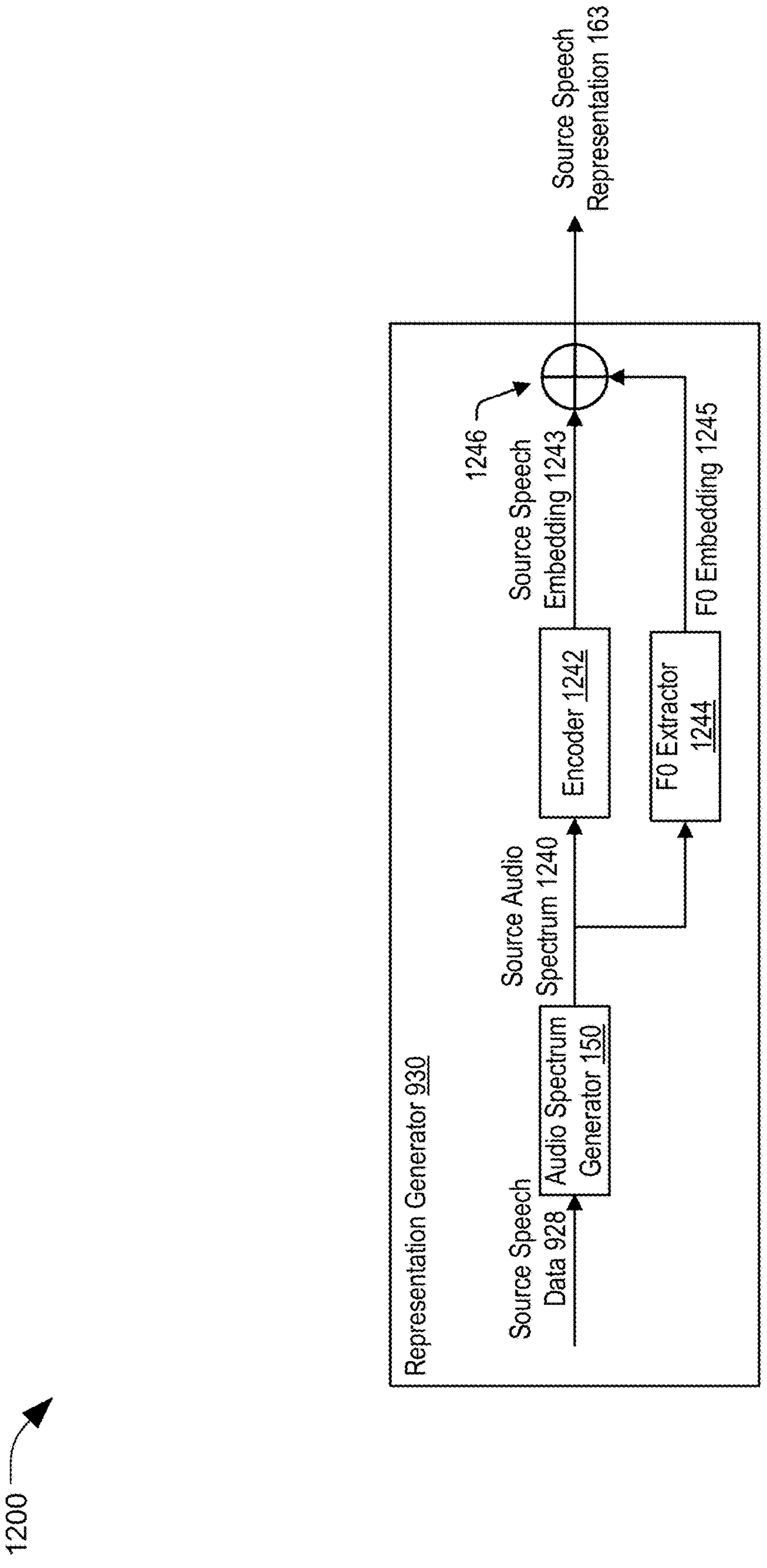
FIG. 12 is a diagram of an illustrative aspect of operations of a representation generator of any of the systems of FIGS. 9-11, in accordance with some examples of the present disclosure.

Referring to FIG. 12, a diagram 1200 of an illustrative aspect of operations of the representation generator 930 is shown. The audio spectrum generator 150 is coupled via an encoder 1242 and a fundamental frequency (F0) extractor 1244 to a combiner 1246.

The audio spectrum generator 150 generates a source audio spectrum 1240 of source speech data 928. In a particular aspect, the source speech data 928 includes source speech audio. In an alternative aspect, the source speech data 928 includes non-audio data and the audio spectrum generator 150 generates source speech audio based on the source speech data 928. In an example, the source speech data 928 includes speech text (e.g., a chat transcript, a screen play, closed captioning text, etc.). The audio spectrum generator 150 generates source speech audio based on the speech text. For example, the audio spectrum generator 150 performs text-to-speech conversion on the speech text to generate the source speech audio. In some examples, the source speech data 928 includes one or more characteristic indicators, such as one or more emotion indicators, one or more speaker indicators, one or more style indicators, or a combination thereof, and the audio spectrum generator 150 generates the source speech audio to have a source characteristic corresponding to the one or more characteristic indicators.

In some implementations, the audio spectrum generator 150 applies a transform (e.g., a fast fourier transform (FFT)) to the source speech audio in the time domain to generate the source audio spectrum 1240 (e.g., a mel-spectrogram) in the frequency domain. FFT is provided as an illustrative example of a transform applied to the source speech audio to generate the source audio spectrum 1240. In other examples, the audio spectrum generator 150 can process the source speech audio using various transforms and techniques to generate the source audio spectrum 1240. The audio spectrum generator 150 provides the source audio spectrum 1240 to the encoder 1242 and to the F0 extractor 1244.

The encoder 1242 (e.g., a spectrum encoder) processes the source audio spectrum 1240 using spectrum encoding techniques to generate a source speech embedding 1243. In a particular aspect, the source speech embedding 1243 represents latent features of the source speech audio. The F0 extractor 1244 processes the source audio spectrum 1240 using fundamental frequency extraction techniques to generate a F0 embedding 1245. In a particular aspect, the F0 extractor 1244 includes a pre-trained joint detection and classification (JDC) network that includes convolutional layers followed by bidirectional long short-term memory (BLSTM) units and the F0 embedding 1245 corresponds to the convolutional output. The combiner 1246 generates the source speech representation 163 corresponding to a combination (e.g., a sum, product, average, or concatenation) of the source speech embedding 1243 and the F0 embedding 1245.

Figure 13A:
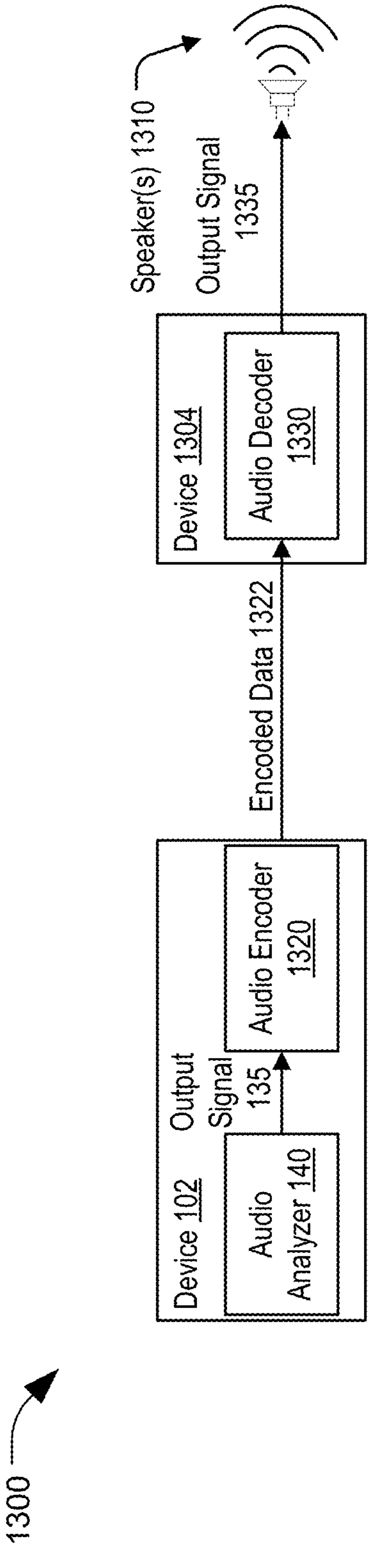
FIG. 13A is a block diagram of an illustrative aspect of a system operable to perform source speech modification based on an input speech characteristic, in accordance with some examples of the present disclosure.

Referring to FIG. 13A, a system 1300 is shown. The system 1300 is operable to perform source speech modification based on an input speech characteristic. The device 102 includes an audio encoder 1320 coupled to the audio analyzer 140. The system 1300 includes a device 1304 that includes an audio decoder 1330.

The device 102 is configured to be coupled to the device 1304. In an example, the device 102 is configured to be coupled via a network to the device 1304. The network can include one or more wireless networks, one or more wired networks, or a combination thereof.

The audio analyzer 140 provides the output signal 135 to the audio encoder 1320. The audio encoder 1320 encodes the output signal 135 to generate encoded data 1322. The audio encoder 1320 provides the encoded data 1322 to the device 1304. The audio decoder 1330 decodes the encoded data 1322 to generate an output signal 1335. In a particular aspect, the output signal 1335 estimates the output signal 135. For example, the output signal 1335 may differ from the output signal 135 due to network loss, coding errors, etc. The audio decoder 1330 outputs the output signal 1335 via the one or more speakers 1310. In a particular aspect, the device 1304 outputs the output signal 1335 via the one or more speakers 1310 concurrently with receiving the encoded data 1322 from the device 102.

Figure 13B:
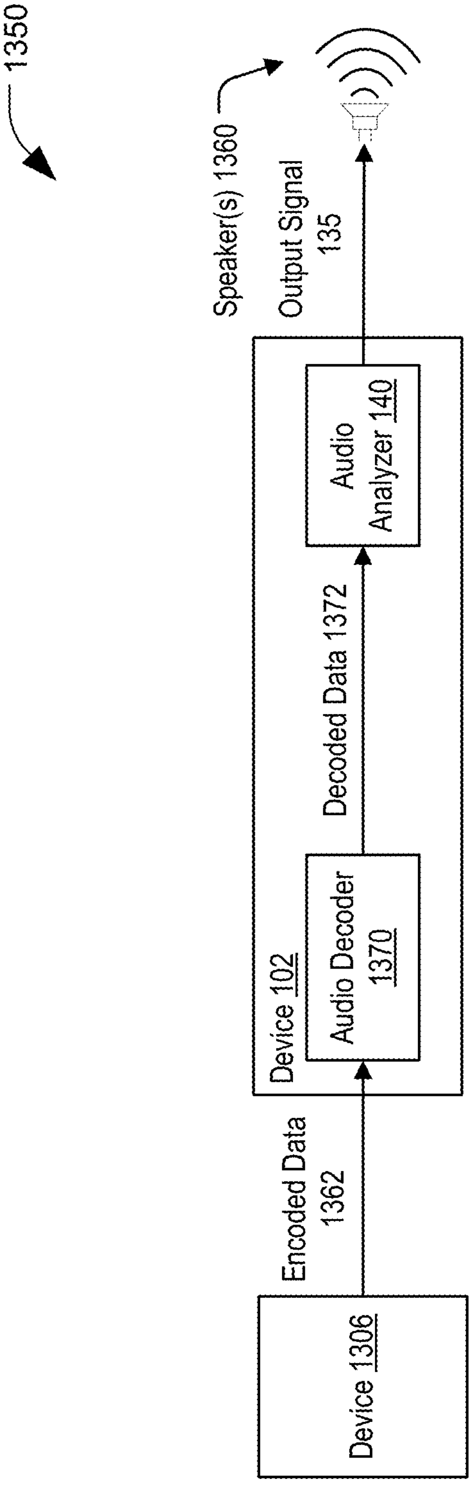
FIG. 13B is a block diagram of an illustrative aspect of a system operable to perform source speech modification based on an input speech characteristic, in accordance with some examples of the present disclosure.

Referring to FIG. 13B, a system 1350 is shown. The system 1350 is operable to perform source speech modification based on an input speech characteristic. The device 102 includes an audio decoder 1370 that is coupled to the audio analyzer 140.

In a particular aspect, the device 102 is coupled to one or more speakers 1360. The one or more speakers 1360 are illustrated as external to the device 102 as a non-limiting example. In other examples, at least one of the one or more speakers 1360 can be integrated in the device 102.

The system 1350 includes a device 1306 that is configured to be coupled to the device 102. In an example, the device 102 is configured to be coupled via a network to the device 1306. The network can include one or more wireless networks, one or more wired networks, or a combination thereof.

The audio decoder 1370 receives encoded data 1362 from the device 1306. The audio decoder 1370 decodes the encoded data 1362 to generate decoded data 1372. The audio analyzer 140 generates the output signal 135 based on the decoded data 1372. In a particular aspect, the decoded data 1372 includes the input speech representation 149, the image data 153, the user input 103, the operation mode 105, the source speech representation 163, or a combination thereof. In a particular aspect, the audio analyzer 140 outputs the output signal 135 via the one or more speakers 1360.

Figure 14:
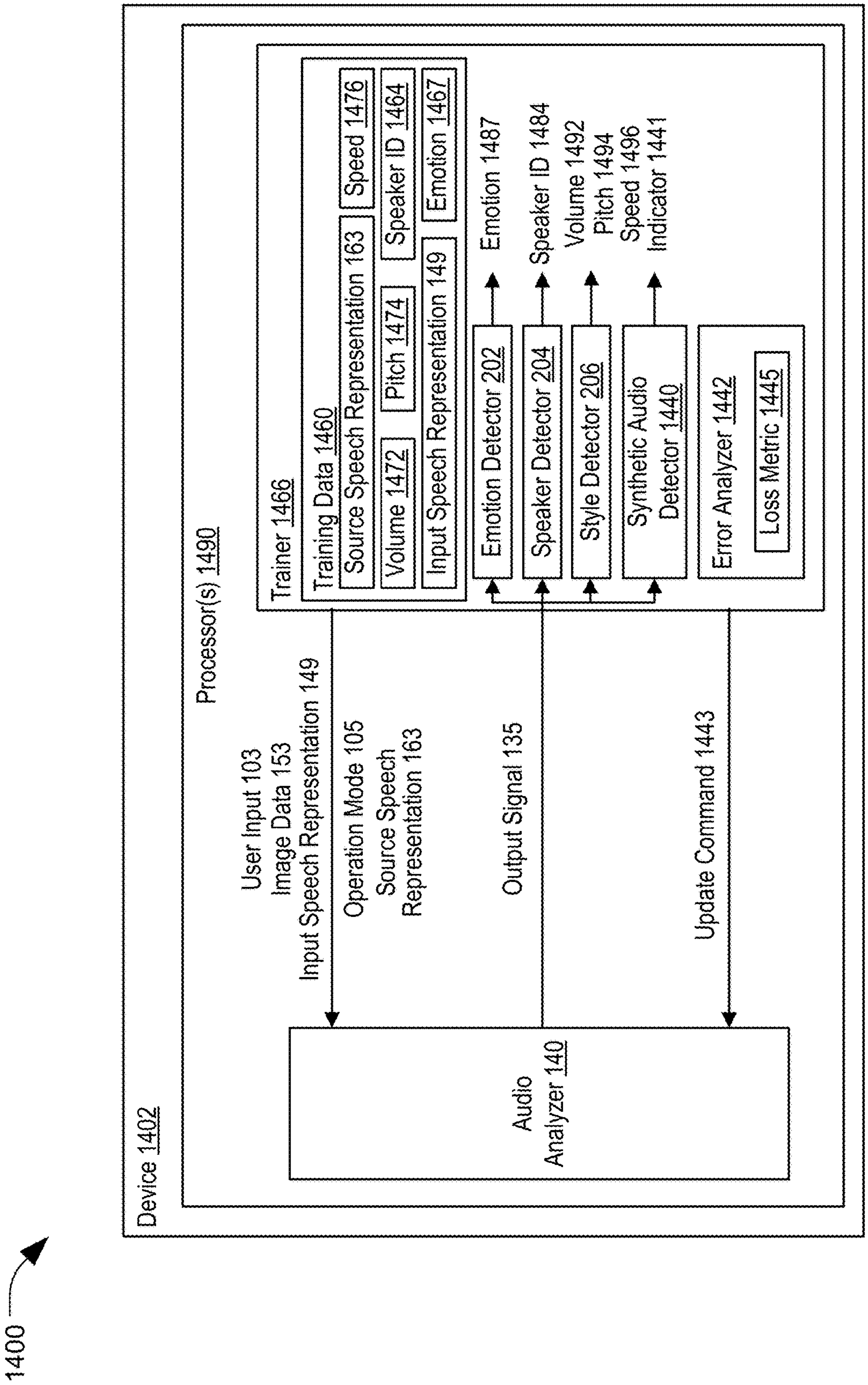
FIG. 14 is a block diagram of an illustrative aspect of a system operable to train an audio analyzer of the system of FIG. 1, in accordance with some examples of the present disclosure.

Referring to FIG. 14, a system 1400 is shown. The system 1400 is operable to train the audio analyzer 140. The system 1400 includes a device 1402. In some aspects the device 1402 is the same as the device 102. In other aspects, the device 1402 is external to the device 102 and the device 102 receives a trained version of the audio analyzer 140 from the device 1402.

The device 1402 includes one or more processors 1490. The one or more processors 1490 include a trainer 1466 configured to train the audio analyzer 140 using training data 1460. The training data 1460 includes an input speech representation 149 and a source speech representation 163. The training data 1460 also indicates one or more target characteristics, such as an emotion 1467, a speaker identifier 1464, a volume 1472, a pitch 1474, a speed 1476, or a combination thereof.

In some examples, the target characteristic is the same as input characteristic of the input speech representation 149. In some examples, the input characteristic is mapped to the target characteristic for an operation mode 105, image data 153, a user input 103, or a combination thereof.

The trainer 1466 provides the input speech representation 149 and the source speech representation 163 to the audio analyzer 140. Optionally, in some examples, the trainer 1466 also provides the user input 103, the image data 153, the operation mode 105, or a combination thereof, to the audio analyzer 140. The audio analyzer 140 generates an output signal 135 based on the input speech representation 149, the source speech representation 163, the user input 103, the image data 153, the operation mode 105, or a combination thereof, as described with reference to FIG. 1.

The trainer 1466 includes the emotion detector 202, the speaker detector 204, the style detector 206, a synthetic audio detector 1440, or a combination thereof. The emotion detector 202 processes the output signal 135 to determine an emotion 1487 of the output signal 135. The speaker detector 204 processes the output signal 135 to determine that the output signal 135 corresponds to speech that is likely of a speaker (e.g., user) having a speaker identifier 1484. The style detector 206 processes the output signal 135 to determine a volume 1492, a pitch 1494, a speed 1496, or a combination thereof, of the output signal 135, as described with reference to FIG. 2. The synthetic audio detector 1440 processes the output signal 135 to generate an indicator 1441 indicating whether the output signal 135 likely corresponds to speech of a live person or corresponds to synthetic speech.

The error analyzer 1442 determines a loss metric 1445 based on a comparison of one or more target characteristics associated with the input speech representation 149 (as indicated by the training data 1460) and corresponding detected characteristics (as determined by the emotion detector 202, the speaker detector 204, the style detector 206, the synthetic audio detector 1440, or a combination thereof). For example, the loss metric 1445 is based at least in part on a comparison of the emotion 1467 and the emotion 1487, where the emotion 1467 corresponds to a target emotion corresponding to the input speech representation 149 as indicated by the training data 1460 and the emotion 1487 is detected by the emotion detector 202. As another example, the loss metric 1445 is based at least in part on a comparison of the volume 1472 and the volume 1492, where the volume 1472 corresponds to a target volume corresponding to the input speech representation 149 as indicated by the training data 1460 and the volume 1492 is detected by the style detector 206.

In a particular example, the loss metric 1445 is based at least in part on a comparison of the pitch 1474 and the pitch 1494, where the pitch 1474 corresponds to a target pitch corresponding to the input speech representation 149 as indicated by the training data 1460 and the pitch 1494 is detected by the style detector 206. As another example, the loss metric 1445 is based at least in part on a comparison of the speed 1476 and the speed 1496, where the speed 1476 corresponds to a target speed corresponding to the input speech representation 149 as indicated by the training data 1460 and the speed 1496 is detected by the style detector 206.

In a particular aspect, the loss metric 1445 is based at least in part on a comparison of a first speaker representation associated with the speaker identifier 1464 and a second speaker representation associated with the speaker identifier 1484, where the speaker identifier 1464 corresponds to a target speaker identifier corresponding to the input speech representation 149 as indicated by the training data 1460, and the speaker identifier 1484 is detected by the speaker detector 204. In a particular aspect, the loss metric 1445 is based on the indicator 1441. For example, a first value of the indicator 1441 indicates that the output signal 135 is detected as approximating speech of a live person, whereas a second value of the indicator 1441 indicates that the output signal 135 is detected as synthetic speech. In this example, the loss metric 1445 is reduced based on the indicator 1441 having the first value or increased based on the indicator 1441 having the second value.

The error analyzer 1442 generates an update command 1443 to update (e.g., weights and biases of a neural network of) the audio analyzer 140 based on the loss metric 1445. For example, the error analyzer 1442 iteratively provides sets of training data including an input speech representation 149, a source speech representation 163, a user input 103, image data 153, an operation mode 105, or a combination thereof, to the audio analyzer 140 to generate an output signal 135 and updates the audio analyzer 140 to reduce the loss metric 1445. The error analyzer 1442 determines that training of the audio analyzer 140 is complete in response to determining that the loss metric 1445 is within a threshold loss, the loss metric 1445 has stopped changing, at least a threshold count of iterations have been performed, or a combination thereof. In a particular aspect, the trainer 1466, in response to determining that training is complete, provides the audio analyzer 140 to the device 102.

In a particular aspect, the audio analyzer 140 and the trainer 1466 correspond to a generative adversarial network (GAN). For example, the F0 extractor 1244, the combiner 1246 of FIG. 12, and the voice convertor 164 of FIG. 1 correspond to a generator of the GAN, and the emotion detector 202, the speaker detector 204, and the style detector 206 correspond to a discriminator of the GAN.

In a particular aspect, updating the audio analyzer 140 includes updating the GAN. In some implementations, the audio analyzer 140 includes an automatic speech recognition (ASR) model and a F0 network, and the trainer 1466 sends the update command 1443 to update the ASR model, the F0 network, or both. In a particular aspect, the F0 extractor 1244 of FIG. 12 includes the F0 network. In a particular aspect, the characteristic detector 154 of FIG. 1 includes the ASR model.

Figure 15:
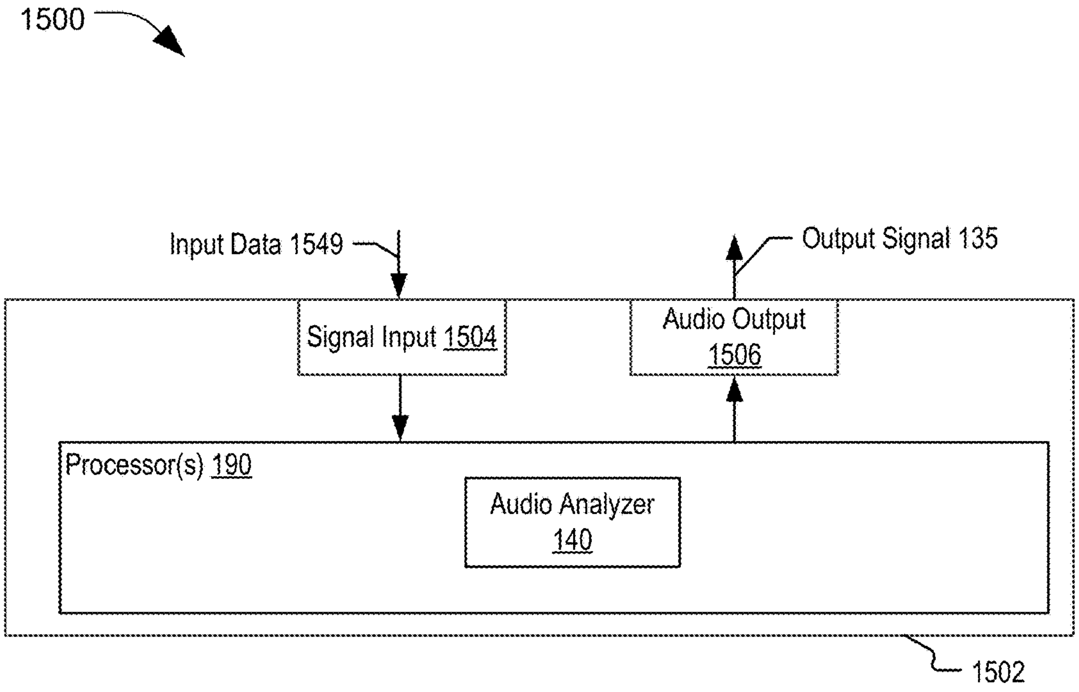
FIG. 15 illustrates an example of an integrated circuit operable to perform source speech modification based on an input speech characteristic, in accordance with some examples of the present disclosure.

FIG. 15 depicts an implementation 1500 of the device 102 as an integrated circuit 1502 that includes the one or more processors 190. The integrated circuit 1502 includes a signal input 1504, such as one or more bus interfaces, to enable input data 1549 to be received for processing. The input data 1549 includes the input speech representation 149, the source speech representation 163, the image data 153, the user input 103, the operation mode 105, or a combination thereof.

Figure 17:
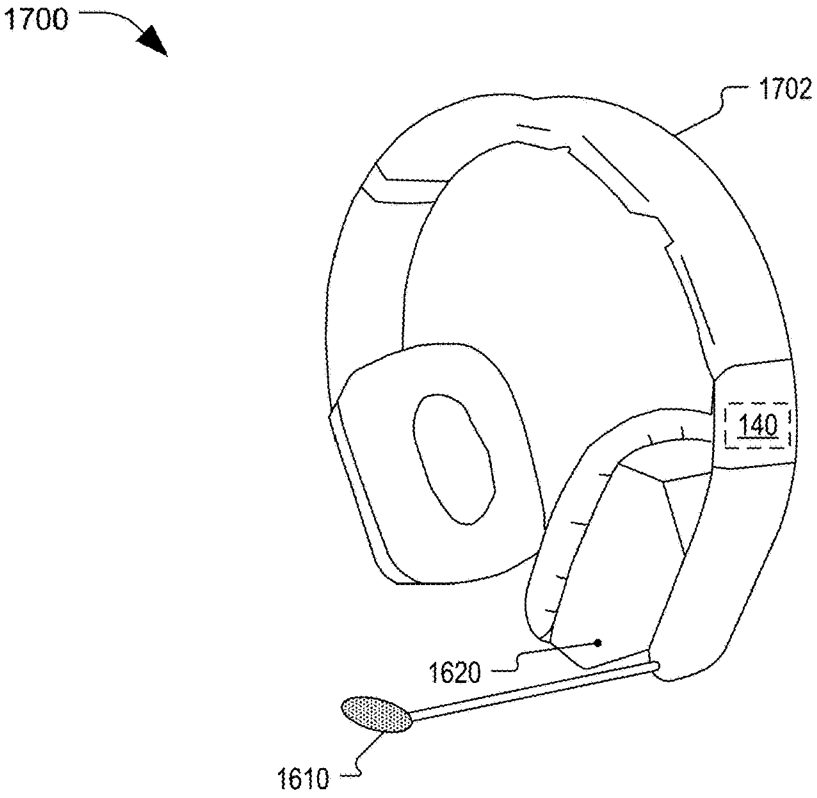
FIG. 17 is a diagram of a headset operable to perform source speech modification based on an input speech characteristic, in accordance with some examples of the present disclosure.
Figure 18:
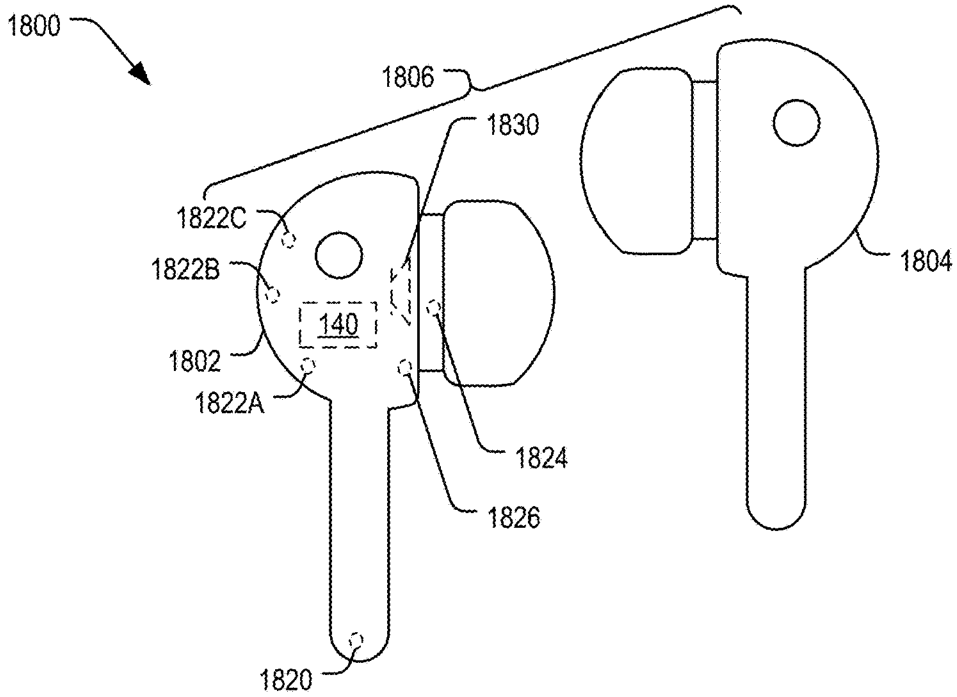
FIG. 18 is a diagram of earbuds operable to perform source speech modification based on an input speech characteristic, in accordance with some examples of the present disclosure.
Figure 19:
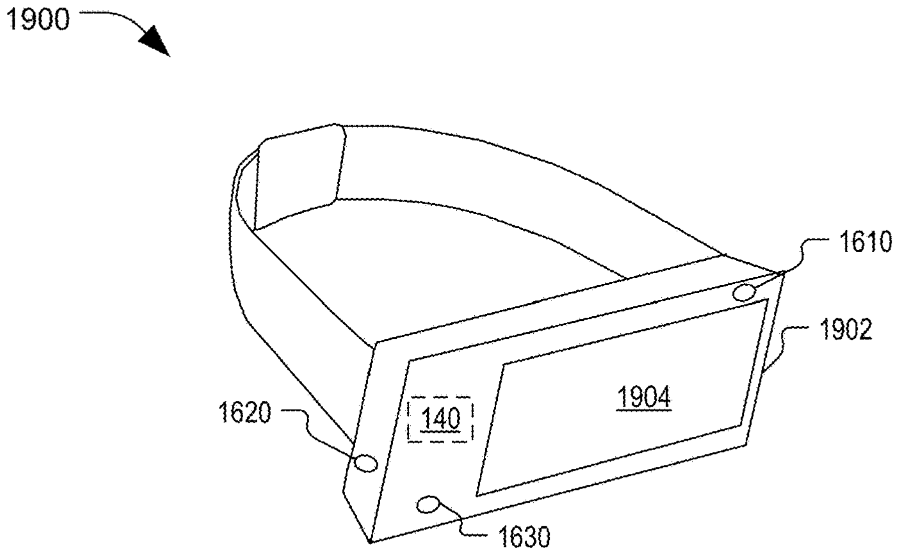
FIG. 19 is a diagram of a wearable electronic device operable to perform source speech modification based on an input speech characteristic, in accordance with some examples of the present disclosure.
Figure 20:
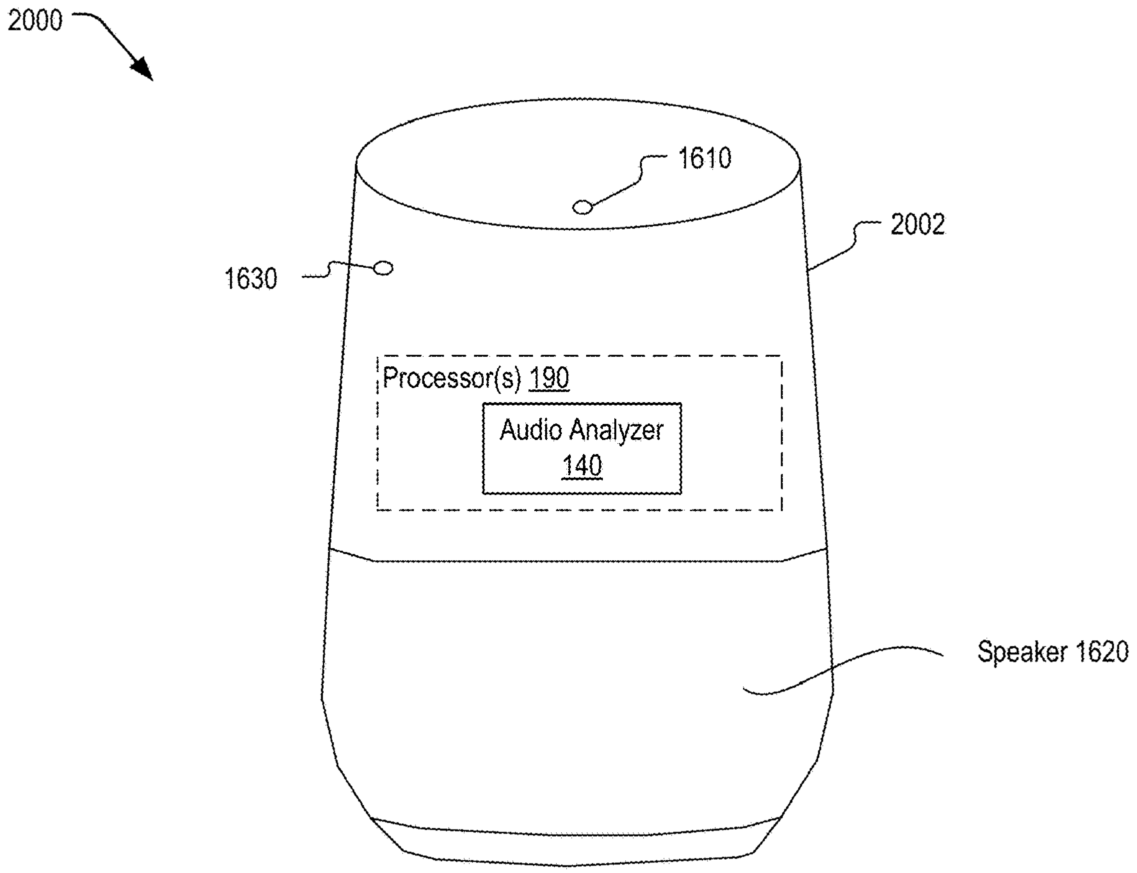
FIG. 20 is a diagram of a voice-controlled speaker system operable to perform source speech modification based on an input speech characteristic, in accordance with some examples of the present disclosure.
Figure 21:
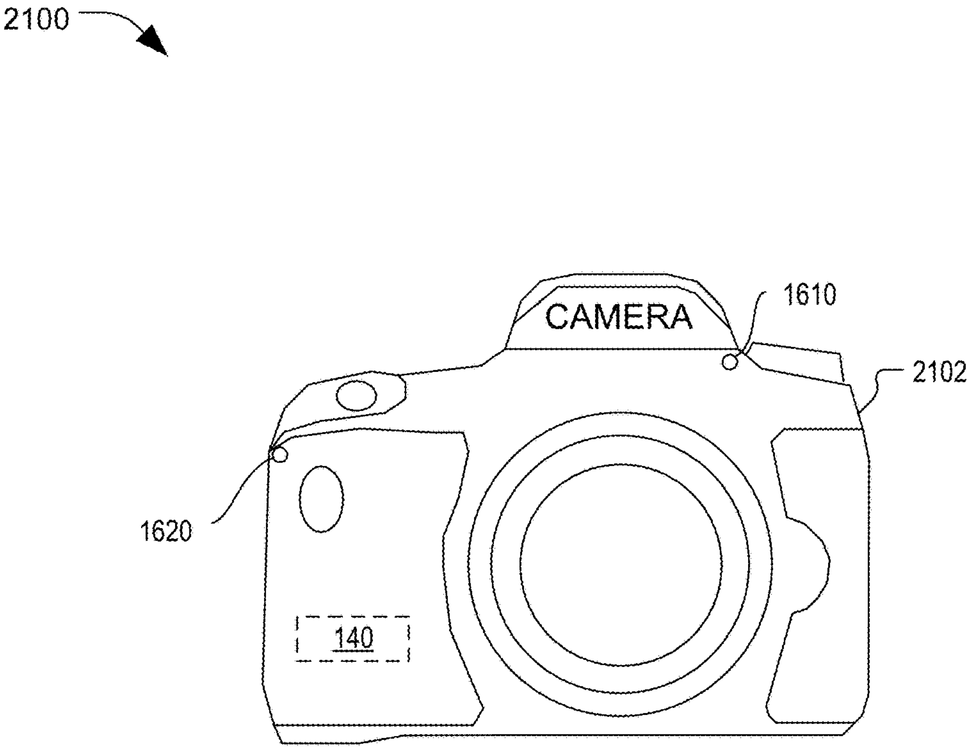
FIG. 21 is a diagram of a camera operable to perform source speech modification based on an input speech characteristic, in accordance with some examples of the present disclosure.
Figure 22:
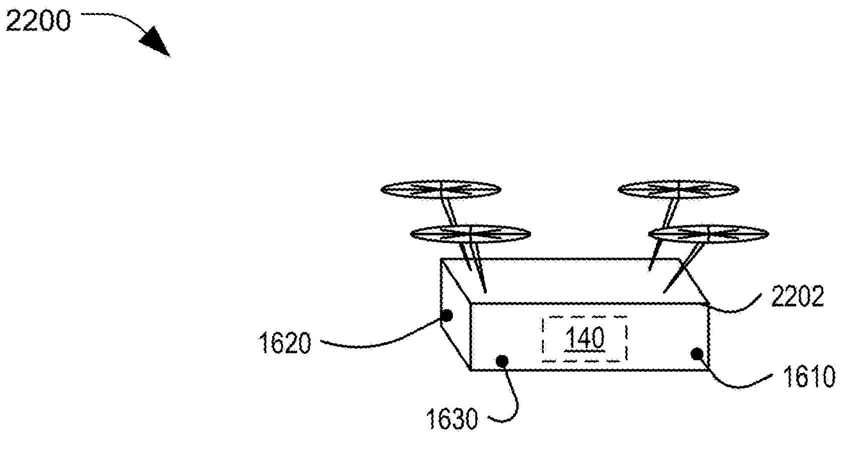
FIG. 22 is a diagram of a first example of a vehicle operable to perform source speech modification based on an input speech characteristic, in accordance with some examples of the present disclosure.
Figure 23:
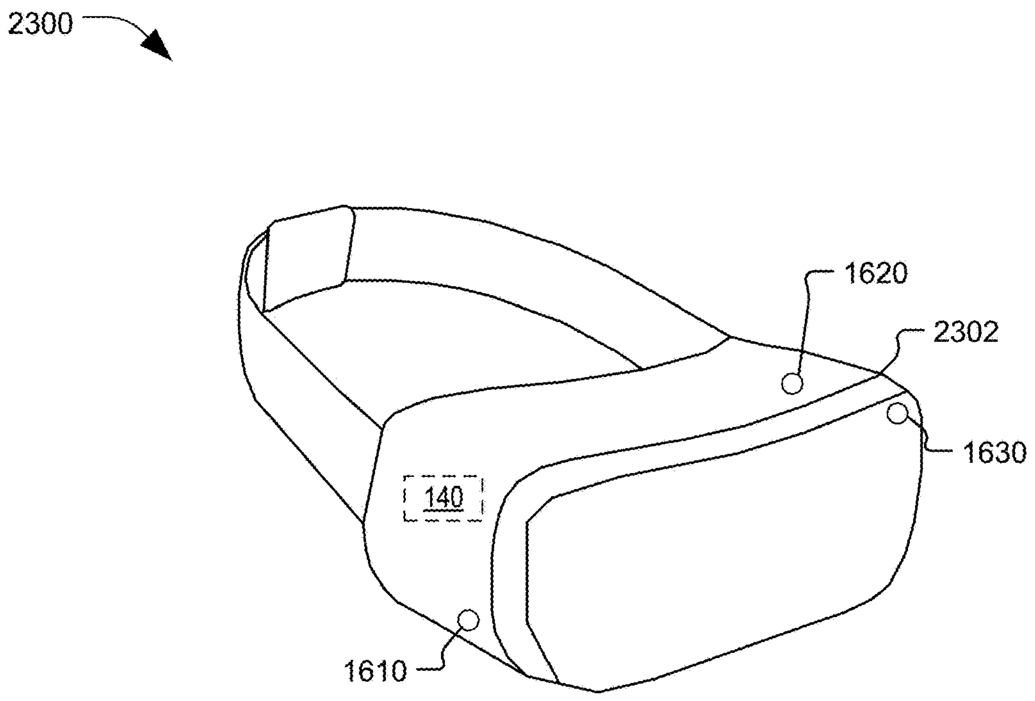
FIG. 23 is a diagram of a headset, such as an extended reality headset, operable to perform source speech modification based on an input speech characteristic, in accordance with some examples of the present disclosure.
Figure 24:
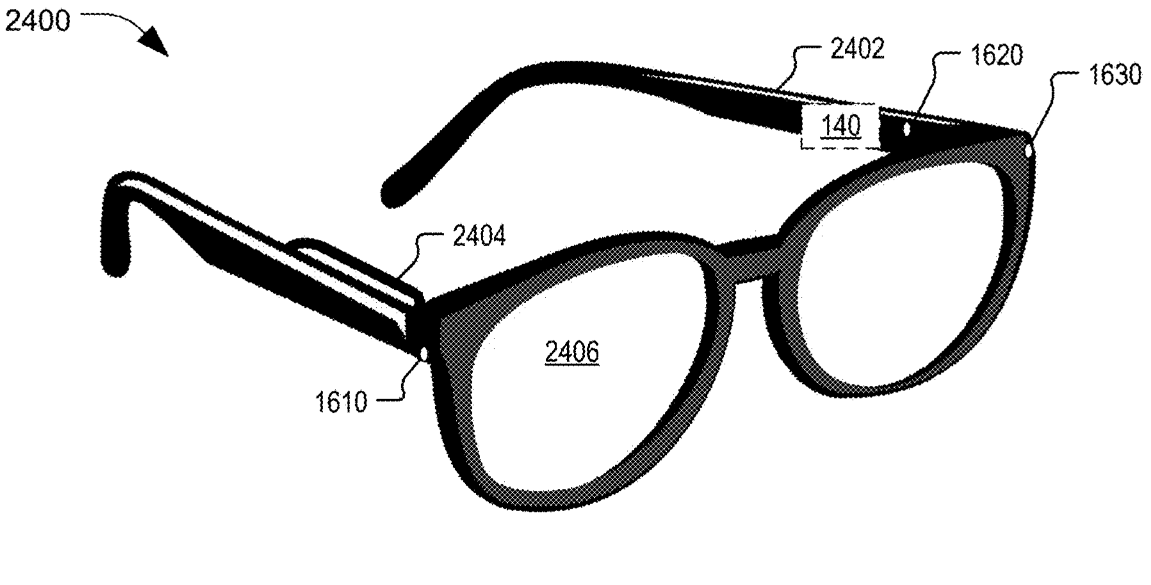
FIG. 24 is a diagram of glasses, such as extended reality glasses, operable to perform source speech modification based on an input speech characteristic, in accordance with some examples of the present disclosure.
Figure 25:
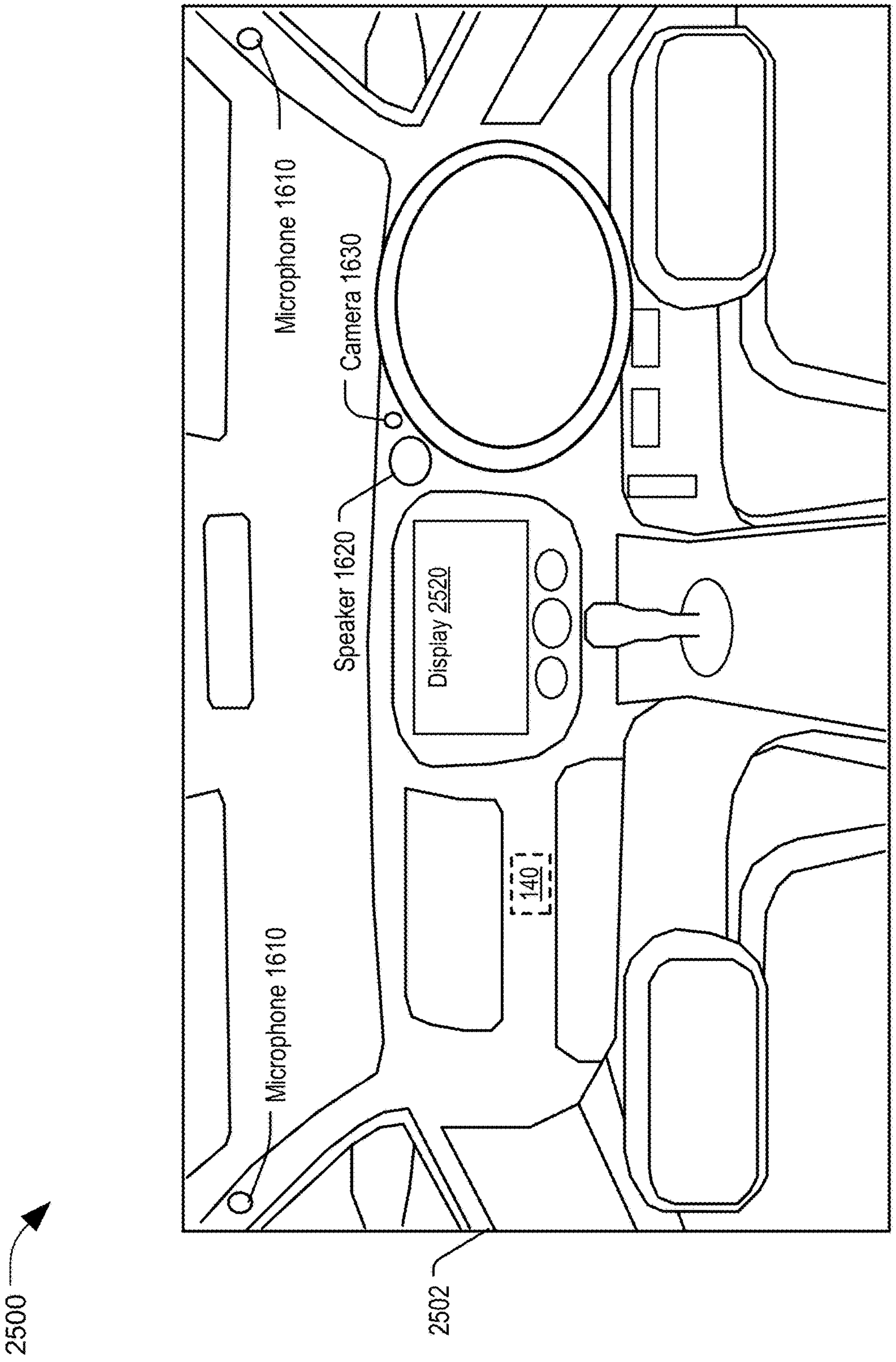
FIG. 25 is a diagram of a second example of a vehicle operable to perform source speech modification based on an input speech characteristic, in accordance with some examples of the present disclosure.

The integrated circuit 1502 also includes an audio output 1506, such as a bus interface, to enable sending of an output signal 135. The integrated circuit 1502 enables implementation of source speech modification based on an input speech characteristic as a component in a system, such as a mobile phone or tablet as depicted in FIG. 16, a headset as depicted in FIG. 17, earbuds as depicted in FIG. 18, a wearable electronic device as depicted in FIG. 19, a voice-controlled speaker system as depicted in FIG. 20, a camera as depicted in FIG. 21, an extended reality headset as depicted in FIG. 23, extended reality glasses as depicted in FIG. 24, or a vehicle as depicted in FIG. 22 or FIG. 25.

Figure 16:
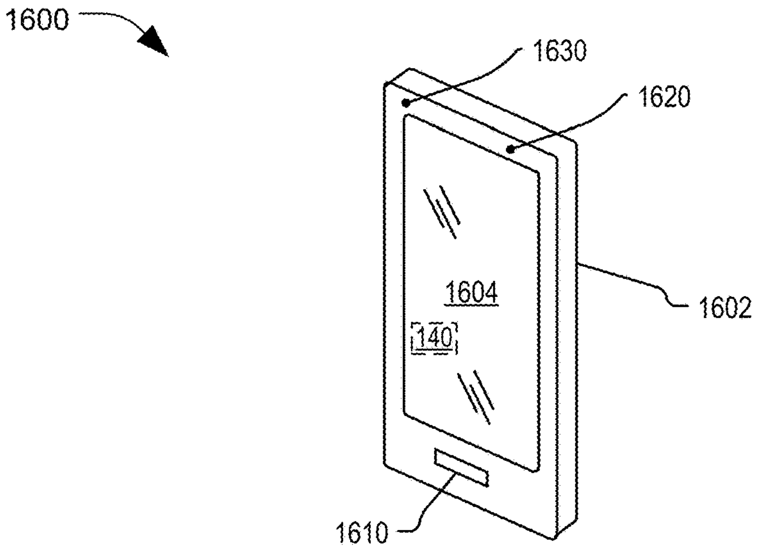
FIG. 16 is a diagram of a mobile device operable to perform source speech modification based on an input speech characteristic, in accordance with some examples of the present disclosure.

FIG. 16 depicts an implementation 1600 in which the device 102 includes a mobile device 1602, such as a phone or tablet, as illustrative, non-limiting examples. The mobile device 1602 includes one or more microphones 1610, one or more speakers 1620, one or more cameras 1630, and a display screen 1604. Components of the one or more processors 190, including the audio analyzer 140, are integrated in the mobile device 1602 and are illustrated using dashed lines to indicate internal components that are not generally visible to a user of the mobile device 1602.

In a particular aspect, the one or more cameras 1630 includes the one or more cameras 910 of FIG. 9. The one or more cameras 1630 are provided as a non-limiting example of image sensors. In some examples, one or more other types of image sensors can be used in addition to or as an alternative to a camera. In a particular aspect, the one or more microphones 1610 include the one or more microphones 920 of FIG. 9. The one or more microphones 1610 are provided as a non-limiting example of audio sensors. In some examples, one or more other types of audio sensors can be used in addition to or as an alternative to a microphone. In a particular aspect, the one or more speakers 1620 include the one or more speakers 1110 of FIG. 11, the one or more speakers 1310 of FIG. 13A, the one or more speakers 1360 of FIG. 13B, or a combination thereof.

In a particular example, the audio analyzer 140 operates to detect user voice activity, which is then processed to perform one or more operations at the mobile device 1602, such as to launch a graphical user interface or otherwise display other information associated with the user's speech at the display screen 1604 (e.g., via an integrated "smart assistant" application).

In an example, the source speech representation 163 of FIG. 1 represents source speech that is associated with a virtual assistant application of the mobile device 1602. The input speech representation 149 represents input speech received by the audio analyzer 140 via the one or more microphones 1610. The audio analyzer 140 determines the input characteristic 155 of the input speech representation 149 and updates the source speech representation 163 of the source speech based on the input characteristic 155 to generate the output signal 135 representing output speech, as described with reference to FIG. 1. The output speech corresponds to a social interaction response from the virtual assistant application based on the input characteristic 155. For example, the response from the virtual assistant is updated based on the input characteristic 155 of the input speech.

FIG. 17 depicts an implementation 1700 in which the device 102 includes a headset device 1702. The headset device 1702 includes the one or more microphones 1610, the one or more speakers 1620, or a combination thereof. Components of the one or more processors 190, including the audio analyzer 140, are integrated in the headset device 1702. In a particular example, the audio analyzer 140 operates to detect user voice activity, which may cause the headset device 1702 to perform one or more operations at the headset device 1702, to transmit audio data corresponding to the user voice activity to a second device (not shown) for further processing, or a combination thereof.

In some examples, the source speech representation 163 corresponds to a source audio signal to be played out by the one or more speakers 1620. In these examples, the headset device 1702 updates the source speech representation 163 to generate the output signal 135 and outputs the output signal 135 (instead of the source audio signal) via the one or more speakers 1620.

In some examples, the source speech representation 163 corresponds to a source audio signal received from the one or more microphones 1610. In these examples, the headset device 1702 updates the source speech representation 163 to generate the output signal 135 and provides the output signal 135 to another device or component.

FIG. 18 depicts an implementation 1800 in which the device 102 includes a portable electronic device that corresponds to a pair of earbuds 1806 that includes a first earbud 1802 and a second earbud 1804. Although earbuds are described, it should be understood that the present technology can be applied to other in-ear or over-ear playback devices.

The first earbud 1802 includes a first microphone 1820, such as a high signal-to-noise microphone positioned to capture the voice of a wearer of the first earbud 1802, an array of one or more other microphones configured to detect ambient sounds and spatially distributed to support beamforming, illustrated as microphones 1822A, 1822B, and 1822C, an "inner" microphone 1824 proximate to the wearer's ear canal (e.g., to assist with active noise cancelling), and a self-speech microphone 1826, such as a bone conduction microphone configured to convert sound vibrations of the wearer's ear bone or skull into an audio signal.

In a particular implementation, the one or more microphones 1610 include the first microphone 1820, the microphones 1822A, 1822B, and 1822C, the inner microphone 1824, the self-speech microphone 1826, or a combination thereof. In a particular aspect, the audio analyzer 140 of the first earbud 1802 receives audio signals from the first microphone 1820, the microphones 1822A, 1822B, and 1822C, the inner microphone 1824, the self-speech microphone 1826, or a combination thereof.

The second earbud 1804 can be configured in a substantially similar manner as the first earbud 1802. In some implementations, the audio analyzer 140 of the first earbud 1802 is also configured to receive one or more audio signals generated by one or more microphones of the second earbud 1804, such as via wireless transmission between the earbuds 1802, 1804, or via wired transmission in implementations in which the earbuds 1802, 1804 are coupled via a transmission line. In other implementations, the second earbud 1804 also includes an audio analyzer 140, enabling techniques described herein to be performed by a user wearing a single one of either of the earbuds 1802, 1804.

In some implementations, the earbuds 1802, 1804 are configured to automatically switch between various operating modes, such as a passthrough mode in which ambient sound is played via a speaker 1830, a playback mode in which non-ambient sound (e.g., streaming audio corresponding to a phone conversation, media playback, video game, etc.) is played back through the speaker 1830, and an audio zoom mode or beamforming mode in which one or more ambient sounds are emphasized and/or other ambient sounds are suppressed for playback at the speaker 1830. In other implementations, the earbuds 1802, 1804 may support fewer modes or may support one or more other modes in place of, or in addition to, the described modes.

In an illustrative example, the earbuds 1802, 1804 can automatically transition from the playback mode to the passthrough mode in response to detecting the wearer's voice, and may automatically transition back to the playback mode after the wearer has ceased speaking. In some examples, the earbuds 1802, 1804 can operate in two or more of the modes concurrently, such as by performing audio zoom on a particular ambient sound (e.g., a dog barking) and playing out the audio zoomed sound superimposed on the sound being played out while the wearer is listening to music (which can be reduced in volume while the audio zoomed sound is being played). In this example, the wearer can be alerted to the ambient sound associated with the audio event without halting playback of the music.

FIG. 19 depicts an implementation 1900 in which the device 102 includes a wearable electronic device 1902, illustrated as a "smart watch." The audio analyzer 140, the one or more microphones 1610, the one or more speakers 1620, the one or more cameras 1630, or a combination thereof, are integrated into the wearable electronic device 1902. In a particular example, the audio analyzer 140 operates to detect user voice activity, which is then processed to perform one or more operations at the wearable electronic device 1902, such as to launch a graphical user interface or otherwise display other information associated with the user's speech at a display screen 1904 of the wearable electronic device 1902. To illustrate, the wearable electronic device 1902 may include a display screen 1904 that is configured to display a notification based on user speech detected by the wearable electronic device 1902. In a particular aspect, the display screen 1904 displays a notification indicating that the input characteristic 155 is detected, that the target characteristic 177 is applied to generate the output signal 135, or both.

In a particular example, the wearable electronic device 1902 includes a haptic device that provides a haptic notification (e.g., vibrates) in response to detection of user voice activity. For example, the haptic notification can cause a user to look at the wearable electronic device 1902 to see a displayed notification indicating detection of a keyword spoken by the user. The wearable electronic device 1902 can thus alert a user with a hearing impairment or a user wearing a headset that the user's voice activity is detected.

FIG. 20 is an implementation 2000 in which the device 102 includes a wireless speaker and voice activated device 2002. The wireless speaker and voice activated device 2002 can have wireless network connectivity and is configured to execute an assistant operation. The processor 190 including the audio analyzer 140, the one or more microphones 1610, the one or more cameras 1630, or a combination thereof, are included in the wireless speaker and voice activated device 2002. The wireless speaker and voice activated device 2002 also includes the one or more speakers 1620. During operation, in response to receiving a verbal command identified as user speech via operation of the audio analyzer 140, the wireless speaker and voice activated device 2002 can execute assistant operations, such as via execution of a voice activation system (e.g., an integrated assistant application). The assistant operations can include adjusting a temperature, playing music, turning on lights, etc. For example, the assistant operations are performed responsive to receiving a command after a keyword or key phrase (e.g., "hello assistant"). In an example, the audio analyzer 140 uses the speech of the assistant as source speech to generate the source speech representation 163, updates the source speech representation 163 to generate the output signal 135 based on input speech received via the one or more microphones 1610, and outputs the output signal 135 via the one or more speakers 1620.

FIG. 21 depicts an implementation 2100 in which the device 102 includes a portable electronic device that corresponds to a camera device 2102. The audio analyzer 140, the one or more microphones 1610, the one or more speakers 1620, or a combination thereof, are included in the camera device 2102. In a particular aspect, the one or more cameras 1630 include the camera device 2102. During operation, in response to receiving a verbal command identified as user speech via operation of the audio analyzer 140, the camera device 2102 can execute operations responsive to spoken user commands, such as to adjust image or video capture settings, image or video playback settings, or image or video capture instructions, as illustrative examples.

In an example, the camera device 2102 includes an assistant application and the audio analyzer 140 uses the speech of the assistant application as source speech to generate the source speech representation 163, updates the source speech representation 163 to generate the output signal 135 based on input speech received via the one or more microphones 1610, and outputs the output signal 135 via the one or more speakers 1620.

FIG. 22 depicts an implementation 2200 in which the device 102 corresponds to, or is integrated within, a vehicle 2202, illustrated as a manned or unmanned aerial device (e.g., a package delivery drone). The audio analyzer 140, the one or more microphones 1610, the one or more speakers 1620, the one or more cameras 1630, or a combination thereof, are integrated into the vehicle 2202. User voice activity detection can be performed based on audio signals received from the one or more microphones 1610 of the vehicle 2202, such as for delivery instructions from an authorized user of the vehicle 2202.

In an example, the vehicle 2202 includes an assistant application and the audio analyzer 140 uses the speech of the assistant application as source speech to generate the source speech representation 163, updates the source speech representation 163 to generate the output signal 135 based on input speech received via the one or more microphones 1610, and outputs the output signal 135 via the one or more speakers 1620.

FIG. 23 depicts an implementation 2300 in which the device 102 includes a portable electronic device that corresponds to an extended reality (XR) headset 2302. The headset 2302 can include an augmented reality headset, a mixed reality headset, or a virtual reality headset. The audio analyzer 140, the one or more microphones 1610, the one or more speakers 1620, the one or more cameras 1630, or a combination thereof, are integrated into the headset 2302. User voice activity detection can be performed based on audio signals received from the one or more microphones 1610 of the headset 2302.

A visual interface device is positioned in front of the user's eyes to enable display of augmented reality, mixed reality, or virtual reality images or scenes to the user while the headset 2302 is worn. In a particular example, the visual interface device is configured to display a notification indicating user speech detected in the audio signal. In a particular aspect, the visual interface device displays a notification indicating that the input characteristic 155 is detected, that the target characteristic 177 is applied to generate the output signal 135, or both.

FIG. 24 depicts an implementation 2400 in which the device 102 includes a portable electronic device that corresponds to XR glasses 2402. The glasses 2402 can include augmented reality glasses, mixed reality glasses, or virtual reality glasses. The glasses 2402 include a projection unit 2404 configured to project visual data onto a surface of a lens 2406 or to reflect the visual data off of a surface of the lens 2406 and onto the wearer's retina. The audio analyzer 140, the one or more microphones 1610, the one or more speakers 1620, the one or more cameras 1630, or a combination thereof, are integrated into the glasses 2402. The audio analyzer 140 may function to generate the output signal 135 based on audio signals received from the one or more microphones 1610. For example, the audio signals received from the one or more microphones 1610 can correspond to the input speech representation 149, the source speech representation 163, or both.

In a particular example, the projection unit 2404 is configured to display a notification indicating user speech detected in the audio signal. In a particular example, the projection unit 2404 is configured to display a notification indicating a detected audio event. For example, the notification can be superimposed on the user's field of view at a particular position that coincides with the location of the source of the sound associated with the audio event. To illustrate, the sound may be perceived by the user as emanating from the direction of the notification. In an illustrative implementation, the projection unit 2404 is configured to display a notification indicating that the input characteristic 155 is detected, that the target characteristic 177 is applied to generate the output signal 135, or both.

FIG. 25 depicts another implementation 2500 in which the device 102 corresponds to, or is integrated within, a vehicle 2502, illustrated as a car. The vehicle 2502 includes the one or more processors 190 including the audio analyzer 140. The vehicle 2502 also includes the one or more microphones 1610, the one or more speakers 1620, the one or more cameras 1630, or a combination thereof. In some aspects, at least one of the one or more microphones 1610 is positioned to capture utterances of an operator of the vehicle 2502. User voice activity detection can be performed based on audio signals received from the one or more microphones 1610 of the vehicle 2502. In some implementations, user voice activity detection can be performed based on an audio signal received from interior microphones (e.g., at least one of the one or more microphones 1610), such as for a voice command from an authorized passenger. For example, the user voice activity detection can be used to detect a voice command from an operator of the vehicle 2502 (e.g., from a parent to set a volume to 5 or to set a destination for a self-driving vehicle) and to disregard the voice of another passenger (e.g., a voice command from a child to set the volume to 10 or other passengers discussing another location). In some implementations, user voice activity detection can be performed based on an audio signal received from external microphones (e.g., at least one of the one or more microphones 1610), such as an authorized user of the vehicle. In a particular implementation, in response to receiving a verbal command identified as user speech via operation of the audio analyzer 140, a voice activation system initiates one or more operations of the vehicle 2502 based on one or more keywords (e.g., "unlock," "start engine," "play music," "display weather forecast," or another voice command) detected in the output signal 135, such as by providing feedback or information via a display 2520 or one or more speakers (e.g., a speaker 1620).

In some aspects, audio signals received from the one or more microphones 1610 are used as the source speech representation 163, the input speech representation 149, or both. In an example, audio signals received from the one or more microphones 1610 are used as the input speech representation 149 and audio signals to be played by the one or more speakers 1620 are used as the source speech representation 163. The audio analyzer 140 updates the source speech representation 163 to generate the output signal 135, as described with reference to FIG. 1. To illustrate, the speech to be played out by the one or more speakers 1620 is updated based on characteristics of input speech of a passenger of the vehicle 2502 prior to playback by the one or more speakers 1620.

In another example, audio signals received from the one or more microphones 1610 are used as the source speech representation 163 and audio signals received by the vehicle 2502 during a call from another device are used as the input speech representation 149. The audio analyzer 140 updates the source speech representation 163 to generate the output signal 135, as described with reference to FIG. 1. To illustrate, the outgoing speech of a passenger of the vehicle 2502 is updated based on incoming speech received from the other device prior to sending the outgoing speech to the other device.

Figure 26:
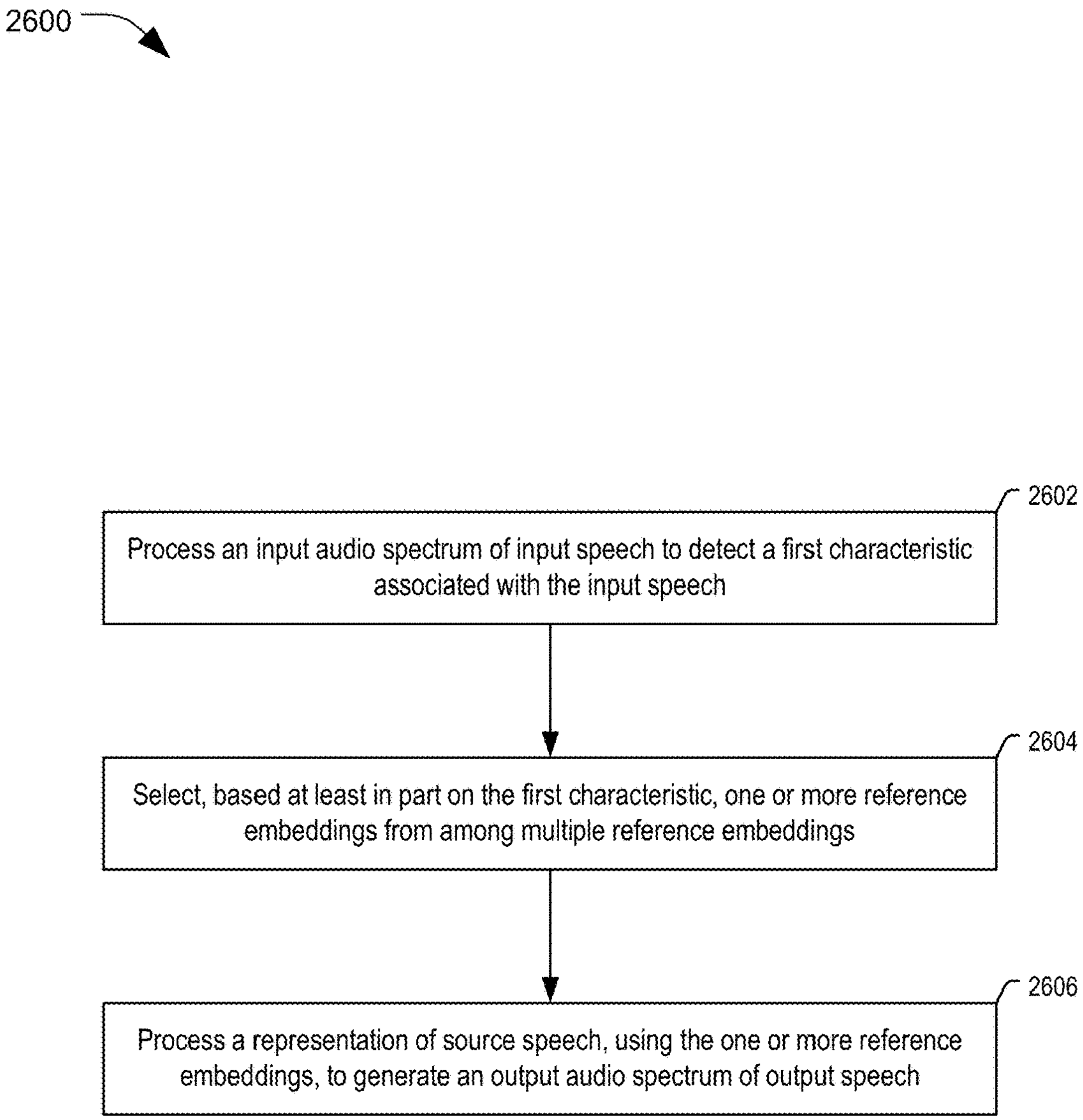
FIG. 26 is a diagram of a particular implementation of a method of performing source speech modification based on an input speech characteristic that may be performed by the device of FIG. 1, in accordance with some examples of the present disclosure.

Referring to FIG. 26, a particular implementation of a method 2600 of performing source speech modification based on an input speech characteristic is shown. In a particular aspect, one or more operations of the method 2600 are performed by at least one of the characteristic detector 154, the embedding selector 156, the conversion embedding generator 158, the voice convertor 164, the audio analyzer 140, the one or more processors 190, the device 102, the system 100 of FIG. 1, the emotion detector 202, the speaker detector 204, the style detector 206, the volume detector 212, the pitch detector 214, the speed detector 216 of FIG. 2, the audio emotion detector 354 of FIG. 3A, the image emotion detector 356, the emotion analyzer 358 of FIG. 3B, the characteristic adjuster 492, the emotion adjuster 452, the speaker adjuster 454, the volume adjuster 456, the pitch adjuster 458, the speed adjuster 460 of FIG. 4, the embedding combiner 852, the embedding combiner 854 of FIG. 8B, the embedding combiner 856 of FIG. 8C, the one or more processors 1490, the device 1402, the system 1400 of FIG. 14, or a combination thereof.

The method 2600 includes processing an input audio spectrum of input speech to detect a first characteristic associated with the input speech, at 2602. For example, the characteristic detector 154 of FIG. 1 processes the input audio spectrum 151 of input speech (represented by the input speech representation 149) to detect the input characteristic 155 associated with the input speech, as described with reference to FIG. 1.

The method 2600 also includes selecting, based at least in part on the first characteristic, one or more reference embeddings from among multiple reference embeddings, at 2604. For example, the embedding selector 156 selects, based at least in part on the input characteristic 155, the one or more reference embeddings 157 from among multiple reference embeddings, as described with reference to FIG. 1.

The method 2600 further includes processing a representation of source speech, using the one or more reference embeddings, to generate an output audio spectrum of output speech, at 2606. For example, the voice convertor 164 processes the source speech representation 163, using the one or more reference embeddings 157, to generate the output audio spectrum 165 of output speech (represented by the output signal 135). In a particular aspect, using the one or more reference embeddings 157 includes using the conversion embedding 159 that is based on the one or more reference embeddings 157.

The method 2600 thus enables dynamically updating source speech based on characteristics of input speech to generate output speech. In some aspects, the source speech is updated in real-time. For example, the data corresponding to the input speech, data corresponding to the source speech, or both, is received by the device 102 concurrently with the audio analyzer 140 providing the output signal 135 to a playback device (e.g., a speaker, another device, or both).

The method 2600 of FIG. 26 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 2600 of FIG. 26 may be performed by a processor that executes instructions, such as described with reference to FIG. 27.

Figure 27:
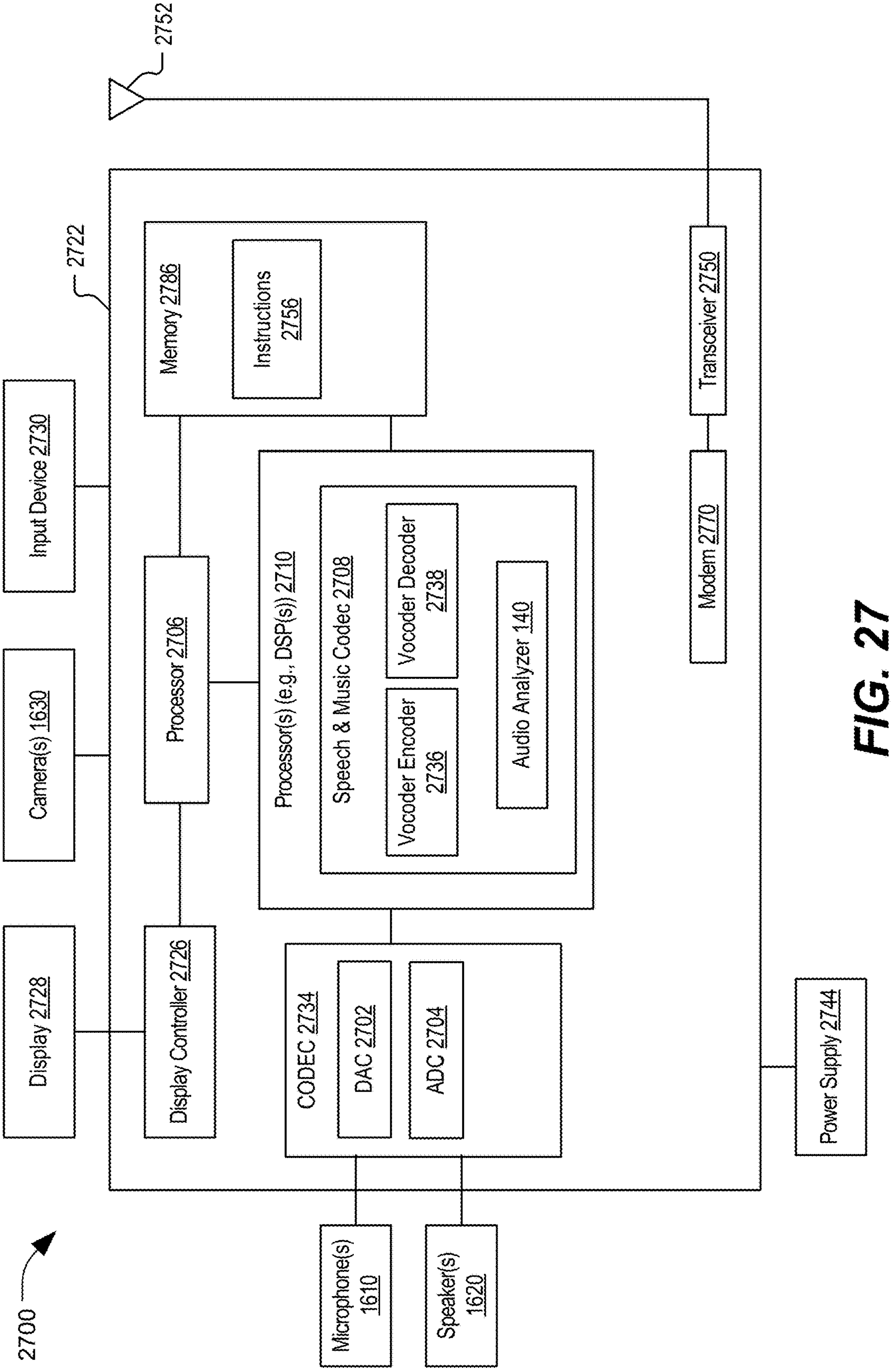
FIG. 27 is a block diagram of a particular illustrative example of a device that is operable to perform source speech modification based on an input speech characteristic, in accordance with some examples of the present disclosure.

Referring to FIG. 27, a block diagram of a particular illustrative implementation of a device is depicted and generally designated 2700. In various implementations, the device 2700 may have more or fewer components than illustrated in FIG. 27. In an illustrative implementation, the device 2700 may correspond to the device 102. In an illustrative implementation, the device 2700 may perform one or more operations described with reference to FIGS. 1-26.

In a particular implementation, the device 2700 includes a processor 2706 (e.g., a central processing unit (CPU)). The device 2700 may include one or more additional processors 2710 (e.g., one or more DSPs). In a particular aspect, the one or more processors 190 of FIG. 1 corresponds to the processor 2706, the processors 2710, or a combination thereof. The processors 2710 may include a speech and music coder-decoder (CODEC) 2708 that includes a voice coder ("vocoder") encoder 2736, a vocoder decoder 2738, the audio analyzer 140, or a combination thereof.

The device 2700 may include a memory 2786 and a CODEC 2734. The memory 2786 may include instructions 2756, that are executable by the one or more additional processors 2710 (or the processor 2706) to implement the functionality described with reference to the audio analyzer 140. The device 2700 may include a modem 2770 coupled, via a transceiver 2750, to an antenna 2752. In a particular aspect, the modem 2770 transmits the encoded data 1322 of FIG. 13 via the transceiver 2750 to the device 1304. In a particular aspect, the modem 2770 receives the encoded data 1362 of FIG. 13 via the transceiver 2750 from the device 1306.

The device 2700 may include a display 2728 coupled to a display controller 2726. In a particular aspect, the display 2728 includes the display screen 1604 of FIG. 16, the display screen 1904 of FIG. 19, the visual interface device of the headset 2302 of FIG. 23, the lens 2406 of FIG. 24, the display 2520 of FIG. 25, or a combination thereof.

The one or more microphones 1610, the one or more speakers 1620, the one or more cameras 1630, or a combination thereof, may be coupled to the CODEC 2734. The CODEC 2734 may include a digital-to-analog converter (DAC) 2702, an analog-to-digital converter (ADC) 2704, or both. In a particular implementation, the CODEC 2734 may receive analog signals from the one or more microphones 1610, convert the analog signals to digital signals using the analog-to-digital converter 2704, and provide the digital signals to the speech and music codec 2708. The speech and music codec 2708 may process the digital signals, and the digital signals may further be processed by the audio analyzer 140. In a particular implementation, the audio analyzer 140 may generate digital signals. The speech and music codec 2708 may provide the digital signals to the CODEC 2734. The CODEC 2734 may convert the digital signals to analog signals using the digital-to-analog converter 2702 and may provide the analog signals to the one or more speakers 1620.

In a particular implementation, the device 2700 may be included in a system-in-package or system-on-chip device 2722. In a particular implementation, the memory 2786, the processor 2706, the processors 2710, the display controller 2726, the CODEC 2734, and the modem 2770 are included in the system-in-package or system-on-chip device 2722. In a particular implementation, an input device 2730 and a power supply 2744 are coupled to the system-in-package or the system-on-chip device 2722. Moreover, in a particular implementation, as illustrated in FIG. 27, the display 2728, the input device 2730, the one or more microphones 1610, the one or more speakers 1620, the one or more cameras 1630, the antenna 2752, and the power supply 2744 are external to the system-in-package or the system-on-chip device 2722. In a particular implementation, each of the display 2728, the input device 2730, the speaker 2792, the one or more microphones 1610, the one or more speakers 1620, the one or more cameras 1630, the antenna 2752, and the power supply 2744 may be coupled to a component of the system-in-package or the system-on-chip device 2722, such as an interface or a controller.

The device 2700 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a gaming device, a car, a computing device, a communication device, an internet-of-things (IoT) device, an XR device, a virtual reality (VR) device, a base station, a mobile device, or any combination thereof.

In conjunction with the described implementations, an apparatus includes means for processing an input audio spectrum of input speech to detect a first characteristic associated with the input speech. For example, the means for processing an input audio spectrum can correspond to the characteristic detector 154, the audio analyzer 140, the one or more processors 190, the device 102, the system 100 of FIG. 1, the emotion detector 202, the speaker detector 204, the style detector 206, the volume detector 212, the pitch detector 214, the speed detector 216 of FIG. 2, the audio emotion detector 354 of FIG. 3A, the one or more processors 1490, the device 1402, the system 1400 of FIG. 14, the speech and music codec 2708, the processor 2706, the processors 2710, the device 2700, one or more other circuits or components configured to process an input audio spectrum of input speech to detect a first characteristic associated with the input speech, or any combination thereof.

The apparatus also includes means for selecting, based at least in part on the first characteristic, one or more reference embeddings from among multiple reference embeddings. For example, the means for selecting can correspond to the embedding selector 156, the audio analyzer 140, the one or more processors 190, the device 102, the system 100 of FIG. 1, the characteristic adjuster 492, the emotion adjuster 452, the speaker adjuster 454, the volume adjuster 456, the pitch adjuster 458, the speed adjuster 460 of FIG. 4, the one or more processors 1490, the device 1402, the system 1400 of FIG. 14, the speech and music codec 2708, the processor 2706, the processors 2710, the device 2700, one or more other circuits or components configured to select, based at least in part on the first characteristic, one or more reference embeddings from among multiple reference embeddings, or any combination thereof.

The apparatus further includes means for processing a representation of source speech, using the one or more reference embeddings, to generate an output audio spectrum of output speech. For example, the means for processing can correspond to the voice convertor 164, the audio analyzer 140, the one or more processors 190, the device 102, the system 100 of FIG. 1, the one or more processors 1490, the device 1402, the system 1400 of FIG. 14, the speech and music codec 2708, the processor 2706, the processors 2710, the device 2700, one or more other circuits or components configured to process a representation of source speech, using the one or more reference embeddings, to generate an output audio spectrum of output speech, or any combination thereof.

In some implementations, a non-transitory computer-readable medium (e.g., a computer-readable storage device, such as the memory 2786) includes instructions (e.g., the instructions 2756) that, when executed by one or more processors (e.g., the one or more processors 2710 or the processor 2706), cause the one or more processors to process an input audio spectrum (e.g., the input audio spectrum 151) of input speech to detect a first characteristic (e.g., the input characteristic 155) associated with the input speech. The instructions, when executed by the one or more processors, also cause the one or more processors to select, based at least in part on the first characteristic, one or more reference embeddings (e.g., the one or more reference embeddings 157) from among multiple reference embeddings. The instructions, when executed by the one or more processors, further cause the one or more processors to process a representation of source speech (e.g., the source speech representation 163), using the one or more reference embeddings, to generate an output audio spectrum (e.g., output audio spectrum 165) of output speech.

Particular aspects of the disclosure are described below in sets of interrelated Examples:

According to Example 1, a device includes: one or more processors configured to: process an input audio spectrum of input speech to detect a first characteristic associated with the input speech; select, based at least in part on the first characteristic, one or more reference embeddings from among multiple reference embeddings; and process a representation of source speech, using the one or more reference embeddings, to generate an output audio spectrum of output speech.

Example 2 includes the device of Example 1, wherein the first characteristic includes an emotion of the input speech.

Example 3 includes the device of Example 1 or Example 2, wherein the first characteristic includes a volume of the input speech.

Example 4 includes the device of any of Example 1 to Example 3, wherein the first characteristic includes a pitch of the input speech.

Example 5 includes the device of any of Example 1 to Example 4, wherein the first characteristic includes a speed of the input speech.

Example 6 includes the device of any of Example 1 to Example 5, wherein the one or more processors are further configured to: process, using an encoder, a source audio spectrum of the source speech to generate a source speech embedding; and process, using a fundamental frequency (F0) extractor, the source audio spectrum to generate a F0 embedding, wherein the representation of the source speech is based on the source speech embedding and the F0 embedding.

Example 7 includes the device of any of Example 1 to Example 6, wherein the input speech is used as the source speech.

Example 8 includes the device of any of Example 1 to Example 6, wherein the one or more processors are further configured to receive the input speech via one or more microphones, wherein the source speech is associated with a virtual assistant, and wherein the output speech corresponds to a social interaction response from the virtual assistant based on the first characteristic.

Example 9 includes the device of any of Example 1 to Example 8, wherein a second characteristic associated with the output speech matches the first characteristic.

Example 10 includes the device of any of Example 1 to Example 9, wherein a first speech characteristic of the output speech matches a second speech characteristic of the input speech.

Example 11 includes the device of any of Example 1 to Example 10, wherein the representation of the source speech includes encoded source speech, and wherein the one or more processors are further configured to: generate a conversion embedding based on the one or more reference embeddings; apply the conversion embedding to the encoded source speech to generate converted encoded source speech; and decode the converted encoded source speech to generate the output audio spectrum.

Example 12 includes the device of Example 11, wherein the one or more processors are configured to combine the one or more reference embeddings and a baseline embedding to generate the conversion embedding.

Example 13 includes the device of Example 11 or Example 12, wherein the one or more processors are configured to: select, based at least in part on the first characteristic, a plurality of reference embeddings from among the multiple reference embeddings; and combine the plurality of the reference embeddings to generate the conversion embedding.

Example 14 includes the device of any of Example 1 to Example 13, wherein the representation of the source speech is based on at least one of source speech audio, source speech text, a source speech spectrum, linear predictive coding (LPC) coefficients, or mel-frequency cepstral coefficients (MFCCs).

Example 15 includes the device of any of Example 1 to Example 14, wherein the one or more processors are configured to: map the first characteristic to a target characteristic according to an operation mode; and select the one or more reference embeddings, from among the multiple reference embeddings, as corresponding to the target characteristic.

Example 16 includes the device of Example 15, wherein the operation mode is based on a user input, a configuration setting, default data, or a combination thereof.

Example 17 includes the device of any of Example 1 to Example 16, wherein the one or more processors are further configured to: process the input audio spectrum to detect a first emotion; process image data to detect a second emotion; and select, based on the first emotion and the second emotion, the one or more reference embeddings from among the multiple reference embeddings.

Example 18 includes the device of Example 17, wherein the one or more processors are further configured to perform face detection on the image data, and wherein the second emotion is detected at least partially based on an output of the face detection.

Example 19 includes the device of Example 17 or Example 18, wherein the one or more processors are further configured to receive audio data from one or more microphones concurrently with receiving the image data from one or more image sensors, and wherein the audio data represents the input speech, the source speech, or both.

Example 20 includes the device of Example 19, further including the one or more microphones and the one or more image sensors.

Example 21 includes the device of any of Example 1 to Example 20, wherein the one or more processors are configured to: obtain a representation of the input speech; process the representation of the input speech to generate the input audio spectrum; and generate a representation of the output speech based on the output audio spectrum.

Example 22 includes the device of Example 21, wherein the representation of the input speech includes first text, and wherein the representation of the output speech includes second text.

Example 23 includes the device of any of Example 1 to Example 22, wherein the one or more processors are integrated into at least one of a vehicle, a communication device, a gaming device, an extended reality (XR) device, or a computing device.

According to Example 24, a method includes: processing, at a device, an input audio spectrum of input speech to detect a first characteristic associated with the input speech; select, based at least in part on the first characteristic, one or more reference embeddings from among multiple reference embeddings; and process a representation of source speech, using the one or more reference embeddings, to generate an output audio spectrum of output speech.

Example 25 includes the method of Example 24, wherein the first characteristic includes an emotion of the input speech.

Example 26 includes the method of Example 24 or Example 25, wherein the first characteristic includes a volume of the input speech.

Example 27 includes the method of any of Example 24 to Example 26, wherein the first characteristic includes a pitch of the input speech.

Example 28 includes the method of any of Example 24 to Example 27, wherein the first characteristic includes a speed of the input speech.

Example 29 includes the method of any of Example 24 to Example 28, further comprising: processing, using an encoder, a source audio spectrum of the source speech to generate a source speech embedding; and processing, using a fundamental frequency (F0) extractor, the source audio spectrum to generate a F0 embedding, wherein the representation of the source speech is based on the source speech embedding and the F0 embedding.

Example 30 includes the method of any of Example 24 to Example 29, wherein the input speech is used as the source speech.

Example 31 includes the method of any of Example 24 to Example 29, further comprising receiving, at the device, the input speech via one or more microphones, wherein the source speech is associated with a virtual assistant, and wherein the output speech corresponds to a social interaction response from the virtual assistant based on the first characteristic.

Example 32 includes the method of any of Example 24 to Example 31, wherein a second characteristic associated with the output speech matches the first characteristic.

Example 33 includes the method of any of Example 24 to Example 32, wherein a first speech characteristic of the output speech matches a second speech characteristic of the input speech.

Example 34 includes the method of any of Example 24 to Example 33, further comprising: generating, at the device, a conversion embedding based on the one or more reference embeddings; applying, at the device, the conversion embedding to encoded source speech to generate converted encoded source speech, wherein the representation of the source speech includes encoded source speech; and decoding, at the device, the converted encoded source speech to generate the output audio spectrum.

Example 35 includes the method of Example 34, further comprising combining, at the device, the one or more reference embeddings and a baseline embedding to generate the conversion embedding.

Example 36 includes the method of Example 34 or Example 35, further comprising: selecting, based at least in part on the first characteristic, a plurality of reference embeddings from among the multiple reference embeddings; and combining, at the device, the plurality of the reference embeddings to generate the conversion embedding.

Example 37 includes the method of any of Example 24 to Example 36, wherein the representation of the source speech is based on at least one of source speech audio, source speech text, a source speech spectrum, linear predictive coding (LPC) coefficients, or mel-frequency cepstral coefficients (MFCCs).

Example 38 includes the method of any of Example 24 to Example 37, further comprising: mapping, at the device, the first characteristic to a target characteristic according to an operation mode; and selecting the one or more reference embeddings, from among the multiple reference embeddings, as corresponding to the target characteristic.

Example 39 includes the method of Example 38, wherein the operation mode is based on a user input, a configuration setting, default data, or a combination thereof.

Example 40 includes the method of any of Example 24 to Example 39, further comprising: processing, at the device, the input audio spectrum to detect a first emotion; processing, at the device, image data to detect a second emotion; and selecting, based on the first emotion and the second emotion, the one or more reference embeddings from among the multiple reference embeddings.

Example 41 includes the method of Example 40, further comprising performing face detection on the image data, wherein the second emotion is detected at least partially based on an output of the face detection.

Example 42 includes the method of Example 40 or Example 41, further comprising receiving audio data at the device from one or more microphones concurrently with receiving the image data at the device from one or more image sensors, wherein the audio data represents the input speech, the source speech, or both.

Example 43 includes the method of any of Example 24 to Example 42, further comprising: obtaining, at the device, a representation of the input speech; processing, at the device, the representation of the input speech to generate the input audio spectrum; and generating, at the device, a representation of the output speech based on the output audio spectrum.

Example 44 includes the method of Example 43, wherein the representation of the input speech includes first text, and wherein the representation of the output speech includes second text.

According to Example 44, a device includes: a memory configured to store instructions; and a processor configured to execute the instructions to perform the method of any of Example 24 to 44.

According to Example 45, a non-transitory computer-readable medium stores instructions that, when executed by a processor, cause the processor to perform the method of any of Example 24 to Example 44.

According to Example 46, an apparatus includes means for carrying out the method of any of Example 24 to Example 44.

According to Example 47, a non-transitory computer-readable medium stores instructions that, when executed by one or more processors, cause the one or more processors to: process an input audio spectrum of input speech to detect a first characteristic associated with the input speech; select, based at least in part on the first characteristic, one or more reference embeddings from among multiple reference embeddings; and process a representation of source speech, using the one or more reference embeddings, to generate an output audio spectrum of output speech.

According to Example 30, an apparatus includes: means for processing an input audio spectrum of input speech to detect a first characteristic associated with the input speech; means for selecting, based at least in part on the first characteristic, one or more reference embeddings from among multiple reference embeddings; and means for processing a representation of source speech, using the one or more reference embeddings, to generate an output audio spectrum of output speech.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:

a memory configured to store data; and one or more processors coupled to the memory and configured to:

process an input audio spectrum of input speech to detect an input characteristic associated with the input speech;

determine a target characteristic that corresponds to the input characteristic;

based on a determination that the target characteristic fails to correspond to any reference embedding of multiple reference embeddings, select a plurality of reference embeddings from among the multiple reference embeddings, wherein the plurality of reference embeddings is selected from the multiple reference embeddings based on a determination that the target characteristic is within a threshold similarity of respective characteristics corresponding to the plurality of reference embeddings; and process a representation of source speech based on the plurality of reference embeddings to generate an output audio spectrum of output speech.

2. The device of claim 1, wherein the one or more processors are further configured to:

process the input audio spectrum to detect a first emotion;

process image data to detect a second emotion; and determine the target characteristic based on the first emotion and the second emotion.

3. The device of claim 2, wherein the one or more processors are further configured to perform face detection on the image data, and wherein the second emotion is detected at least partially based on an output of the face detection.

4. The device of claim 2, wherein the one or more processors are further configured to receive audio data from one or more microphones concurrently with receiving the image data from one or more image sensors, and wherein the audio data represents the input speech, the source speech, or both.

5. The device of claim 4, further comprising the one or more microphones and the one or more image sensors.

6. The device of claim 1, wherein the representation of the source speech includes encoded source speech, and wherein the one or more processors are further configured to:

generate a conversion embedding based on the plurality of reference embeddings;

apply the conversion embedding to the encoded source speech to generate converted encoded source speech; and decode the converted encoded source speech to generate the output audio spectrum.

7. The device of claim 6, wherein the one or more processors are configured to combine the plurality of reference embeddings and a baseline embedding to generate the conversion embedding.

8. The device of claim 6, wherein the one or more processors are configured to combine the plurality of the reference embeddings to generate the conversion embedding.

9. The device of claim 1, wherein the one or more processors are configured to map the input characteristic to the target characteristic according to an operation mode.

10. The device of claim 9, wherein the operation mode is based on a user input, a configuration setting, default data, or a combination thereof.

11. The device of claim 1, wherein the one or more processors are configured to:

obtain a representation of the input speech;

process the representation of the input speech to generate the input audio spectrum; and generate a representation of the output speech based on the output audio spectrum.

12. The device of claim 11, wherein the representation of the input speech includes first text, and wherein the representation of the output speech includes second text.

13. The device of claim 1, wherein:

the input characteristic includes an emotion of the input speech, the target characteristic includes a target emotion, and a first reference embedding of the plurality of reference embeddings is selected based on a determination that the first reference embedding represents a particular emotion that is within the threshold similarity of the target emotion.

14. The device of claim 1, wherein:

the input characteristic includes a volume of the input speech, the target characteristic includes a target volume, and a first reference embedding of the plurality of reference embeddings is selected based on a determination that the first reference embedding represents a particular volume that is within the threshold similarity of the target volume.

15. The device of claim 1, wherein:

the target characteristic includes a target pitch, and a first reference embedding of the plurality of reference embeddings is selected based on a determination that the first reference embedding represents a particular pitch that is within the threshold similarity of the target pitch.

16. The device of claim 1, wherein:

the input characteristic includes a speed of the input speech, the target characteristic includes a target speed, and a first reference embedding of the plurality of reference embeddings is selected based on a determination that the first reference embedding represents a particular speed that is within the threshold similarity of the target speed.

17. The device of claim 1, wherein the one or more processors are further configured to determine a second target characteristic that corresponds to a second characteristic associated with the input speech, wherein a second reference embedding of the plurality of reference embeddings is selected based on a determination that the second reference embedding represents the second target characteristic.

18. The device of claim 1, wherein a first reference embedding of the plurality of reference embeddings is a data structure that stores speech feature values that are indicative of a first characteristic that is within the threshold similarity of the target characteristic, and the input speech is identical to the source speech.

19. The device of claim 1, wherein the one or more processors are further configured to:

receive an input speech representation of the input speech via a first source;

process the input speech representation to generate the input audio spectrum; and receive the representation of the source speech via a second source that is different from the first source, wherein:

the second source includes a virtual assistant software application, and the output speech corresponds to a social interaction response from the virtual assistant software application that is based on the target characteristic.

20. The device of claim 1, wherein a first speech characteristic of the output speech matches a second speech characteristic of the input speech.

21. The device of claim 1, wherein the representation of the source speech is based on at least one of source speech audio, source speech text, a source speech spectrum, linear predictive coding (LPC) coefficients, or mel-frequency cepstral coefficients (MFCCs), and wherein the one or more processors are further configured to:

process, using an encoder, a source audio spectrum of the source speech to generate a source speech embedding; and process, using a fundamental frequency (F0) extractor, the source audio spectrum to generate a F0 embedding, wherein the representation of the source speech is based on the source speech embedding and the F0 embedding.

22. The device of claim 1, wherein the one or more processors are integrated into at least one of a vehicle, a communication device, a gaming device, an extended reality (XR) device, or a computing device.

23. The device of claim 1, wherein the one or more processors are further configured to:

detect a second characteristic and a third characteristic associated with the input speech; and determine a second target characteristic that corresponds to the second characteristic and a third target characteristic that corresponds to the third characteristic wherein a second reference embedding and a third reference embedding of one or more reference embeddings are selected from the multiple reference embeddings based on a determination that the second reference embedding represents the second target characteristic and that the third reference embedding represents the third target characteristic.

24. A method comprising:

processing, at a device, an input audio spectrum of input speech to detect an input characteristic associated with the input speech;

determining, at the device, a target characteristic that corresponds to the input characteristic;

based on determining that the target characteristic fails to correspond to any reference embedding of multiple reference embeddings, selecting a plurality of reference embeddings from among the multiple reference embeddings, wherein the plurality of reference embeddings is selected from the multiple reference embeddings based on determining that the target characteristic is within a threshold similarity of respective characteristics corresponding to the plurality of reference embeddings; and processing a representation of source speech based on the plurality of reference embeddings to generate an output audio spectrum of output speech.

25. The method of claim 24, further comprising:

generating, at the device, a conversion embedding based on the plurality of reference embeddings;

applying the conversion embedding to encoded source speech to generate converted encoded source speech, wherein the representation of the source speech includes encoded source speech; and decoding, at the device, the converted encoded source speech to generate the output audio spectrum.

26. The method of claim 25, further comprising combining, at the device, the plurality of reference embeddings and a baseline embedding to generate the conversion embedding.

27. The method of claim 24, further comprising:

processing, using an encoder, a source audio spectrum of the source speech to generate a source speech embedding; and processing, using a fundamental frequency (F0) extractor, the source audio spectrum to generate a F0 embedding, wherein the representation of the source speech is based on the source speech embedding and the F0 embedding.

28. The method of claim 24, further comprising:

receiving, at the device, an input speech representation of the input speech via a first source;

processing, at the device, the input speech representation to generate the input audio spectrum; and receiving, at the device, the representation of the source speech via a second source that is different from the first source, wherein the second source includes a virtual assistant software application, and wherein the output speech corresponds to a social interaction response from the virtual assistant software application that is based on the target characteristic.

29. A non-transitory computer-readable medium storing instructions that, when executed by one or more processors, cause the one or more processors to:

process an input audio spectrum of input speech to detect an input characteristic associated with the input speech;

determine a target characteristic that corresponds to the input characteristic;

based on a determination that the target characteristic fails to correspond to any reference embedding of multiple reference embeddings, select a plurality of reference embeddings from among the multiple reference embeddings, wherein the plurality of reference embeddings is selected from the multiple reference embeddings based on a determination that the target characteristic is within a threshold similarity of respective characteristics corresponding to the plurality of reference embeddings; and process a representation of source speech, based on the plurality of reference embeddings, to generate an output audio spectrum of output speech.

30. An apparatus comprising:

means for processing an input audio spectrum of input speech to detect an input characteristic associated with the input speech;

means for determining a target characteristic that corresponds to the input characteristic;

means for selecting a plurality of reference embeddings from among multiple reference embeddings based on determining that the target characteristic fails to correspond to any reference embedding of the multiple reference embeddings, wherein the plurality of reference embeddings is selected from the multiple reference embeddings based on a determination that the target characteristic is within a threshold similarity of respective characteristics corresponding to the plurality of reference embeddings; and means for processing a representation of source speech based on the plurality of reference embeddings to generate an output audio spectrum of output speech.

* * * * *